US009769692B2

(12) United States Patent
Freda et al.

(10) Patent No.: US 9,769,692 B2
(45) Date of Patent: Sep. 19, 2017

(54) DYNAMIC SPECTRUM MANAGEMENT

(75) Inventors: Martino M. Freda, Laval (CA);
Alpaslan Demir, East Meadow, NY (US); Athmane Touag, Laval (CA); Phillip L. Leithead, King of Prussia, PA (US); Amith V. Chincholi, West Babylon, NY (US); Ramya Gopalan, Melville, NY (US); Sowmya Gopalan, Melville, NY (US); Jean-Louis Gauvreau, La Prairie (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/286,610

(22) Filed: Nov. 1, 2011
(Under 37 CFR 1.47)

(65) Prior Publication Data
US 2012/0294168 A1 Nov. 22, 2012

Related U.S. Application Data

(60) Provisional application No. 61/408,808, filed on Nov. 1, 2010, provisional application No. 61/410,712, filed
(Continued)

(51) Int. Cl.
*H04B 1/00* (2006.01)
*H04W 24/10* (2009.01)
(Continued)

(52) U.S. Cl.
CPC .......... *H04W 24/10* (2013.01); *H04B 1/0067* (2013.01); *H04W 72/00* (2013.01); *H04W 72/0453* (2013.01)

(58) Field of Classification Search
CPC .... H04B 1/0067; H04W 24/10; H04W 72/00; H04W 72/0453
(Continued)

(56) References Cited

U.S. PATENT DOCUMENTS 7,616,554 B2 11/2009 Asai et al.
8,472,378 B2 6/2013 Ariyoshi et al.
(Continued)

FOREIGN PATENT DOCUMENTS

CN 101489237 A 7/2009
JP 2006-222665 A 8/2006
(Continued)

OTHER PUBLICATIONS

Cabric et al., "Implementation issues in spectrum sensing for cognitive radios," Conference Record of the Thirty-Eighth Asilomar Conference on Signals, Systems and Computers, vol. 1, pp. 772-776 (Nov. 7-10, 2004).
(Continued)

*Primary Examiner* — Andrew Lai
*Assistant Examiner* — M Mostazir Rahman
(74) *Attorney, Agent, or Firm* — Condo Roccia Koptiw LLP

(57) ABSTRACT

A wireless transmit/receive unit (WTRU) and a dynamic spectrum management (DSM) engine are described. The WTRU includes a transceiver, a radio frequency (RF) spectrum sensing unit and a processing unit. The transceiver transmits over a wireless link. The RF spectrum sensing unit measures information indicative of usage of a spectrum by other devices. The processing unit detects a change in performance of the wireless link, controls the transceiver to transmit a notification to a DSM engine indicating that the change in the performance of the wireless link was detected on a condition that the processing unit detects the change in performance of the wireless link, and receives a sensing task request for the WTRU to measure the information indicative of the usage of the spectrum by other devices based on the notification transmitted to the DSM engine indicating that
(Continued)

the change in the performance of the wireless link was detected.

20 Claims, 33 Drawing Sheets

Related U.S. Application Data on Nov. 5, 2010, provisional application No. 61/423,419, filed on Dec. 15, 2010.

(51) Int. Cl.
*H04W 72/04* (2009.01)
*H04W 72/00* (2009.01)

(58) Field of Classification Search
USPC .................................................. 370/252, 329
See application file for complete search history.

(56) References Cited

U.S. PATENT DOCUMENTS

| | | | |
|---|---|---|---|
| 2002/0009158 A1* | 1/2002 | Souissi et al. | 375/295 |
| 2008/0198948 A1* | 8/2008 | Tang | 375/316 |
| 2009/0186646 A1 | 7/2009 | Ahn et al. | |
| 2009/0197626 A1 | 8/2009 | Huttunen et al. | |
| 2009/0247201 A1* | 10/2009 | Ye et al. | 455/509 |
| 2009/0268619 A1* | 10/2009 | Dain et al. | 370/252 |
| 2010/0069013 A1 | 3/2010 | Chaudhri et al. | |
| 2010/0081387 A1* | 4/2010 | Shi et al. | 455/62 |
| 2010/0137014 A1 | 6/2010 | Rao et al. | |
| 2010/0173586 A1* | 7/2010 | McHenry | H04L 27/0006 455/62 |
| 2010/0197332 A1* | 8/2010 | Kyperountas et al. | 455/515 |
| 2011/0201372 A1 | 8/2011 | Luo et al. | |
| 2012/0320741 A1 | 12/2012 | Freda et al. | |

FOREIGN PATENT DOCUMENTS

| | | |
|---|---|---|
| JP | 2009-177403 A | 8/2009 |
| JP | 2009-206933 A | 9/2009 |
| JP | 2010-035170 A | 2/2010 |
| JP | 2010-220036 A | 9/2010 |
| JP | 2012-523207 A | 9/2012 |
| JP | 2012521135 A1 | 9/2012 |
| KR | 1020090080386 A | 7/2009 |
| WO | 2009/045646 | 4/2009 |
| WO | WO 2009/084465 A1 | 7/2009 |
| WO | 2010/088598 | 8/2010 |
| WO | WO-2010106492 A2 | 9/2010 |
| WO | 2010/117998 | 10/2010 |

OTHER PUBLICATIONS

Haykin, "Cognitive radio: brain-empowered wireless communications," IEEE Journal on Selected Areas in Communications, vol. 23, Issue 2, pp. 201-220 (Feb. 2005).
Larouche, "2010 SFF SDR Training," Lyrtech Signal Processing (2010).
Lyrtech, Inc., "ADACMaster III User's Guide," (Jul. 2010).
Lyrtech, Inc., "Small Form Factor SDR Evaluation Module/Development Platform User's Guide," (Aug. 2010).
Mishra et al., "Cooperative Sensing among Cognitive Radios," IEEE International Conference on Communications, vol. 4, pp. 1658-1663 (Jun. 2006).
Sahai et al., "Fundamental Design Tradeoffs in Cognitive Radio Systems," Proceedings of the First International Workshop on Technology and Policy for Accessing Spectrum, pp. 1-9 (Aug. 2006).
Sahai et al., "Some Fundamental Limits on Cognitive radio," Proceedings of Allentown Conference on Communication, Control, and Computing (Oct. 2004).
Yucek et al., "A Survey of Spectrum Sensing Algorithms for Cognitive Radio Applications," IEEE Communications Surveys and Tutorials, vol. 11, No. 1 (2009).
Zeng et al., "Covariance Based Signal Detections for Cognitive Radio," 2nd IEEE International Symposium onNew Frontiers in Dynamic Spectrum Access Networks, pp. 202-207 (Apr. 17-20, 2007).
Ariananda et al., "A Survey on Spectrum Sensing Techniques for Cognitive Radio", Second International Workshop on Cognitive Radio and Advanced Spectrum Management, 2009. CogART 2009, May 18-20, 2009, pp. 74-79.
Bini et al., "Solving the Generalized EigenValue Problem for Rational Toeplitz Matricies", SIAM J. Matrix Anal. & Appl., vol. 11, No. 4, 1990, pp. 537-552.
Cabric et al., "Spectrum Sensing Measurements of Pilot, Energy, and Collaborative Detection", IEEE Military Communications Conference, Oct. 23-25, 2006, pp. 1-7.
Cybenko et al., "Computing the Minimum Eigenvalue of a Symmetric Positive Definate Toeplitz Matrix", SIAM J. Sci. Stat. Comp., vol. 7, No. 1, 1986, pp. 123-130.
Digham et al., "On the Energy Detection of Unknown Signals over Fading Channels", IEEE Transactions on Communications, vol. 55, No. 1, Jan. 2007, pp. 21-24.
Dowell et al., "The 'Pegasus' Method for Computing the Root of an Equation", BIT Numerical Mathematics, vol. 12, No. 4, 1972, pp. 503-508.
Farhang-Boroujeny, Behrouz, "Signal Processing Techniques for Spectrum Sensing and Communications in Cognitive Radios", Lecture given to InterDigital, Oct. 2009.
Federal Communications Commission, "Notice of Inquiry and Notice of Proposed Rulemaking", ET Docket No. 03-237, Nov. 28, 2003, 31 pages.
Freda et al., "Method and Apparatus for Coordination of Silent Periods for a Dynamic Spectrum Manager", U.S. Appl. No. 81/214,379, InterDigital Inc., Nov. 2009.
Hu et al., "Toeplitz Eigensystem Solver", IEEE Transactions on Acoustics, Speech and Signal Processing, vol. 33, No. 5, Oct. 1985, pp. 1264-1271.
Kataria, Amit, "Cognitive Radios-Spectrum Sensing Issues", A Thesis Presented to the Faculty of the Graduate School at the University of Missouri-Columbia, Dec. 2007, 54 pages.
Kim et al., "In-band Spectrum Sensing in Cognitive Radio Networks: Energy Detection or Feature Detection?", International Conference on Mobile Computing and Networking, Sep. 14-19, 2008, 12 pages.
Lehtomaki et al., "Spectrum Sensing with Forward Methods", IEEE Military Communications Conference, Oct. 23-25, 2006, pp. 1-7.
Ma et al., "Soft Combination and Detection for Cooperative Spectrum Sensing in Cognitive Radio Networks", IEEE Global Telecommunications Conference, GLOBECOM '07, Nov. 26-30, 2007, pp. 3139-3143.
Mathews et al., "A Unified Approach to Nonparametric Spectrum Estimation Algorithms", IEEE Transactions on Acoustics, Speech, And Signal Processing, vol. ASSP-35, No. 3, Mar. 1987, pp. 338-349.
Mishra et al., "Cognitive Technology for Ultra-Wideband/WiMax Coexistence", 2nd IEEE International Symposium on New Frontiers in Dynamic Spectrum Access Networks, Apr. 17-20, 2007, pp. 179-186.
Nguyen-Thanh et al, "An Enhanced Cooperative Spectrum Sensing Scheme Based on Evidence Theory and Reliability Source Evaluation in Cognitive Radio Context", IEEE Communications Letters, vol. 13, No. 7, Jul. 2007, pp. 492-494.
Noguet, Dominique, "Sensing Techniques for Cognitive Radio-State of the Art and Trends", SCC41-P1900.6, White paper—Sensing Techniques for Cognitive Radio, Apr. 15, 2009, pp. 1-117.
Olivieri et al., "A Scalable Dynamic Spectrum Allocation System with Interference Mitigation for Teams of Spectrally Agile Software Defined Radios", First IEEE International Symposium on New Frontiers in Dynamic Spectrum Access Networks, Baltimore, Maryland, USA, Nov. 8-11, 2005, pp. 170-179.

(56) References Cited

OTHER PUBLICATIONS

Oner et al., "Cyclostationarity Based Air Interface Recognition for Software Radio Systems", In Proceedings of IEEE Radio and Wireless Conference, Sep. 2004, pp. 263-266.
Proakis et al, "Digital Signal Processing", Third Edition, Prentice Hall, New Jersey, 1996, 1033 pages.
Shellhammer, Steve, "Performance of the Power Detector", IEEE P802.22 Wireless RANs, Doc: IEEE 802.22-06/0075r0, May 2006, 21 pages.
Shellhammer, Steve, "Spectrum Sensing in IEEE 802.22", IAPR Workshop on Cognitive Information Processing, Jun. 2008, 6 pages.
Shen et al., "User Clusters Based Hierarchical Cooperative Spectrum Sensing in Cognitive Radio Networks", In Proceedings of International Conference on Cognitive Radio Oriented Wireless Networks and Communications, Jun. 2009, pp. 1-6.
Sutton et al., "Cyclostationary Signature Detection in Multipath Rayleigh Fading Environments", 2nd International Conference on Cognitive Radio Oriented Wireless Networks and Communications, Aug. 1-3, 2007, pp. 408-413.
Sutton et al., "Cyclostationary Signatures for Rendezvous in OFDM-Based Dynamic Spectrum Access Networks", In Proceedings of IEEE International Symposium on New Frontiers in Dynamic Spectrum Access Networks, Apr. 2007, pp. 220-231.
Tang, "Some Physical Layer Issues of Wide-Band Cognitive Radio Systems", First IEEE International Symposium on New Frontiers in Dynamic Spectrum Access Networks, Nov. 8-11, 2005, pp. 151-159.
Trench, W. F., "Numerical Solution of the Eigenvalue Problem for Symmetric Rationally Generated Toeplitz Matrices", SIAM J. Matrix Anal. & Appl., vol. 9, No. 2, 1988, pp. 291-303.
Trench, W. F., "Numerical Solution of the Eigenvalue Problem for Hermitian Toeplitz Matricies", SIAM J. Matrix Anal. & Appl. 10, 1989, pp. 135-156.
Urkowitz, Harry, "Energy Detection of Unknown Deterministic Signals", Proceedings of the IEEE, vol. 55, No. 4, Apr. 1967, pp. 523-531.
Visotsky et al., "On Collaborative Detection of TV Transmissions in Support of Dynamic Spectrum Sharing", In Proceedings of IEEE Symposium on New Frontiers in Dynamic Spectrum Access Netorks, Nov. 2005, pp. 338-345.
Wang et al., "A Robust and Energy Efficient Cooperative Spectrum Sensing Scheme in Cognitive Radio Networks", International Conference on Advanced Communication Technology, Feb. 2009, pp. 640-645.
Weidling et al., "A Framework for R.F. Spectrum Measurements and Analysis", First IEEE International Symposium on New Frontiers in Dynamic Spectrum Access Networks, Baltimore, Maryland, USA, Nov. 8-11, 2005, pp. 573-576.
Wu, Robert S., "TV Band White Space (TVWS) Spectrum Manager", IEEE 802.22-09/113r0, IEEE P802.22 Wireless RANs, Jun. 18, 2009, 13 pages.
Zheng, "Cooperative Spectrum Sensing Based on SNR Comparison in Fusion Center for Cognitive Radio", International Conference on Advanced Computer Control, Jan. 22-24, 2009, pp. 212-216.
IEEE P802.22/WDv0.4.8, "Draft Standard for Wireless Regional Area Networks Part 22: Cognitive Wireless RAN Medium Access Control (MAC) and Physical Layer (PHY) Specifications: Policies and Procedures for Operation in the TV Bands", 2006, 367 pages.
IEEE P802.22/Draftv1.0, "Draft Standard for Wireless Regional Area Networks Part 22: Cognitive Wireless RAN Medium Access Control (MAC) and Physical Layer (PHY) Specifications: Policies and Procedures for Operation in the TV Bands", 2006, 426 pages.
Xiao et al, "Cognitive Radio Networks", Chapter 1; Part 1, pp. 2-35, CRC Press; Taylor & Francis Group, 2009.

\* cited by examiner

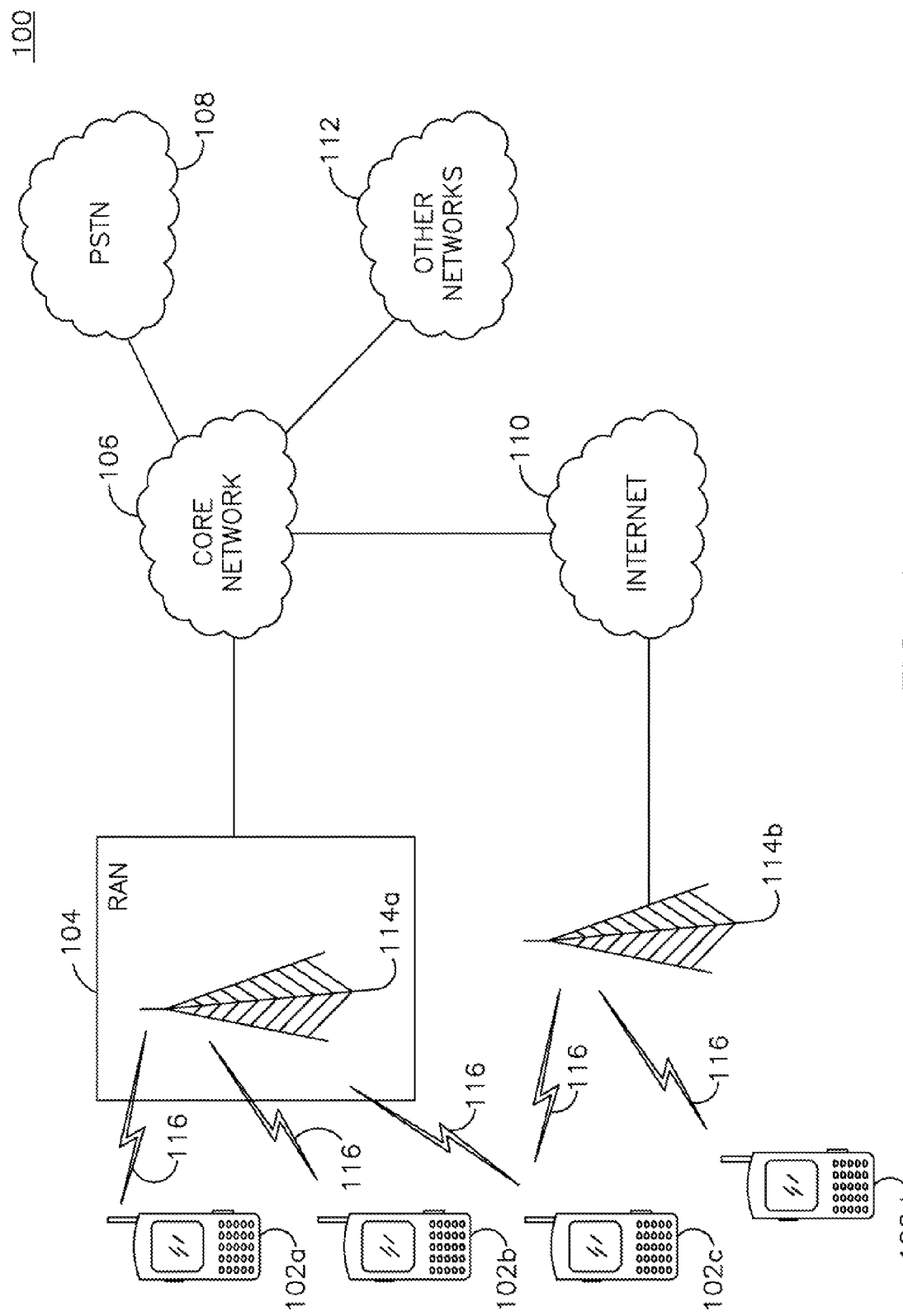

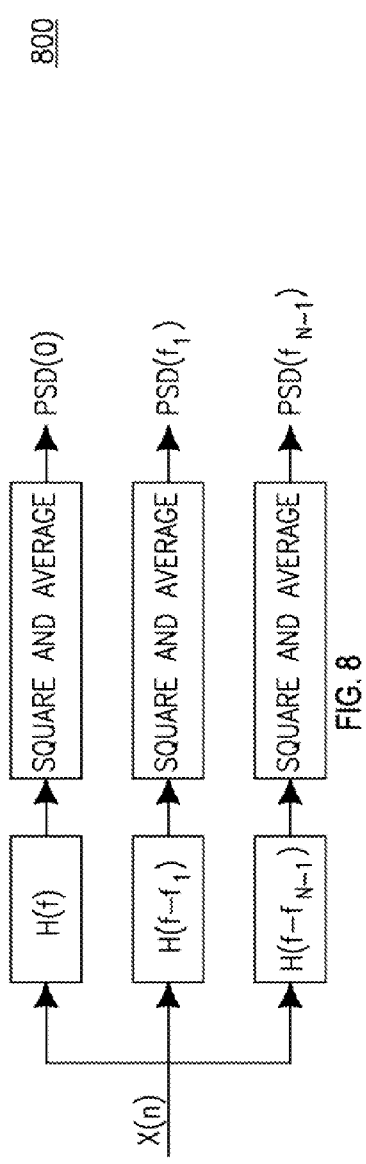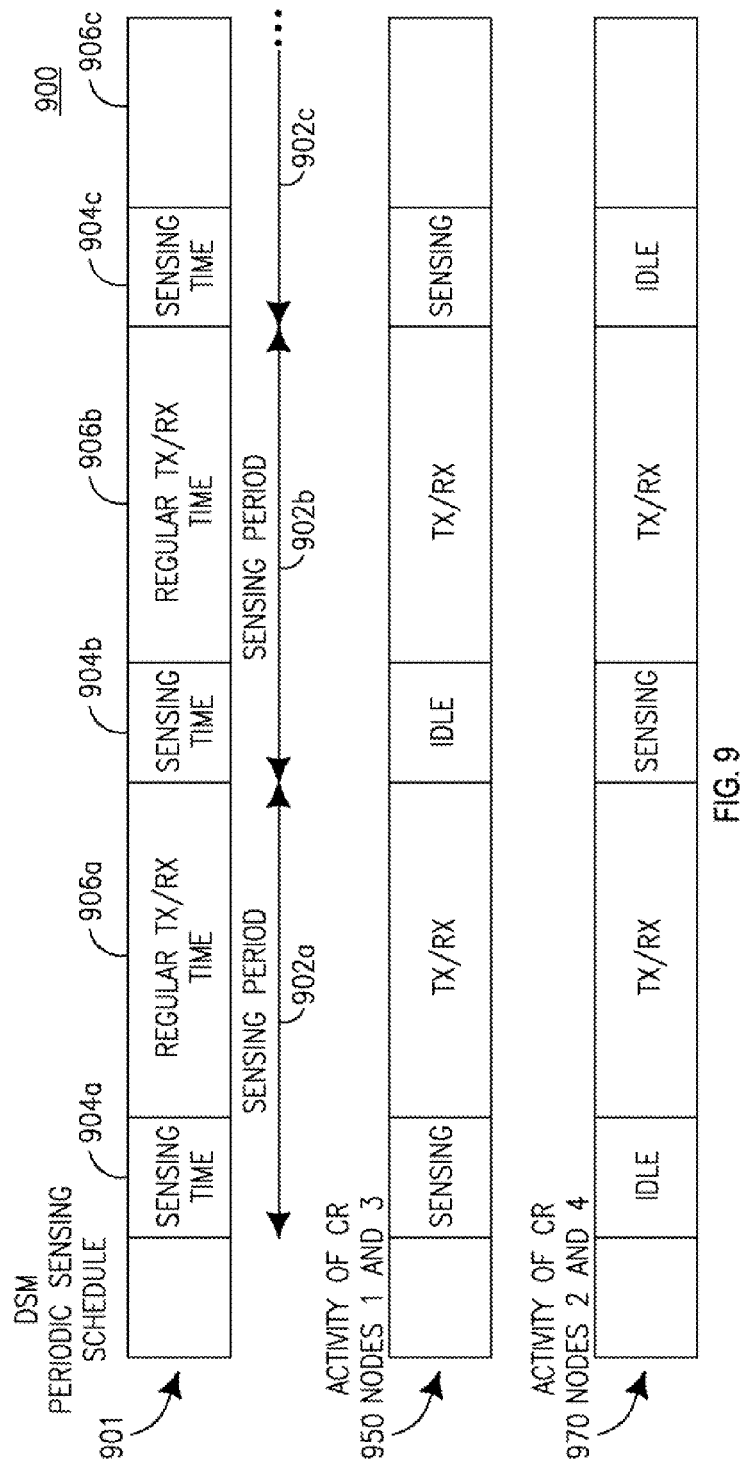

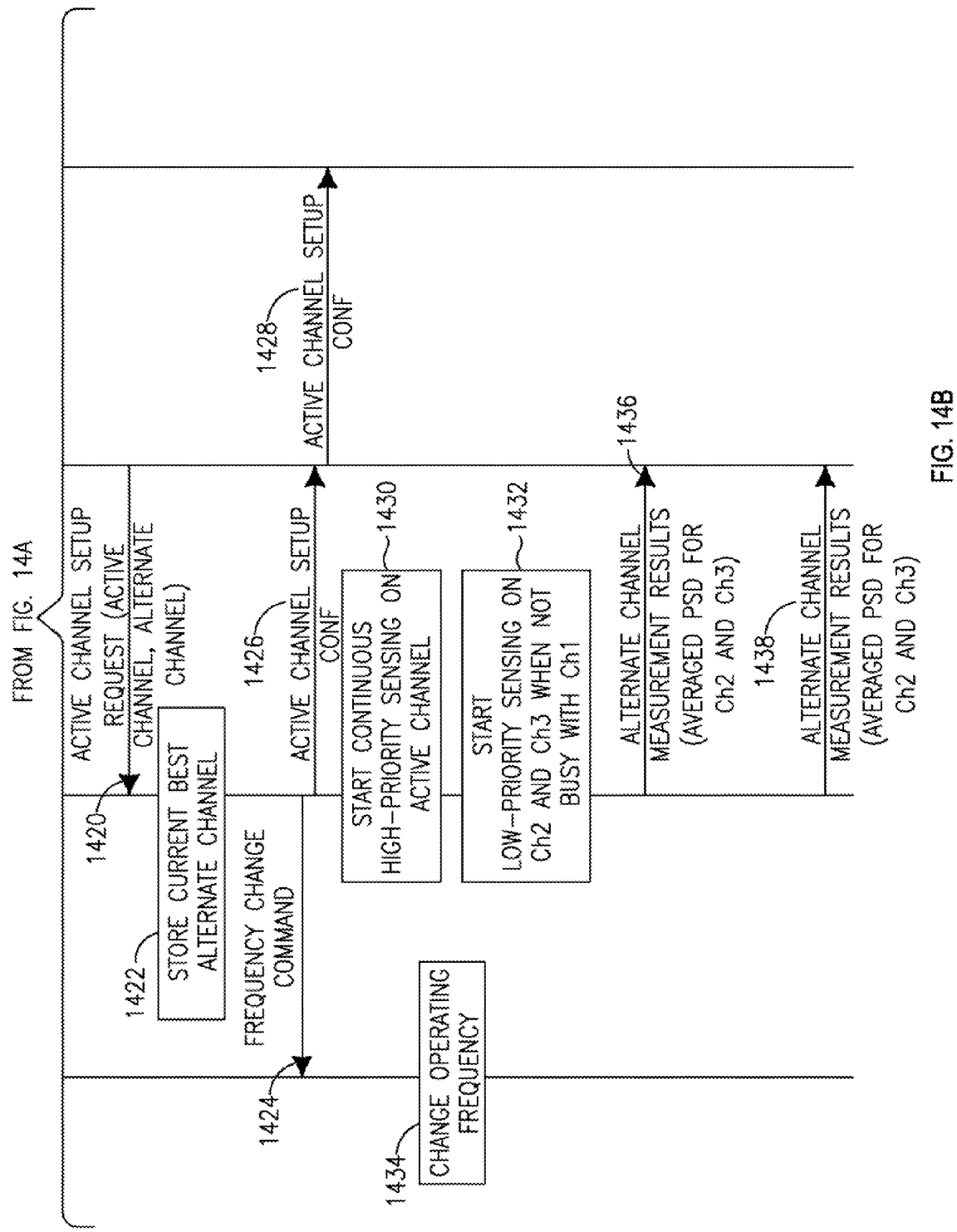

DYNAMIC SPECTRUM MANAGEMENT

CROSS REFERENCE TO RELATED APPLICATIONS

This application claims the benefit of U.S. Provisional Application No. 61/408,808, which was filed on Nov. 1, 2010, U.S. Provisional Application No. 61/410,712, which was filed on Nov. 5, 2010, and U.S. Provisional Application No. 61/423,419, which was filed on Dec. 15, 2010, the contents of which are hereby incorporated by reference herein.

BACKGROUND

Many wireless devices communicate with each other using a set of one or more radio spectrum bands that have been statically allocated for their use. These devices may be referred to as the primary incumbents (or primary users) of the spectrum that they use. For example, cellular telephones are primary incumbents of the spectrum licensed by their cellular operator, and no other device is permitted to use this spectrum for communication unless it is registered with the corresponding cellular operator. Further, while specific spectrum bands are allocated for use by their primary incumbents, the primary incumbents are not free to use their allocated bands to operate any type of air interface. For example, a television service provider cannot independently decide to begin operating a cellular service on spectrum bands allocated for its use.

The Federal Communications Commission (FCC) has estimated that over 70% of the allocated spectrum is not being used by its primary incumbents at any given time, even in crowded areas where usage is intensive. Accordingly, the radio spectrum is being severely underutilized.

SUMMARY

A wireless transmit/receive unit (WTRU) is described. The WTRU includes a transceiver, a radio frequency (RF) spectrum sensing unit and a processing unit. The transceiver transmits over a wireless link. The RF spectrum sensing unit measures information indicative of usage of a spectrum by other devices. The processing unit detects a change in performance of the wireless link. The processing unit also controls the transceiver to transmit a notification to a DSM engine indicating that the change in the performance of the wireless link was detected on a condition that the processing unit detects the change in performance of the wireless link. The processing unit also receives a sensing task request for the WTRU to measure the information indicative of the usage of the spectrum by other devices based on the notification transmitted to the DSM engine indicating that the change in the performance of the wireless link was detected.

BRIEF DESCRIPTION OF THE DRAWINGS

A more detailed understanding may be had from the following description, given by way of example in conjunction with the accompanying drawings wherein:

FIG. 1A is a system diagram of an example communications system in which one or more disclosed embodiments may be implemented;

FIG. 8 is a diagram of a filter that may be used in an example of a basic received signal strength indicator (RSSI) scanning using automatic gain control (AGC) gain technique;

FIG. 9 is a diagram illustrating a possible implementation of a time skew between CR nodes in the case of a periodic sensing stage;

DETAILED DESCRIPTION

Figure 1B:
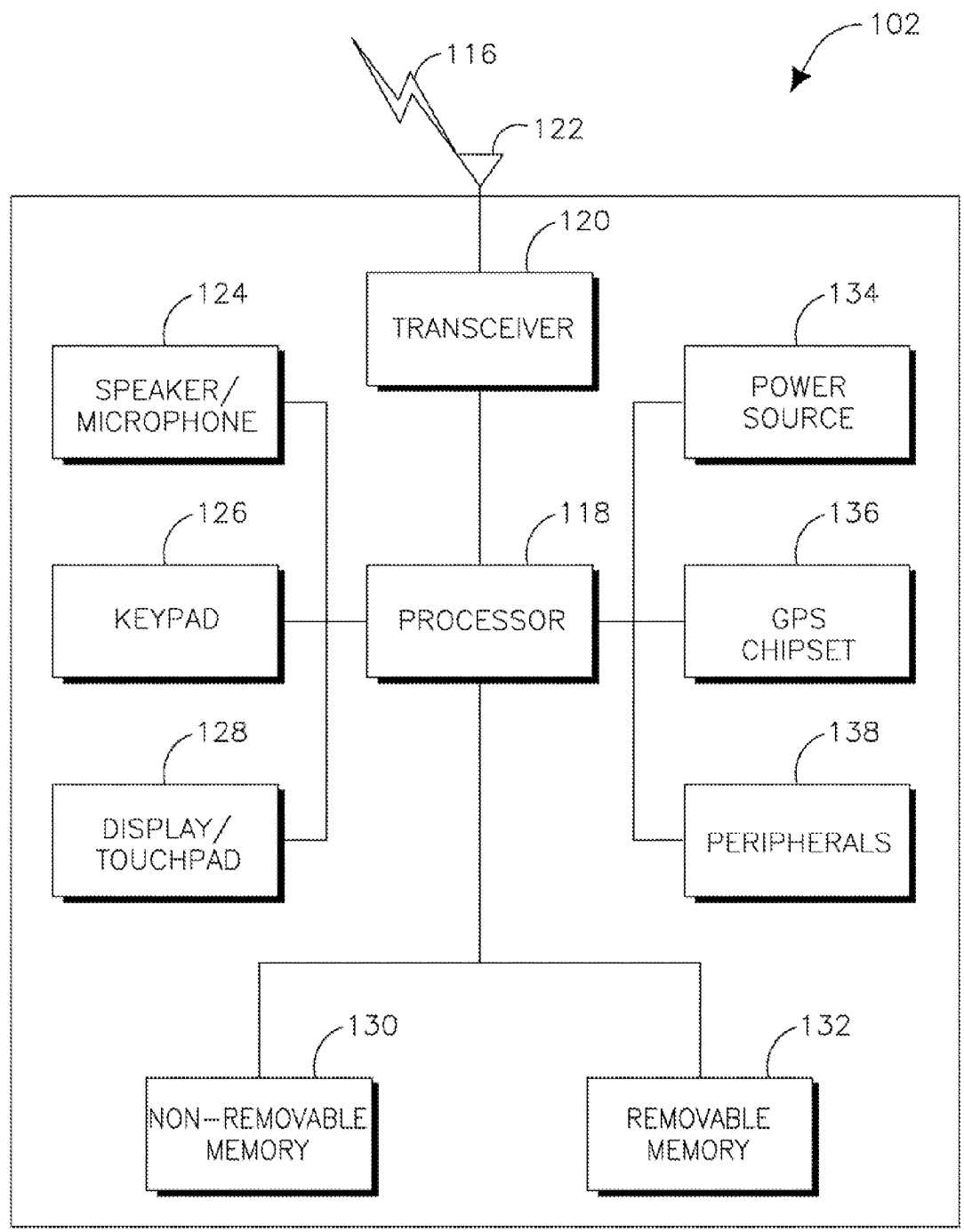
FIG. 1B is a system diagram of an example wireless transmit/receive unit (WTRU) that may be used within the communications system illustrated in FIG. 1A.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals.

In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
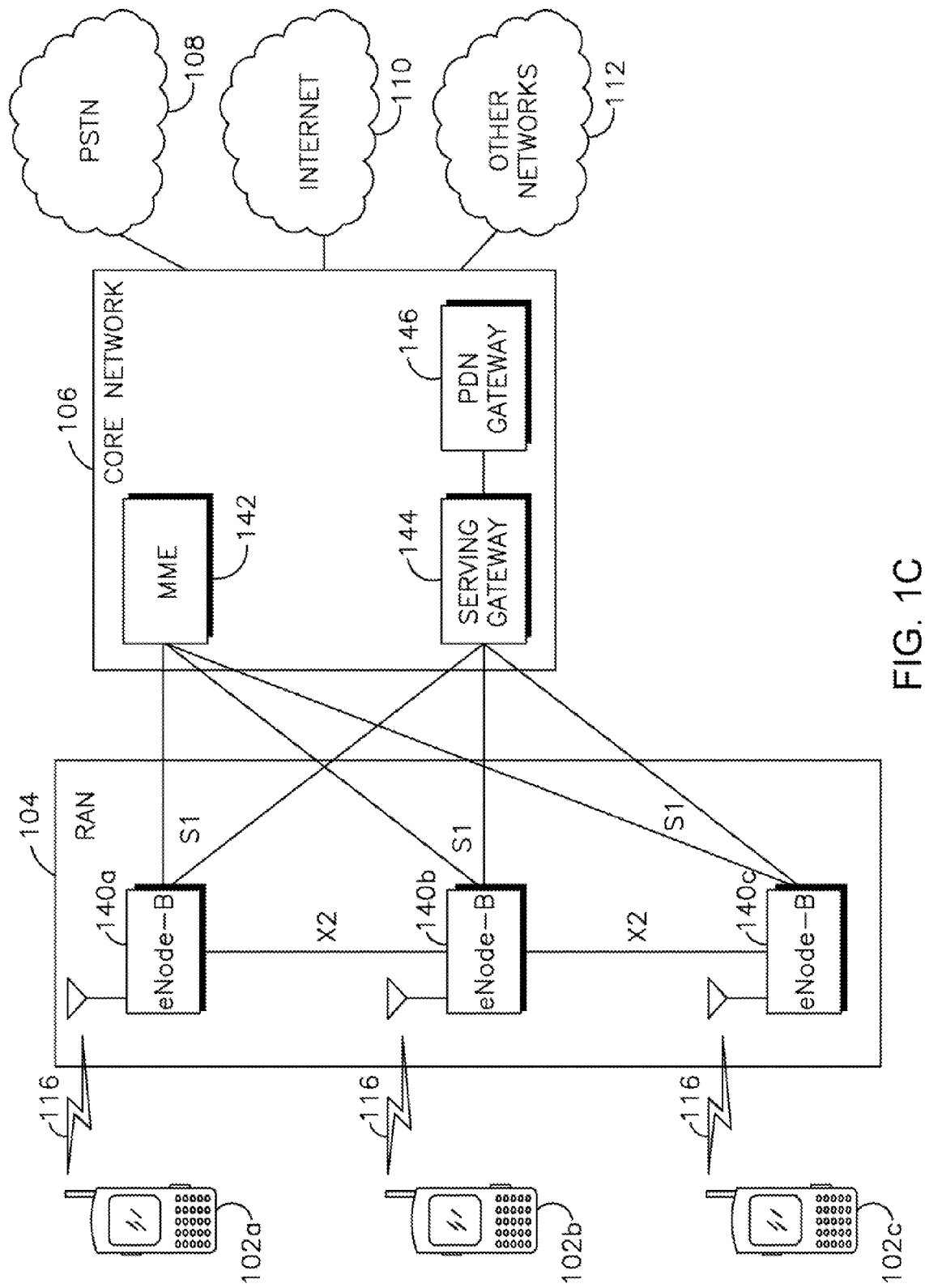
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140*a*, 140*b*, 140*c* may implement MIMO technology. Thus, the eNode-B 140*a*, for example, may use multiple antennas to transmit wireless signals to, and receive wireless signals from, the WTRU 102*a*.

Each of the eNode-Bs 140*a*, 140*b*, 140*c* may be associated with a particular cell (not shown) and may be configured to handle radio resource management decisions, handover decisions, scheduling of users in the uplink and/or downlink, and the like. As shown in FIG. 1C, the eNode-Bs 140*a*, 140*b*, 140*c* may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142*a*, 142*b*, 142*c* in the RAN 104 via an S1 interface and may serve as a control node. For example, the MME 142 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 142 may also provide a control plane function for switching between the RAN 104 and other RANs (not shown) that employ other radio technologies, such as GSM or WCDMA.

The serving gateway 144 may be connected to each of the eNode Bs 140*a*, 140*b*, 140*c* in the RAN 104 via the S1 interface. The serving gateway 144 may generally route and forward user data packets to/from the WTRUs 102*a*, 102*b*, 102*c*. The serving gateway 144 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 144 may also be connected to the PDN gateway 146, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 106 may facilitate communications with other networks. For example, the core network 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102*a*, 102*b*, 102*c* with access to the networks 112, which may include other wired or wireless networks that are owned and/or operated by other service providers.

Indoor Wi-Fi equipment, such as laptops, may be compatible with the Institute of Electrical and Electronics Engineers (IEEE) 802.11g standard. As such, this equipment may use the specific spectrum that 802.11g devices are designed to operate as primary incumbents (or primary users) on, as specified in the IEEE 802.11g standard. Unlike the cellular spectrum described above, however, 802.11g operates in an unlicensed band that has no spectrum regulator. Thus, any wireless communication device may use this spectrum for its own purpose. Although such use of an unlicensed band is allowed, devices that intend to operate in such a band are expected to ensure that they do so in a cognitive manner such that they are aware of the presence of primary incumbents on the band and use it in a non-malicious, co-existing manner. Other spectrum bands may be used by secondary users in a similar manner.

Dynamic spectrum management (DSM) is a technology that may be used to facilitate use of spectrum bands by secondary users in a cognitive manner. For example, DSM may include identifying and exploiting unused spectrum fragments by sensing the spectrum and statically or dynamically assigning spectrum to one or more secondary users in the system. DSM may be employed across one or more radio access technologies (RATs) or operators and may use contiguous or non-contiguous frequency bands. Secondary spectrum using devices that may operate in a DSM system may be referred to as cognitive radios. Cognitive radios may be constantly aware of spectrum usage characteristics and may adaptively use or vacate a spectrum band based on the presence of one or more of its primary incumbents. The cognitive radios may also be responsible for sensing the spectrum for occupation by primary incumbents and reporting the sensing results to a central control unit (referred to herein as a DSM engine).

Figure 2:
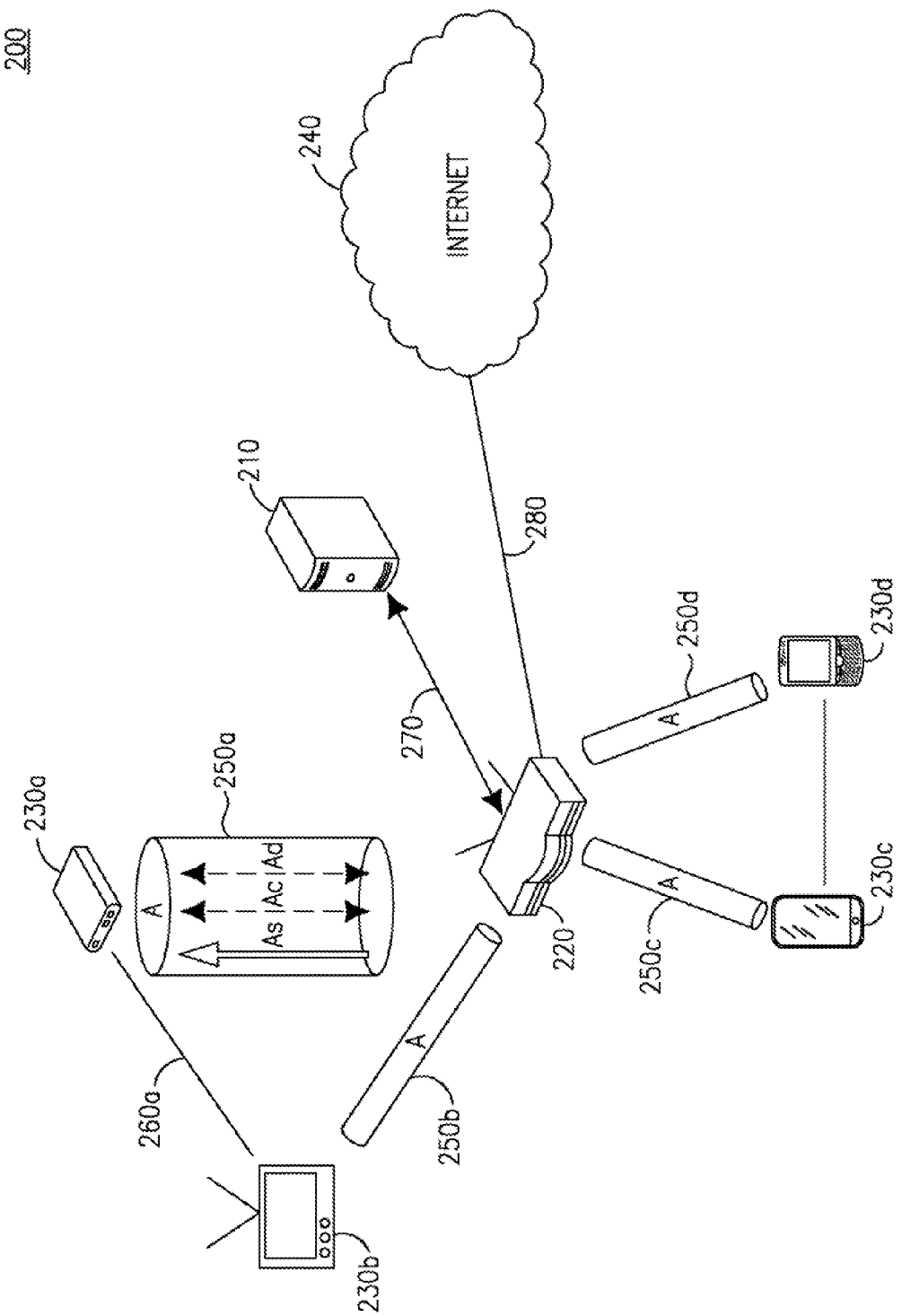
FIG. 2 is a diagram of an example dynamic spectrum management (DSM) network.

FIG. 2 is a diagram of an example DSM network 200. The illustrated DSM network 200 includes a DSM engine 210, a converged gateway device (CGW) 220 and a plurality of wireless transmit/receive units (WTRUs) 230*a*, 230*b*, 230*c* and 230*d*. The illustrated WTRUs 230*a*, 230*b*, 230*c* and 230*d* are configured to operate as cognitive radios (CRs) in addition to any other functionality they may have and may be referred to herein as CR nodes. The CR nodes may be based on IEEE 802.11 technology, cellular technology, IEEE 802.15.4 technology or any other wireless technology.

The illustrated DSM engine 210 is coupled to the CGW 220 through an interface 270, which may be a wireless or wireline (e.g., Ethernet) link. The illustrated CGW 220 is coupled to an external network or the Internet 240 through a wired link 280 (e.g., a digital subscriber line (DSL), Docsis or Ethernet connection). In an embodiment (not shown), the DSM engine 210 may be integrated with the CGW 220. In an embodiment, some of the CR nodes may also communicate directly with each other. For example, in the embodiment illustrated in FIG. 2, the CR nodes 230*a* and 230*b* may communicate with each other over a direct link 260*a* and CR nodes 230*c* and 230*d* may communicate with each other over a directly link 260*b*.

The CR nodes 230*a*, 230*b*, 230*c* and 230*d* may communicate with the DSM engine 210 over one or more channels 250*a*, 250*b*, 250*c* and 250*d*, respectively, via the CGW 220. Each of 250*a*, 250*b*, 250*c* and 250*d* may include a downlink control channel Ac, an uplink control channel Ad and a synchronization channel As. The Ac, Ad and As channels may be decoupled or may be part of the same control channel.

Figure 3:
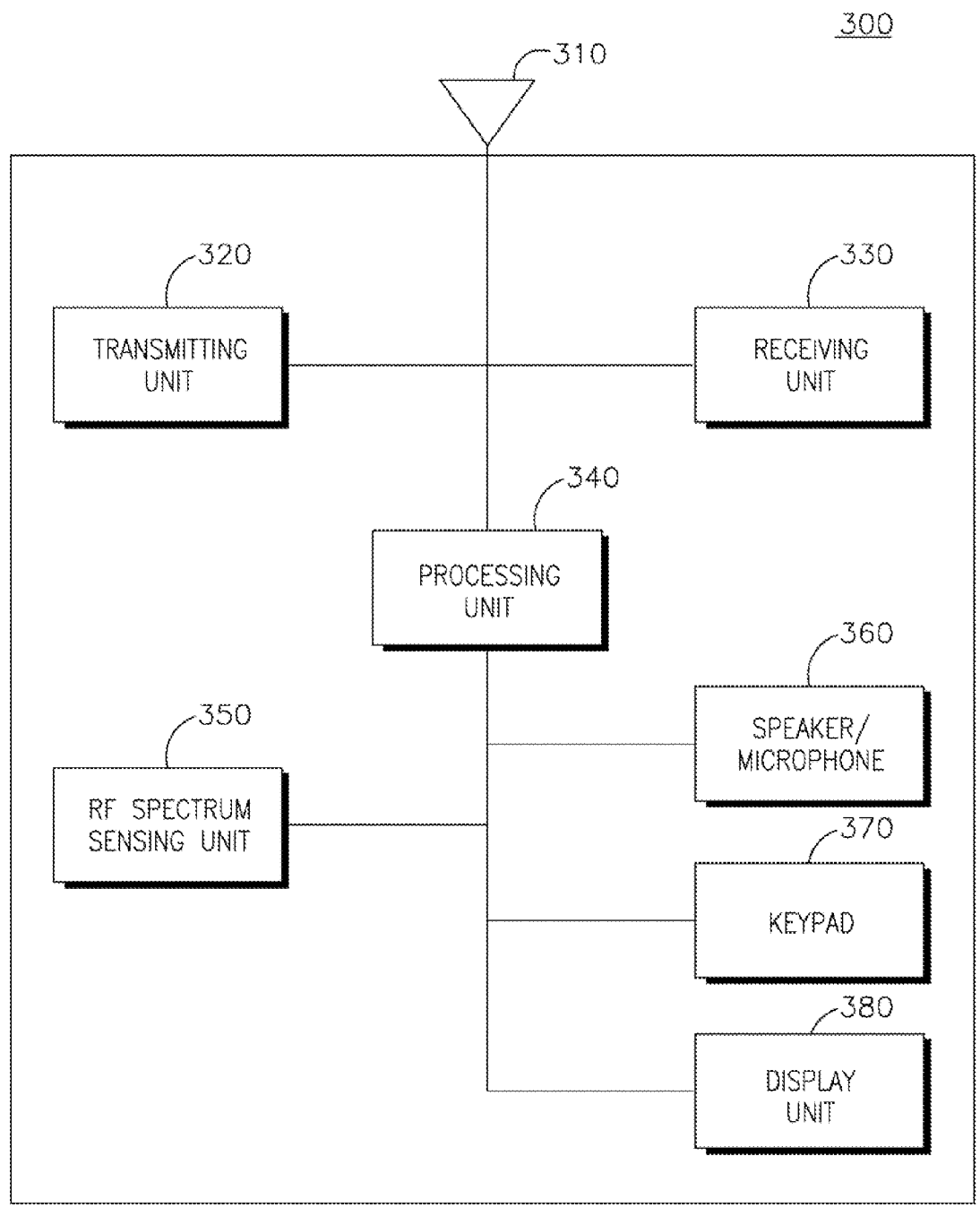
FIG. 3 is a diagram of an example wireless transmit/receive unit (WTRU) that is configured to operate as a cognitive radio (CR) node.

FIG. 3 is a diagram of an example WTRU 300 that is configured to operate as a CR node in a DSM network such as the DSM network 200 illustrated in FIG. 2. The WTRU 300 may be any type of device configured to operate and/or communicate in a wireless environment. By way of example, the WTRU 300 may be configured to transmit and/or receive wireless signals and may be user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. The illustrated WTRU 300 includes an antenna 310, a transmitting unit 320, a receiving unit 330, a processing unit 340, a radio frequency (RF) spectrum sensing unit 350, a speaker/microphone 360, a keypad 370 and a display unit 380. While only some elements of the WTRU 300 are illustrated, one of ordinary skill in the art will recognize that the WTRU 300 may include other features (e.g., associated input/output (I/O) ports and/or graphic user interfaces (GUIs) that are not shown. Further, while specific elements of the example WTRU 300 are illustrated in FIG. 3, the illustrated elements may be modified using ordinary skill in the art. For example, the receiving unit 330 and the transmitting unit 320 may be implemented as a combined transceiver unit, and the keypad 370 and the display unit 380 may be implemented as a touch screen.

The DSM network 200 illustrated in FIG. 2 may be configured for individual or cooperative spectrum sensing. In individual spectrum sensing, one CR node may sense the spectrum and make a decision as to whether the spectrum is currently occupied by one or more primary incumbents. Its single decision regarding whether the spectrum is currently being occupied by the one or more primary incumbents may be used to determine spectrum allocations for the entire DSM network 200. In cooperative sensing, on the other hand, more than one CR node 230a, 230b, 230c and/or 230d may sense a given spectrum for use by another device, and the DSM engine 210 may consider sensing results received from the more than one CR node 230a, 230b, 230c and/or 230d to make a decision as to whether the given spectrum is occupied by one or more primary incumbent at a point in time. Cooperative sensing techniques are described herein that may be performed in two stages.

In a first stage, each CR node participating in a sensing task may sense the spectrum and report sensing results, for example, during a regular silent period that may occur periodically (e.g., at periodic intervals). The DSM engine 210 may communicate timing information regarding the regular silent period to the CR nodes on the As channel. Each CR node participating in the sensing task may then perform sensing simultaneously using the same base time and may report its individual sensing results to the DSM engine 210 over the uplink control channel Ad. The DSM engine 210 may use the sensing results received during the first stage to carry out several functions. For example, the DSM engine 210 may use the sensing results to yield a coarse estimate of potential spectrum holes available in the system (indicating, for example, bands that may be available for secondary use by CR nodes). For another example, the DSM engine 210 may use the sensing results to determine an amount of correlation between CR nodes in the network and adjust the sensing task based on this correlation.

In a second stage, an advanced, asynchronous sensing period may be triggered in which the DSM engine 210 may instruct all or some of the CR nodes 230a, 230b, 230c and 230d to perform sensing for a specified period of time. The triggering of this system-wide silence period for the purposes of sensing may be used to accelerate the response of the CR network to the possible arrival of a primary incumbent. The DSM engine 210 may trigger the asynchronous sensing period itself, or the asynchronous sensing period may be triggered by a CR node.

In an embodiment, any CR node may generate and send an event to the DSM engine 210 to command a system-wide sensing period. An example of the occurrence of such an event may be where change in an environment sensed by a CR node may indicate the presence of a primary incumbent (e.g., a sudden decrease in throughput on a link currently being used by a CR node or a sudden change in channel quality on the specific link). The CR node may notify the DSM engine 210 of the potential change in the environment using the uplink control channel Ad. The DSM engine 210 may then trigger a system-wide silence period (e.g., by broadcasting a control message) in order to allow the CR nodes to perform immediate sensing to identify vacant bands to be transitioned to to avoid interference with the primary incumbent.

In an embodiment, sensing may take place by certain CR nodes in the DSM network 200 without the need to quiet down the other CR nodes. Here, sensing may be performed by CR nodes in a portion of the spectrum that is not used by any of the nodes under management of the DSM engine 210. The DSM engine 210 may send this information to each of the CR nodes using a configuration message (described in more detail below). The configuration message may also control other factors of sensing, such as a type of sensing algorithm to be used, the parameters for the algorithm (e.g., sensing duration and fast Fourier transform (FFT) size) and a bandwidth to be sensed.

A list of example events that may trigger an asynchronous sensing period in a second stage is provided in Table 1.

TABLE 1

| Sensing Event | Trigger | Result |
| --- | --- | --- |
| Change in Environment | Physical (PHY) layer measurements configured by the DSM engine in one of the CR nodes triggers an event indicating the possible presence of primary incumbent on the active band occupied by that primary incumbent. | CR node whose measurements trigger the event sends an event message to the DSM engine with the event code and information about the event. The DSM engine sends a configuration message to CR nodes indicating commencement of an asynchronous sensing period. If the presence of a primary incumbent is detected, the DSM engine sends new spectrum allocations to CR nodes that were previously using the sensed spectrum. |
| Change in DSM Sensing Policy | An external spectral management or other such entity in the Internet notifies the DSM engine of a change in its usable spectrum rules. | The DSM engine changes the sensing rules based on these new policies. The DSM engine then appropriately reconfigures each of the nodes currently responsible for sensing by sending a sensing configuration message to each node. |
| Arrival or Departure of a Node from the CR Network | A new CR node enters the network and is discovered by the CGW, or a CR node previously belonging to the network leaves the area managed by the CGW. | The DSM engine re-organizes the sensing task between the nodes involved in cooperative sensing. A sensing message is sent to the nodes to configure the new sensing rules for each node. |
| Coarse Sensing Information Change | Coarse sensing results received by the DSM engine indicate the presence of new potential holes, or the change in location of potential holes or usable spectrum. | The DSM engine sends a sensing configuration message to the CR nodes to modify or start fine sensing on the potential holes and/or the usable bands in order update the list of usable bands. |
| Change in Correlation | Coarse sensing results or geographical information indicates that the correlation between certain CR nodes has changed. | The DSM engine will change the spectrum being sensed by the nodes to maintain efficient sensing among all nodes under the DSM engine's management area. |

The DSM engine 210 may convey information about a duration of the asynchronous sensing period to each CR node participating in the asynchronous sensing task using the configuration message transmitted on the Ac channel. During this period, each CR node may perform sensing and send their sensing results to the DSM engine 210. Following fusion of the results by the DSM engine 210, the DSM engine 210 may decide that the required reliability has not been reached for it to make a reliable decision on a specific band. In this case, the DSM engine 210 may extend the sensing period or trigger a new sensing period during which sensing by each of the CR nodes may be continued.

Figure 4:
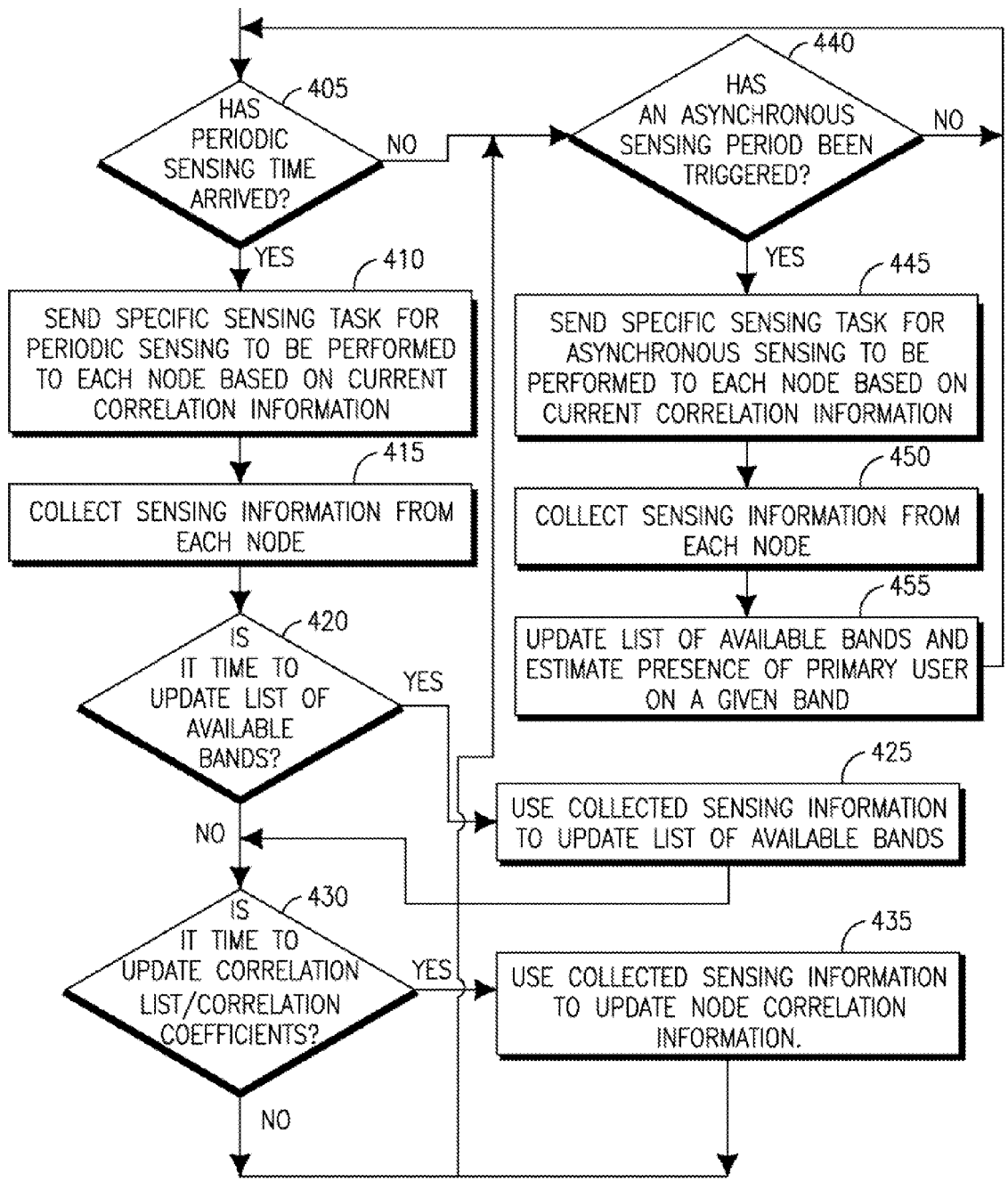
FIG. 4 is a flow diagram illustrating an example two stage cooperative sensing method.

FIG. 4 is a flow diagram 400 illustrating an example two stage cooperative sensing method, which may be executed by the DSM engine 210 of FIG. 2. In the example illustrated in FIG. 4, the DSM engine 210 may determine whether a periodic sensing time has arrived (405). If the periodic sensing time has arrived, the DSM engine 210 may send a sensing task request to each CR node participating in the sensing task based at least on current correlation information (410). The sensing information may be collected from each node participating in the sensing task (415).

The DSM engine 210 may determine whether it is time to update a list of available spectrum bands (420). If it is time to update the list of available spectrum bands, the DSM engine 210 may use the sensing information collected in 415 to update the list (425). If it is not time to update the list of available spectrum bands, or if the list of available spectrum bands has been updated, the DSM engine 210 may determine whether it is time to update a correlation list or correlation coefficients (430). If it is time to update the correlation list or the correlation coefficients, the DSM engine 210 may use the sensing information collected in 415 to update the correlation list or the correlation coefficients (435).

If the DSM engine 210 determines that a periodic sensing time has not arrived in 405, or if the correlation list or correlation coefficients have been updated, the DSM engine 210 may determine whether an asynchronous sensing period has been triggered (440). If not, the DSM engine 210 may determine whether a periodic sensing time has arrived (405). If an asynchronous sensing period has been triggered, the DSM engine 210 may send a sensing task request to each node participating in the sensing task based at least on correlation information (445). Sensing information may be collected from each node participating in the sensing task (450). The DSM engine 210 may update the list of available bands and determine whether a primary incumbent is present on a given band (455). Then, the DSM engine 210 may determine whether a periodic sensing time has arrived (405).

The example illustrated in FIG. 4 focuses on the actions and decisions made by the DSM engine 210. In each case, however, the flow control may be modified based on the specific algorithm implemented by the DSM engine 210. For instance, the DSM engine 210 may determine that the list of correlated CR nodes does not need to be updated often. In that case, the periodic sensing results may be used predominantly for the purpose of estimating spectral holes, and the DSM engine 210 may even choose to extend the sensing period so that periodic sensing times occur less often.

Figure 5:
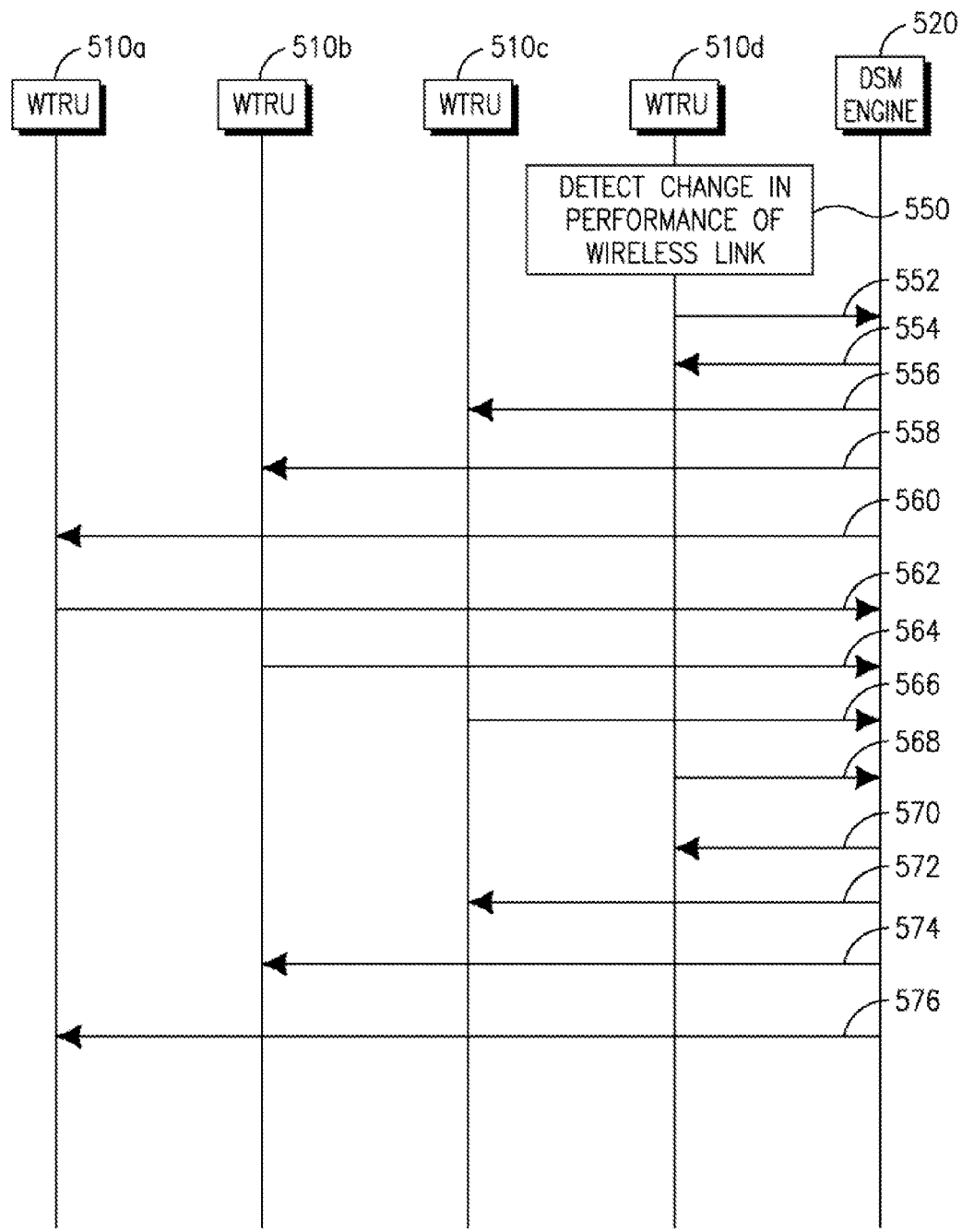
FIG. 5 is a signal diagram illustrating example signaling for cooperative sensing.

FIG. 5 is a signal diagram 500 illustrating example signaling for cooperative sensing. A WTRU 510d may detect a change in performance of a wireless link over which it is configured to communicate (55). On a condition that a processing unit 340 of the WTRU 510d detects the change in performance of the wireless link, the processing unit 340 of the WTRU 510d may control its transceiver to transmit a notification 552 to an engine (e.g., the DSM engine 520) indicating that the change in the performance of the wireless link was detected. The WTRU 510d may receive a sensing task request 554 for the WTRU 510d to measure information indicative of the usage of the spectrum by other devices (e.g., primary incumbents on the spectrum) based on the notification transmitted to the engine indicating that the change in the performance of the wireless link was detected.

The WTRU 510d may be one of a plurality of CR nodes in a cooperative spectrum sensing network that may also include WTRUs 510a, 510b and 510c. In the example illustrated in FIG. 5, the WTRUs 510a, 510b and 510c have been selected to participate in the sensing task triggered by the WTRU 510d, and they also receive sensing task requests 556, 558 and 560, respectively. In response to receiving the sensing task requests 554, 556, 558 and 560, each of the WTRUs 510a, 510b, 510c and 510d may sense the spectrum (i.e., measure the information indicative of the usage of the spectrum by other devices) and transmit their respective sensing results 562, 564, 566 and 568 to the engine 520. The engine 520 may fuse the individual sensing results (e.g., using any fusion technique including those described below) and determine whether the sensing results indicate the presence of another device on the spectrum. On a condition that the DSM engine determines that the sensing results indicate the presence of a primary incumbent on the spectrum, WTRUs using that spectrum may receive new spectrum allocations for communications on which no primary incumbent has been detected. In the example illustrated in FIG. 5, each of the WTRUs 510a, 510b, 510c and 510d receive messages 570, 572, 574 and 576 indicating their new spectrum allocations.

The DSM engine 210 may control sensing by each of the CR nodes 230a, 230b, 230c and 230d using a generic framework that may include a sensing configuration message. The sensing configuration message may be an upper-layer control message that may be used to configure DSM-enabled functionality in each of the protocol layers at the respective CR node.

Figure 6A:
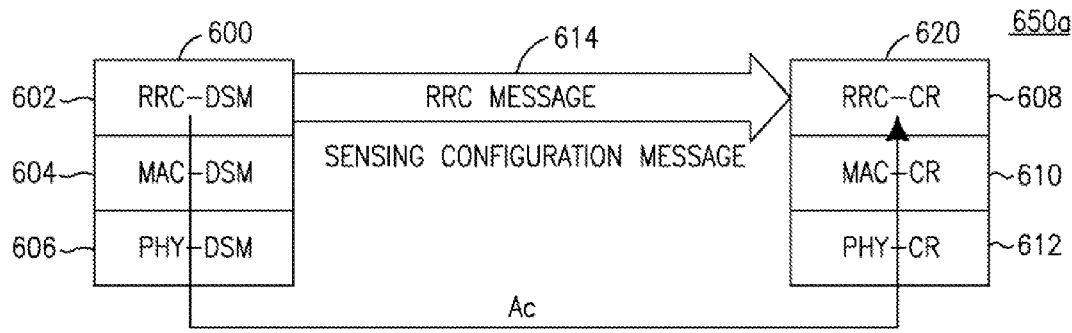
FIGS. 6A, 6B and 6C are flow diagrams that illustrate an example exchange of sensing configuration information to configure a CR node based on cellular technology.
Figure 6B:
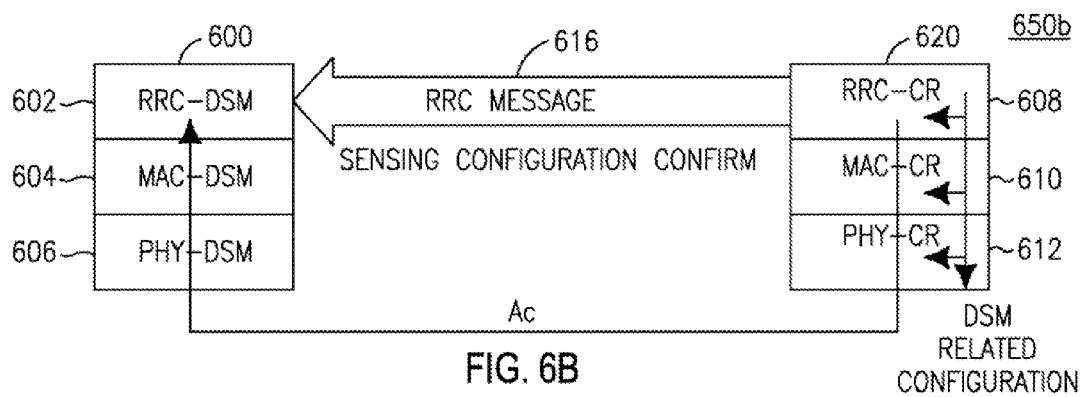
Figure 6C:
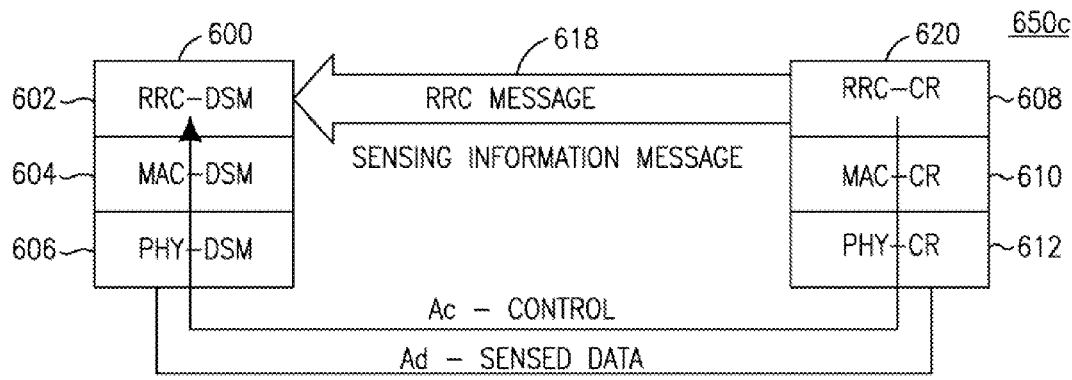

FIGS. 6A, 6B and 6C are flow diagrams 650a, 650b and 650c that illustrate an example exchange of sensing configuration information to configure a CR node based on cellular technology. In each of the figures, a DSM engine 600 and a CR node 620 is illustrated. The illustrated DSM engine 600 for each figure includes a radio resource control (RRC) layer 602, a media access control (MAC) layer 604 and a physical (PHY) layer 606. Similarly, the illustrated CR node 620 for each figure includes an RRC layer 608, a MAC layer 610 and PHY layer 612. The message flow illustrated in FIGS. 6A, 6B and 6C may easily be extended for Wi-Fi or machine to machine (M2M) technologies by a person of ordinary skill in the art.

In the example flow diagram illustrated in FIG. 6A, an RRC message 614 that includes the sensing configuration is sent over the Ac interface from the DSM engine 600 to the CR node to be configured 620. The DSM engine 600 may send an RRC message 614 to each individual CR node (e.g., CR node 620) in a number of different scenarios. For example, the DSM engine 600 may send an RRC sensing configuration message 614 to a CR node 620 following registration of the CR node 620 to the network to provide it with an initial configuration to configure the periodic coarse sensing in a first stage. For another example, the DSM engine 600 may send an RRC message 614 to a CR node 620 as a result of an event that triggers an asynchronous sensing period for that node.

A sensing configuration message 614 may alter an existing sensing configuration within a CR node 620, or it may add a new sensing configuration within the CR node 620. Each sensing configuration for a CR node 620 may represent a periodic sensing/measurement action to be taken by the CR node 620 or an immediate sensing action in the case of an asynchronous measurement period configured by the DSM engine 600. Based on the values sent in the configuration message, an active sensing configuration may also be disabled or canceled by the DSM engine 600 using the same message.

Table 2 illustrates the contents or fields that may be included in a sensing configuration message 614. The sensing configuration message 614 may be made to configure both coarse (e.g., first stage) and fine (e.g., second stage) sensing based on the sensing type. The type of algorithm, sensing parameters, and expected return values from each of the CR nodes 620 may also be configured by the sensing configuration message 614. Each CR node may maintain a list of active configurations in order to know when and how to perform the sensing that is requested by the DSM engine 600.

TABLE 2

| Message Field | Use |
| --- | --- |
| Configuration ID | Contains a unique identifier that identifies this sensing configuration. All sensing results or future configuration messages sent to the CR node will be identified using this ID. |
| Sensing Type | The sensing type (coarse, fine, or active channel monitoring-based) applied to this sensing configuration. |
| Channels to Sense | A list of channels or a particular bandwidth to be sensed using this sensing configuration. |
| Periodicity | The period of frequency with which the node is to perform the sensing associated with this configuration. A period of 0 can be used to indicate an asynchronous sensing action that is deactivated as soon as it is performed. |
| Sensing Algorithm | The sensing algorithm to use among a list of algorithms known to the DSM engine. |
| Sensing Algorithm Parameters | Specific values of the parameters associated with each algorithm that controls the sensing duration and complexity (e.g. fast Fourier transform (FFT) size, number of sample, etc.). The length of this field depends on the value of the sensing algorithm field. |
| Active Channel Monitoring Method | When a node is asked to perform L1 measurement-based sensing to detect a possible arrival of a primary incumbent, the configuration message configures a channel-monitoring based sensing type. |
| Active Channel Monitoring Parameters | Parameters for configuring the channel monitoring methods. |

In response to receiving a sensing configuration message 614 from the DSM engine 600, the RRC layer 608 of the receiving CR node 620 may interpret the message and configure the CR node 620 in each layer of the stack based on the information carried in the message 614. This may include PHY layer 612 parameters related to sensing as well as RRC-level 608 timers for sensing periods and measurement reporting by lower layers. As illustrated in FIG. 6B, the CR node 620 may send an RRC message 616 back to the DSM engine 600 confirming the configuration of the CR node 620 based on the information included in the sensing configuration message 614.

At least because each sensing configuration message 614 is assigned a sensing configuration ID, the sensing results sent by a CR node 620 may be identified by the DSM engine 600 according to this ID. As illustrated in FIG. 6C, the CR node 620 may send an RRC message 618 to the DSM engine 600 over the Ad channel that includes the configuration ID and the sensing results.

The DSM engine 210 may perform fusion on either the sensing information sent periodically by CR nodes or by the sensing information that is sent by the CR nodes following an asynchronous system-wide sensing period to generate a final decision regarding the presence of a primary incumbent on a specific band. The DSM engine 210 may use any one of a number of different fusion techniques, which may include fusion using I/Q data from CR nodes and reliability decision fusion.

For fusion using I/Q data from CR nodes, a selected number of CR nodes may send a set of I/Q samples (or some transformed version of the I/Q samples) directly to the DSM engine 210. The DSM engine 210 may process the I/Q samples jointly to determine the presence or absence of a primary incumbent on that band. Because the DSM engine 210 has access to knowledge of the correlation relationship between CR nodes in its network, it may form a joint detection problem where the inputs may be considered as uncorrelated random variables. This technique may be employed using periodic sensing results received by the DSM engine 210 over a long period of time, in which a portion of the total amount of I/Q samples to be used in the detection may be sent during each periodic sensing occasion. It may also be used for asynchronous sensing periods.

For fusion using I/Q data from CR nodes, each CR node that has been chosen to participate in the joint sensing computation at a particular time instant (e.g., based on the correlation between the nodes determined by the DSM engine 210) may send a vector of N complex (I/Q) samples to the DSM engine 210. Depending on the type of spectrum sensing/estimation that the DSM engine 210 uses, the I/Q samples may be combined in different ways.

Figure 7:
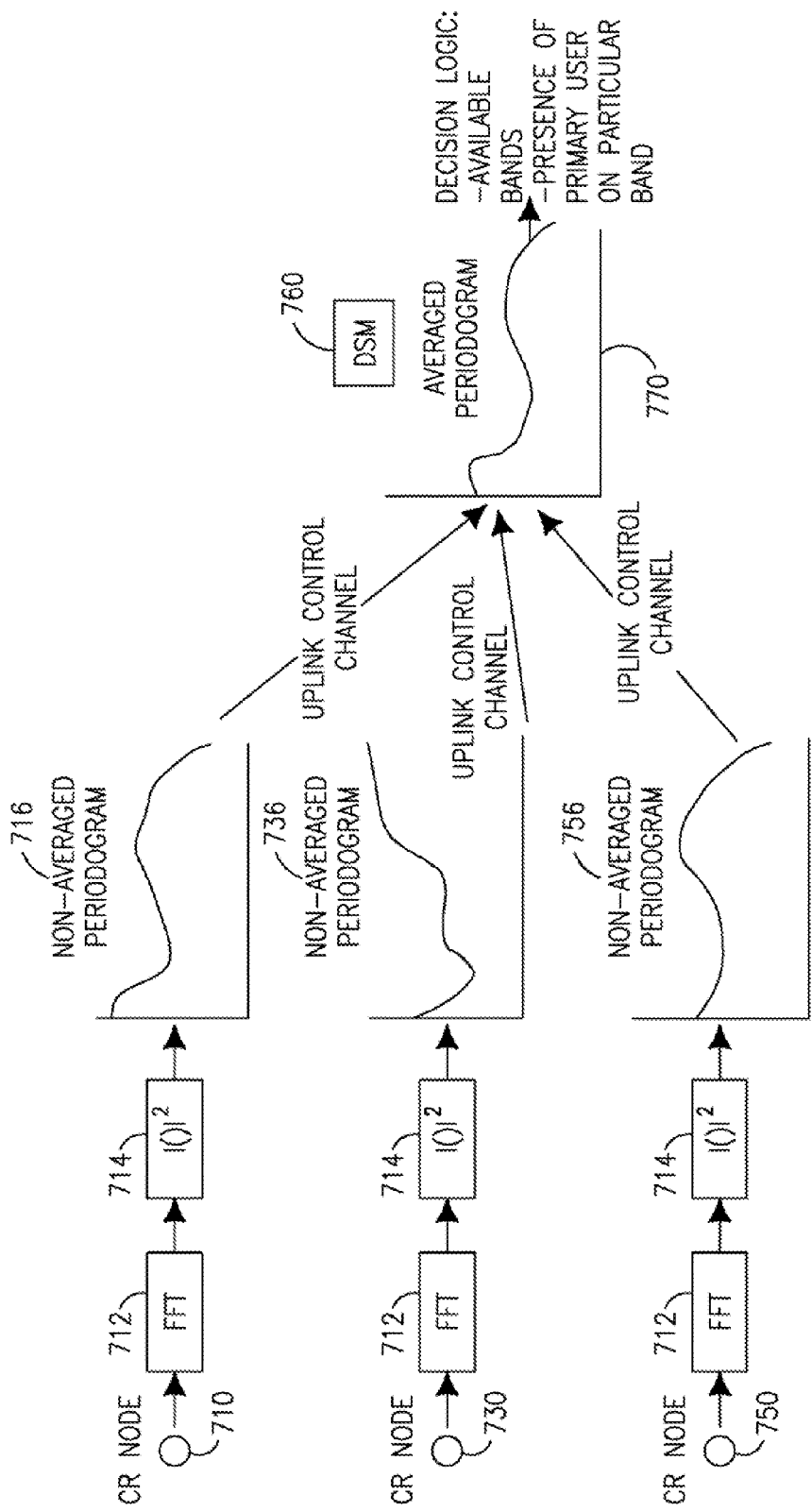
FIG. 7 is a diagram illustrating an example technique for fusion using I/Q data from CR nodes using periodogram spectrum estimation.

FIG. 7 is a diagram illustrating an example technique for fusion using I/Q data from CR nodes using periodogram spectrum estimation. In the illustrated example, CR nodes 710, 730 and 750 have been chosen to participate in the joint sensing computation. Each of the CR nodes 710, 730 and 750 determines the square 714 of the fast Fourier transform (FFT) 712 of its respective I/Q data sequences and provides a respective non-averaged periodogram 716, 736 and 756 on the uplink control channel Ad. The DSM engine 760 may average the magnitude squared of the FFT of each of the I/Q data sequences received from the CR nodes to provide a joint (or cooperative) estimate 770 of the power spectral density (e.g., an averaged periodogram). Decision logic 780 at the DSM engine 760 may then determine available bands and the presence of a primary incumbent on a particular band based on the averaged periodogram 770. In traditional periodogram spectrum estimation, the averaging that is required to decrease the variance of the estimate may be achieved by dividing the signal into possibly overlapping portions. This may reduce the overall frequency resolution of the spectrum estimate. By averaging over the data samples received over several nodes (and keeping the sequence length the same in each node), an increase in variance may be achieved without sacrificing the frequency resolution for a given sensing time.

Reliability decision fusion may be performed, for example, to fuse results provided during asynchronous system-wide silent periods. During asynchronous system-wide silent periods, each CR node may return a decision indicating, for example, a presence or absence of a primary incumbent on a specific band. The reported decision may be combined with additional information, which the DSM engine 210 may use to create a reliability of the overall decision, assuming that the individual decisions come from uncorrelated observations. Possible additional information that may be used to create an overall reliability may include an estimated signal-to-noise ratio (SNR), a number of samples used in metric computation, or any quantity that is specific to the method used for generating the decision of the presence or absence of a primary incumbent that expresses some sense of the reliability of the decision. The decision (e.g., user present or no user present), as well as additional information for reliability evaluation, may be sent by the CR node to the DSM engine 210 over the uplink control channel.

The DSM engine 210 may combine the decisions generated by each CR nodes in a weighted fashion, and a large weight may be attributed to nodes that report data that contain a higher reliability. This assumes that the DSM engine 210 has knowledge of the sensing algorithm used by each CR node in order to derive a reliability of the decision from that node based on the transmitted information (e.g., SNR, distance from the threshold, etc). The decisions may be combined using a generic K/N decision rule that may be optimized to achieve the best probability of detection and probability of false alarm for the specific scenario. In other words, a band may be determined to contain a primary incumbent if the sum of CR nodes indicating the presence of a primary incumbent and factored by a specific weight exceeds a certain target value. In addition, the DSM engine 210 may be able to determine an overall reliability metric of the fused decision it creates. When reliability decision fusion is used in the case of asynchronous sensing periods, the DSM engine 210 may choose (for example, based on the overall reliability of the decision) to extend the system-wide sensing period in order to increase reliability or perform spectrum allocation or re-allocation based on the fused decision.

In an example of a reliability decision fusion technique, it may be assumed that a CR node will decide on the presence or absence of a primary incumbent by comparing a computed metric with a defined threshold$_\gamma$. In particular, the metric used by each CR node may include the estimated ratio of maximum and minimum eigenvalues. The decision taken by a CR node as to the presence or absence of a primary incumbent may be given by:

$$\frac{\hat{\lambda}_{max}}{\hat{\lambda}_{min}} \begin{cases} > \gamma; \rightarrow H_1 \\ \leq \gamma; \rightarrow H_0 \end{cases} \quad \text{Equation (1)}$$

To obtain the maximum and minimum eigenvalues without the need for matrix inversion computations at each of the CR nodes, the autocorrelation matrix of the received samples at each CR node may be approximated as a circulant matrix so that the eigenvalues of the matrix may be obtained by taking the FFT of any row of the matrix. The autocorrelation function of a stationary process may also be approximated (especially for values of the period M) as a periodic function:

$$r_M(k) = \sum_{l=-\infty}^{\infty} r(k + lM), \quad \text{Equation (2)}$$

where r(k) is the autocorrelation function of the received signal. The CR node may generate an estimate of the periodic autocorrelation function limited to a sum of L periods and use it to populate the first row of the estimated circulant autocorrelation matrix using:

$$\hat{r}_k = \sum_{l=0}^{L-1} r(k + lM) \quad \text{Equation (3)}$$

The maximum and minimum eigenvalues used in the decision of equation (1) may be obtained as the maximum and minimum values of the FFT of the row of the circulant autocorrelation matrix obtained using equation (3). The CR node may then send the decision and the distance $d=|\gamma - \hat{\lambda}_{max}/\hat{\lambda}_{min}|$ to the DSM engine 210 for fusion.

When the decision and distance for each node is received by the DSM engine 210, the DSM engine 210 may form the decision equation obtained by a weighted sum of decisions from all N nodes involved in the cooperative sensing:

$$D = \sum_{i=0}^{N} \alpha_i d_i H_i \quad \text{Equation (4)}$$

where $H_i$ takes a value of 1 for a decision that the primary incumbent is present and a value of −1 for a decision where the primary incumbent is not present, $d_i$ represents the distance metric reported by the ith node, and $\alpha_\gamma$ represents a weight related to the use of memory from past decisions. The value of D may be compared to a specific set of thresholds in order for the DSM engine 210 to decide its next course of action. For instance, if the thresholds are (in increasing size), defined by $-t_1 < t_2$, then the DSM engine 210 may decide to proceed as follows. If $D < -t_1$, a primary incumbent may not be present on the band and the band may be declared to be free to use. If $-t_1 < t_2$, the DSM engine 210 extends the asynchronous sensing period. If $D > t_2$, a primary incumbent may be declared to be present on the band, and the band may be declared to be not usable (e.g., any CR nodes currently transmitting on that band may be asked to vacate to an unused band).

The DSM engine 210 may dynamically change the values of $t_1$ and $t_2$, which may not necessarily be equal, in order to ensure a decision that is, for example, biased to a high probability of false alarm. When the DSM engine 210 decides it needs to extend the asynchronous sensing period in order to achieve decisions having higher reliability from each of the CR nodes, it may behave in any number of ways depending on the configuration of the asynchronous sensing period sent on the control channel. For example, the CR nodes may be permitted to continue transmission on the band they are currently operating on until the DSM engine 210 makes the above decision. A new asynchronous silent period may then be triggered by the DSM engine 210, instructing the CR nodes to merge their processing with the previous period in order to obtain more reliable results. For another example, the CR nodes may stay silent while waiting for the decision from the DSM engine 210 as to whether the silent period needs to be extended. In this example, the CR nodes may continue sensing on the band of interest in the event that the silent period is extended by the DSM engine 210.

In this embodiment, the DSM engine 210 may also use memory from past decisions in its overall reliability computation and fusion scheme. An incorrect decision regarding the presence of a primary incumbent may eventually translate into a large number of errors or low throughput on the CR link where the primary incumbent resides. The DSM engine 210 may monitor the decisions obtained by each of the CR nodes in the case of an incorrect overall decision and may flag CR nodes that generated an incorrect decision (or contributed largely to the incorrect decision) so as to artificially decrease the reliability of these nodes for future decisions. A forgetting factor may be employed to gradually reduce the artificial decrease in reliability from these CR nodes so as to account for mobility over the long-term. This technique may allow the exclusion of CR nodes that may be exposed to a large amount of shadowing by making use of the knowledge of the incorrectness of a decision by the DSM engine 210 that may occur occasionally.

In order for fusion of sensing information to result in a better estimate of the presence of a primary incumbent on a given spectrum and, thus, to decrease the required sensing sensitivity of the individual CR nodes, the DSM engine 210 may ensure that the sensing information received from each CR node is uncorrelated (i.e., to or more nodes providing sensing information or sensing decisions are not both located simultaneously in a fade with respect to the primary incumbent). As long as each additional CR node that contributes to a cooperative sensing framework is uncorrelated with the other CR nodes, adding the decision or information from the additional CR nodes may increase the performance of a fused decision made by the DSM engine 210. Therefore, the fusion of the sensing information by the DSM engine 210 may assume a minimum amount of correlation between the CR nodes that participated in the sensing task. In order to achieve this, the DSM engine 210 may perform an initial phase of determining the CR nodes that are uncorrelated in the network using sensing information received during periodic sensing periods.

Periodically, each CR node may send sensing information to the DSM engine 210. The DSM engine 210 may use this sensing information to determine which of the nodes in the network are uncorrelated so that future information from uncorrelated nodes may be used for fusion. In addition, when two or more nodes are determined to be correlated, future sensing tasks performed by these nodes may be divided so as to achieve faster sensing for a particular set of bands or battery savings for the correlated nodes that may share the sensing load for a set of bands. The DSM engine 210 may do this by maintaining a list of correlated and uncorrelated CR nodes or by assigning a correlation coefficient to each pair of CR nodes. This list or set of correlation coefficients may then be used by the DSM engine 210 to determine, for example, which CR nodes' sensing results may be combined/fused to obtain a single decision about the presence or absence of a primary incumbent on a particular band and which CR nodes may instead cooperate in order to split the sensing task over multiple bands and assigning each CR node a subset of the bands. Any number of methods may be used to determine the amount of correlation between CR nodes including, for example, basic RSSI scanning using AGC gain, use of filter banks, echoing, location information and signaling of triplets.

For basic RSSI scanning using AGC gain, each CR node may send a set of received signal strength indicator (RSSI) values for a wide range of frequencies that it senses to the DSM engine 210. The RSSI at each frequency may be obtained as the inverse of the settled AGC gain for the radio of that CR node at the frequency of interest. The DSM engine 210 may then perform a correlation of the sequences of RSSI values obtained from each CR node to come up with a list of uncorrelated nodes to use for fusion. CR nodes whose observed RSSI sequences are highly correlated may be expected to yield sensing results that are highly correlated as well.

FIG. 8 is a diagram of a filter 800 that may be used in an example of a basic RSSI scanning using AGC gain technique. In the example of the basic RSSI scanning using AGC gain technique, each CR node may send a power spectral estimate using a filter bank technique of power spectrum estimation to the DSM engine 210. In the filter bank technique of spectral estimation, the received signal x(n) may be filtered by a filter. The output of each filter may represent the signal component of the received signal in a particular sub-band, and the estimated power spectral density may be obtained by an estimate of the signal power measured at each of the outputs of the filter bank PSD(0), PDS($f_1$) and PSD($F_{N-1}$).

The CR nodes may periodically send the set of output powers as a sequence to the DSM engine 210, and the DSM engine 210 may compute the correlation between these two sequences to determine the amount of correlation between CR nodes. In addition, because these outputs represent estimates of the power spectral density, they may also be used as a coarse (initial) estimate of the observation spectrum needed to find potential spectral holes or bands for use by the CR nodes.

For an echoing method, the DSM engine 210 may use a silent period to generate a special beacon that may be broadcast to each node in the network. Each node may listen for the beacon for a prescribed period of time and then retransmit the received beacon to the DSM engine 210 using the uplink control channel Ad. The DSM engine 210 may use the signals received from each CR node to determine an amount of correlation between each of the CR nodes that echoed the received beacon. In particular, correlated CR nodes may echo the beacon back with a similar fade in a particular frequency or both with a large amount of attenuation (e.g., indicating both CR nodes may be exposed to the same shadowing).

For a location information method, geographical location information may indicate an amount of correlation between CR nodes performing sensing. In the case of a CR network where nodes are equipped with a global positioning system (GPS) or other location indication means, the DSM engine 210 may use the location information to generate a list of correlated and uncorrelated CR nodes. In general, uncorrelated CR nodes may be geographically furthest from each other while correlated CR nodes may be close to each other.

For a signaling of triplets method, a probability of detection of signal (Pa) may have a one-to-one mapping to an SNR observed at each CR node. Therefore, signaling the $P_d$ to the DSM engine 210 for each band may help the DSM engine 210 identify not only the SNR at each node but also a coarse map of the correlation of observed signals between CR nodes. Each CR node in the network may send sensing information triplets {$f_c$, B, $P_d$} for each band representing the band center frequency, bandwidth and probability of detection, respectively. For each band, the DSM engine 210 may map the maximum value of all $P_d$ signals (sent from all nodes) to one of three levels: (0 to x %), (x % to y %) and (y % to 100%). If the maximum $P_d$ lies in the (0 to x %) level, the band may be assumed to be empty for use within the network. If the maximum $P_d$ lies in the (x % to y %), it may be assumed to be usable within the network but with some transmit power restriction based on the $f_c$ under consideration and the known signal propagation characteristics. If the maximum of $P_d$ lies in the (y % to 100%), the band may be occupied and restricted from use within the network. The x % threshold may be chosen as the maximum false alarm probability limit. The y % threshold may be chosen differently for each band. The y % threshold may be chosen higher (closer to 100%) if the band under consideration is at lower frequencies while the y % threshold may be chosen lower (away from 100%) at higher frequency bands.

At the end of the correlation determination stage, the DSM engine 210 may have a list of CR nodes that are either uncorrelated or weakly correlated with each other and a list of CR nodes that have strong correlation with one or more of the CR nodes in the uncorrelated list. The DSM engine 210 may perform fusion of sensing results from the information received during the first stage of sensing as well as the sensing information from the second stage of sensing performed during the system-wide silence period using the set of uncorrelated CR nodes.

In addition, the presence of correlated CR nodes may allow the DSM engine 210 to split the work of sensing in the system-wide silence period between CR nodes in order to shorten the sensing period, if possible, or to save battery power for certain CR nodes. This may be achieved by splitting the sensing task to be performed by each CR node in the cooperative sensing framework between the CR nodes that fall into a correlation group (e.g., a group of CR nodes shown to be highly correlated with one another). The sensing band may be divided evenly and sensed separately by each CR node in the correlation group. In addition, in a case where the DSM engine 210 uses soft information for fusion, the CR nodes in the correlation group may all contribute equally in order to generate the required soft information. The correlation determination stage may be repeated occasionally by the DSM engine 210 to account for changes in the correlation between CR nodes caused by movement of the CR nodes or obstacles within the network.

The DSM engine 210 may use techniques to further decrease the amount of correlation between nodes that it initially found to be correlated. These techniques may be used to increase the number of CR nodes that may contribute to the cooperative sensing result.

In the case of the periodic silent period, CR nodes may be asked to perform their sensing in alternating silent periods and perform no work in the other silent period. This may extend the overall time required to obtain information from these two nodes (for both sensing and future correlation statistics). However, it may increase the probability that the two CR nodes become decorrelated. If decorrelation may be achieved through a time skew, the same time skew may then be applied in the context of the asynchronous silent periods when those two CR nodes are involved.

FIG. 9 is a diagram 900 illustrating a possible implementation of a time skew between CR nodes in the case of a periodic sensing stage. In the illustrated example, CR nodes 1 and 2 have been found to be highly correlated and CR nodes 3 and 4 have been found to be highly correlated. The DSM periodic sensing schedule is illustrated at 901 and includes sensing periods 902*a*, 902*b* and 902*c*. Each sensing period includes a respective sensing time 904*a*, 904*b* and 904*c* and a respective regular transmit/receive time 906*a*, 906*b* and 906*c*. As illustrated by schedules 950 and 970, the sensing times of nodes 1 and 2 and those of nodes 3 and 4 are separated in time, as the DSM engine 210 attempts to decrease the correlation between the CR nodes, thus decreasing the correlation that the sensing results will give. Time periods where CR nodes are idle may be used to conserve battery power for those CR nodes. In the illustrated example, the CR nodes 1 and 3 may sense the spectrum during sensing times 904*a* and 904*c* and may be idle during sensing time 904*b*. The CR nodes 2 and 4 may be idle during the sensing times 904*a* and 904*c* and may sense the spectrum during sensing time 904*b*.

Where a CR node is equipped with a multi-antenna sensing equipment, the DSM engine 210 may change the antenna beamforming angle through the use of a control message for one of two correlated CR nodes on the downlink control channel in order to decrease the correlation between the CR nodes. This may force correlated CR nodes to focus on a different geographical area in its vicinity and thus decrease the chance that both CR nodes experience shadowing from the same primary incumbent at the same time. Another way of viewing the change in beamforming angle between CR nodes may be to consider this as increasing a special diversity of sensing results sent by two different CR nodes.

Coarse sensing results that are used to determine a correlation between CR nodes may also be used to form a list of potential available spectrum for transmission, which may be referred to as a set of spectral holes. The DSM engine 210 may use a combination of coarse sensing, which may be performed using one of the methods described above for determining the periodogram (PSD) or using a more traditional method such as FFT-based spectral estimation, as well as a fine sensing method in order to determine and maintain a list of available bands to be used on-demand by a CR node.

Coarse sensing, performed periodically, may be used to obtain a list of potential spectral holes by identifying the valleys of the PSD. A list of these holes, each identified by the minimum and maximum frequency of the hole, may be maintained by the DSM engine 210 after processing the coarse sensed information from each of the CR nodes involved in coarse sensing of the entire CR network bandwidth. The list of potential spectral holes may be updated each time the DSM engine 210 receives new coarse sensing information.

In order to determine the usable bandwidth for the CR network, each spectral hole in the list of potential holes may be tested using a fine sensing algorithm performed on the specified bandwidth by one or more of the CR nodes. The fusion methods described above may be used to fuse information if multiple nodes are instructed to perform fine sensing on the same spectral hole by the DSM engine 210. The end result of the fine sensing and fused information may include determining whether a given potential spectral hole is usable by a CR node. The DSM engine 210 may then add this hole to the list of available spectrum for use by any CR node.

Depending on size and bandwidth demands of the CR network and current spectrum availability, the DSM engine 210 may maintain a list of usable spectral bands that may be assigned to a CR node at any request for bandwidth. Each usable spectral band may have a lifetime associated with it from the perspective of the DSM engine 210. When the lifetime of a usable spectral band expires, the DSM engine 210 may trigger an asynchronous sensing period to perform fine sensing on that band and determine whether the band is still usable. As new coarse sensing information is received by the DSM engine 210, this may also trigger fine sensing on usable spectral bands if the PSD information indicates these usable spectral bands may now be occupied. Reliable spectral bands may be fixed size or variable size, depending on factors such as the implementation of the sensing algorithms in each CR node and the bandwidth allocation method to be used by the DSM engine 210 and the CR nodes.

Figure 10:
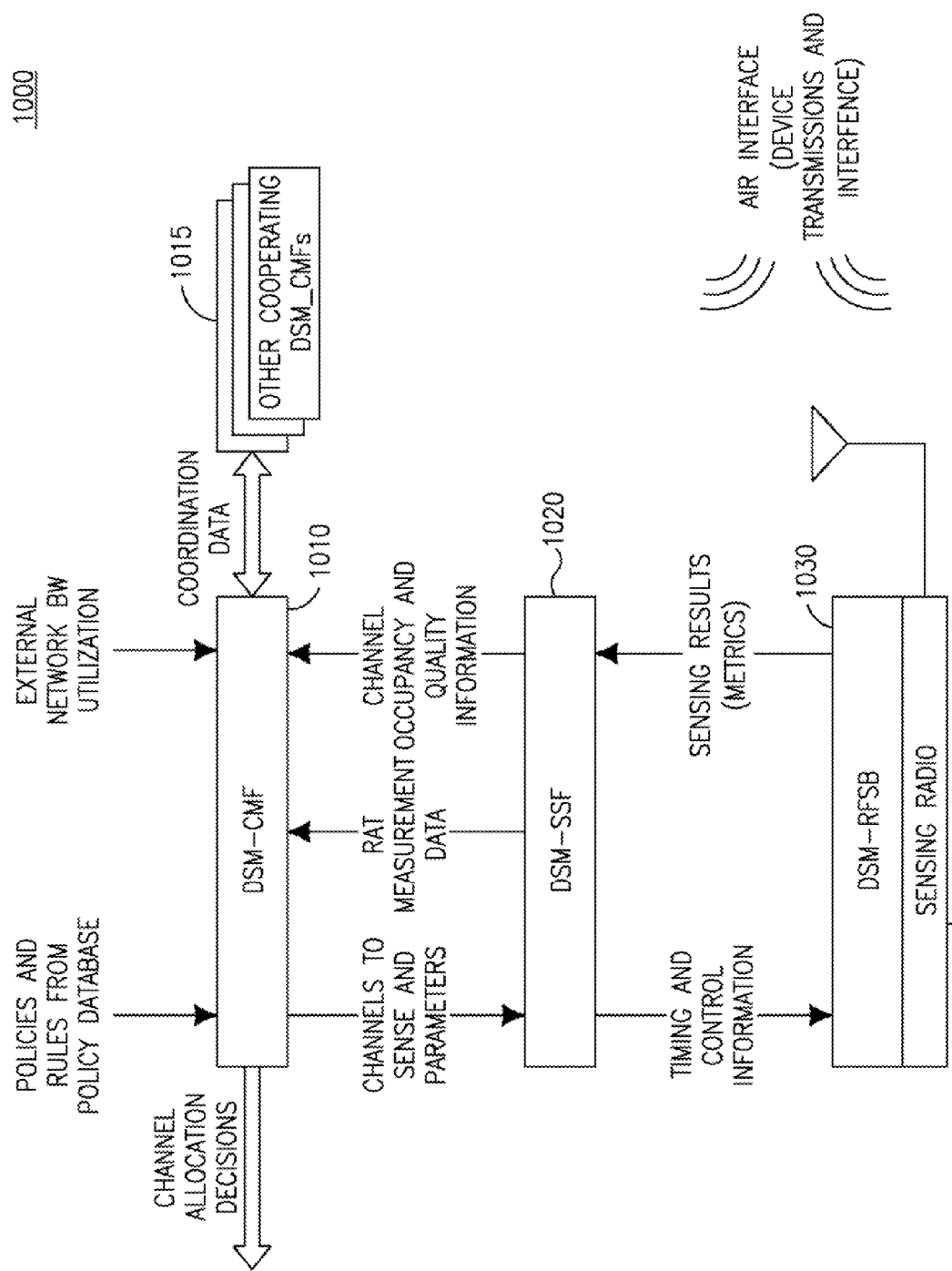
FIG. 10 is a block diagram of an example architecture for executing spectrum sensing in a DSM network.

FIG. 10 is a block diagram of an example architecture 1000 for executing spectrum sensing within a single specific sensing node in a DSM network (e.g., the DSM network 200 of FIG. 2). The architecture 1000 illustrated in FIG. 10 includes three logical entities: a DSM-Radio Frequency Sensing Board (DSM-RFSB) 1030, a DSM-Spectrum Sensing Function (DSM-SSF) 1020 and a DSM-Channel Management Function (DSM-CMF) 1010. A physical location of these entities within a DSM network may depend on a particular design and implementation. By way of example, for the DSM network 200 illustrated in FIG. 2, the DSM-RFSB 1030 may be included in a CR (e.g., included in WTRUs 230a, 230b, 230c and 230d of FIG. 2) and the DSM-SSF 1020 and the DSM-CMF 1010 may be included in the DSM engine 220. However, the functionalities illustrated in FIG. 10 may be split amongst (or located in a single) WTRU, DSM engine, AP, or any other device, and the examples described with respect to FIGS. 10-26 may apply regardless of the physical location of each of these functional entities.

The illustrated DSM-RFSB 1030 is a logical entity that may perform basic spectrum sensing of a particular bandwidth. The spectrum sensing may include, for example, collecting samples on a specific frequency band and applying one or more spectrum sensing algorithms to provide a sensing metric for a frequency band of interest. The specific frequency band, sensing algorithms and other timing and control information may be provided by the DSM-SSF 1020 to the DSM-RFSB 1030 in a sensing frequency message such as the sensing configuration message 614 illustrated in FIG. 6A.

The DSM-RFSB 1030 may include physical hardware equipped with a sensing radio 1032, which may operate to detect device transmissions and interference in frequency bands where the spectrum sensing is to be performed, down-conversion hardware, which may generate baseband samples, and a sensing algorithm, which may process the generated baseband samples to derive a metric for the band of interest. The DSM-RFSB 1030 may provide the derived metric for the band of interest to the DSM-SSF 1020. Processing that the DSM-RFSB 1030 may use to derive the metric may be such that information exchanged between the DSM-RFSB 1030 and the DSM-SSF 1020 may be compact and minimal.

The DSM-SSF 1020 is a logical entity that may control the DSM-RFSB 1030 and the sensing algorithm that is part of the DSM-RFSB 1030. The DSM-SSF 1020 may configure the bandwidth to be sensed by the DSM-RFSB 1030 and may receive the corresponding channel metric indications for each of these bands. To maintain a modular architecture, for example, the DSM-RFSB 1030 may be equipped with generic sensing capabilities, and the DSM-SSF 1020 may refine or customize the generic sensing capabilities of the DSM-RFSB 1030 for a particular application (e.g., by transmitting a sensing configuration message 614 to the DSM-RFSB 1030). For example, if a particular DSM application requires sensing over a set of 6 MHz channels in the television white space (TVWS), a DSM-RFSB 1030 having a radio capable of operating in the very high frequency (VHF) and ultra high frequency (UHF) bands, may be chosen, and the DSM-SSF 1020 may control the DSM-RFSB 1030 to capture spectrum sensing results that reflect these 6 MHz channels. The DSM-SSF 1020 may make a decision as to usability or occupancy of a spectrum and may convey that decision (including, for example, channel occupancy information, quality information and RAT data measurements) to the DSM-CMF 1010.

The DSM-CMF 1010 may oversee management of the bandwidth for a particular technology employing DSM. For example, the DSM-CMF 1010 may include (or obtain from an external entity or database) a list of available channels that the network may use and the bandwidths associated with each channel on the list. The DSM-CMF 1010 may communicate the channel bandwidths and other parameters to the DSM-SSF 1020, which may decide which bands are unoccupied and may provide a quality associated with each band. The DSM-CMF 1010 may decide on a bandwidth to be used by the system based on the occupancy and quality information obtained from the DSM-SSF 1020, policy rules associated with the bandwidth (e.g., FCC regulatory rules) and a recent occupancy history for each band being considered for use. The DSM-CMF 1010 may then provide channel allocation decisions to WTRUs in the network. The DSM-CMF 1010 may also exchange coordination data with other cooperating DSM-CMFs 1015.

Figure 11:
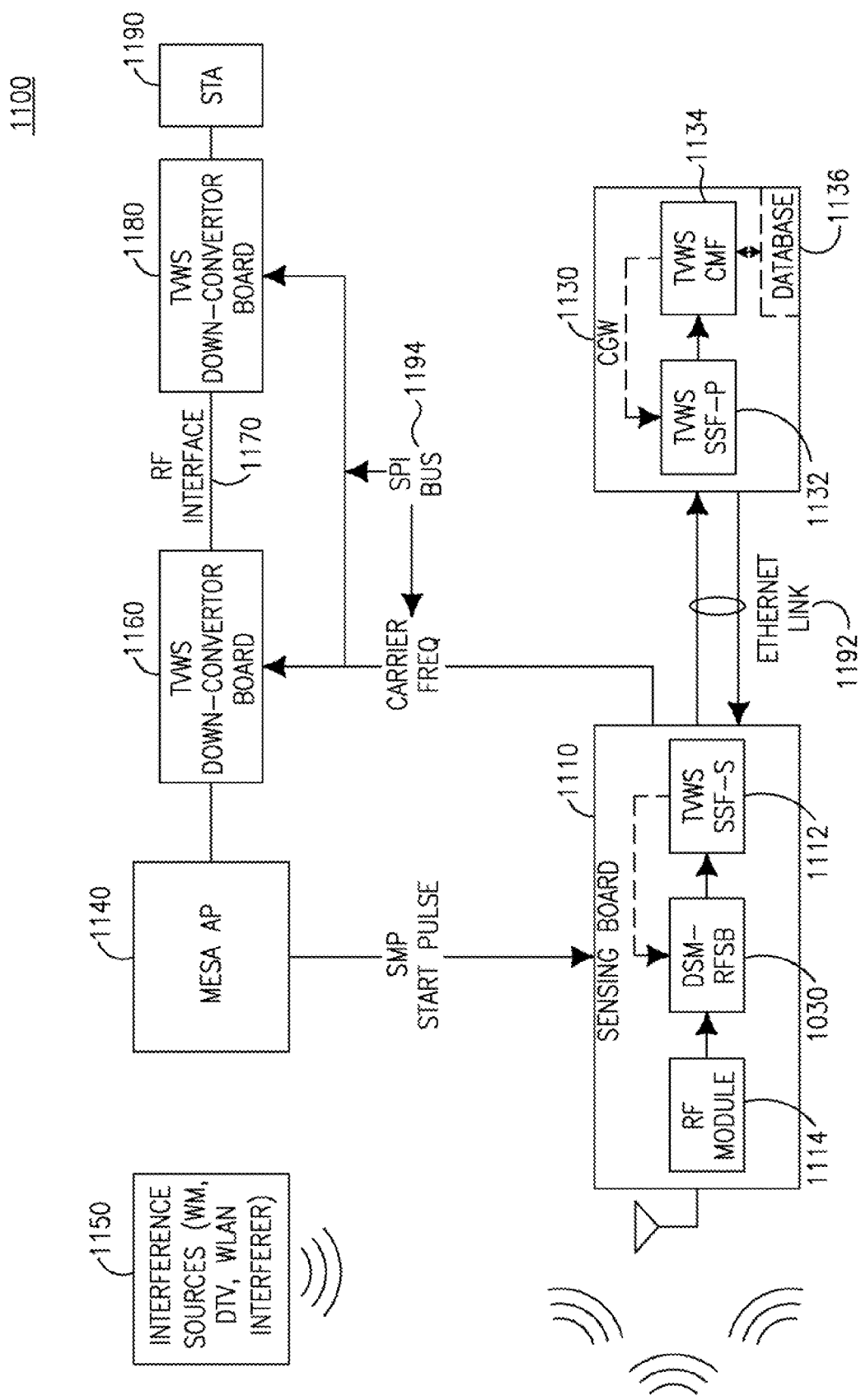
FIG. 11 is a block diagram of an example TVWS implementation of the architecture illustrated in FIG. 10 for executing spectrum sensing in a DSM network.

FIG. 11 is a block diagram of a TVWS implementation 1100 of the architecture 1000 illustrated in FIG. 10 for executing spectrum sensing in a DSM network. The example architecture includes a WiFi or mesh station (STA) 1190 that may require allocation of bandwidth for communication over TVWS bands with an access point (AP) 1140, a sensing board 1110 and a CGW 1130. The illustrated AP 1140 and STA 1190 are configured to communicate over an RF interface 1170 and make use of TVWS down-converter boards 1160 and 1180, which are in communication with the sensing board 1110 via an SPI bus 1194.

In the illustrated example architecture 1100, a channel selection and channel switch decision may be made, in certain conditions, directly at the sensing board 1110. In this example, the task of the DSM-SSF 1020 of FIG. 10 is split in a logical manner between a switch entity (TVWS SSF-S 1112) that resides on the sensing board 1110 and a switch entity (TVWS-SSF-P 1132) that resides in the CGW 1130. The TVWS-CMF 1134 of the CGW 1130 may perform the basic functionality of the DSM-CMF 1010 of FIG. 10 but targeted toward the TVWS. The illustrated CGW 1130 also includes a database 1136 from which policy rules and other required data may be retrieved and stored. The functionality of the DSM-RSB 1030 is included on the sensing board 1110 in the example architecture. The illustrated sensing board 1110 also includes an RF module 1114, which may correspond, for example, to the sensing radio 1032 illustrated in FIG. 10. The RF module 1114 may measure, for example, interference and spectrum usage from other devices, such as interference sources 1150.

FIGS. 12-17 are signal diagrams illustrating example message flows between a down-converter 1200 (which may include, for example, TVWS down-converter boards 1160 and 1180), the sensing board 1110 and the CGW 1130 illustrated in FIG. 11. Signaling messages 1202 and 1204 may be exchanged between the down-converter 1200 and the sensing board 1110 and between the sensing board 1110 and the TVWS-SSF-P 1132, respectively. Messages 1206 may be exchanged between the TVWS-SSF-P 1132 and the TVWS-CMF 1134.

Figure 12:
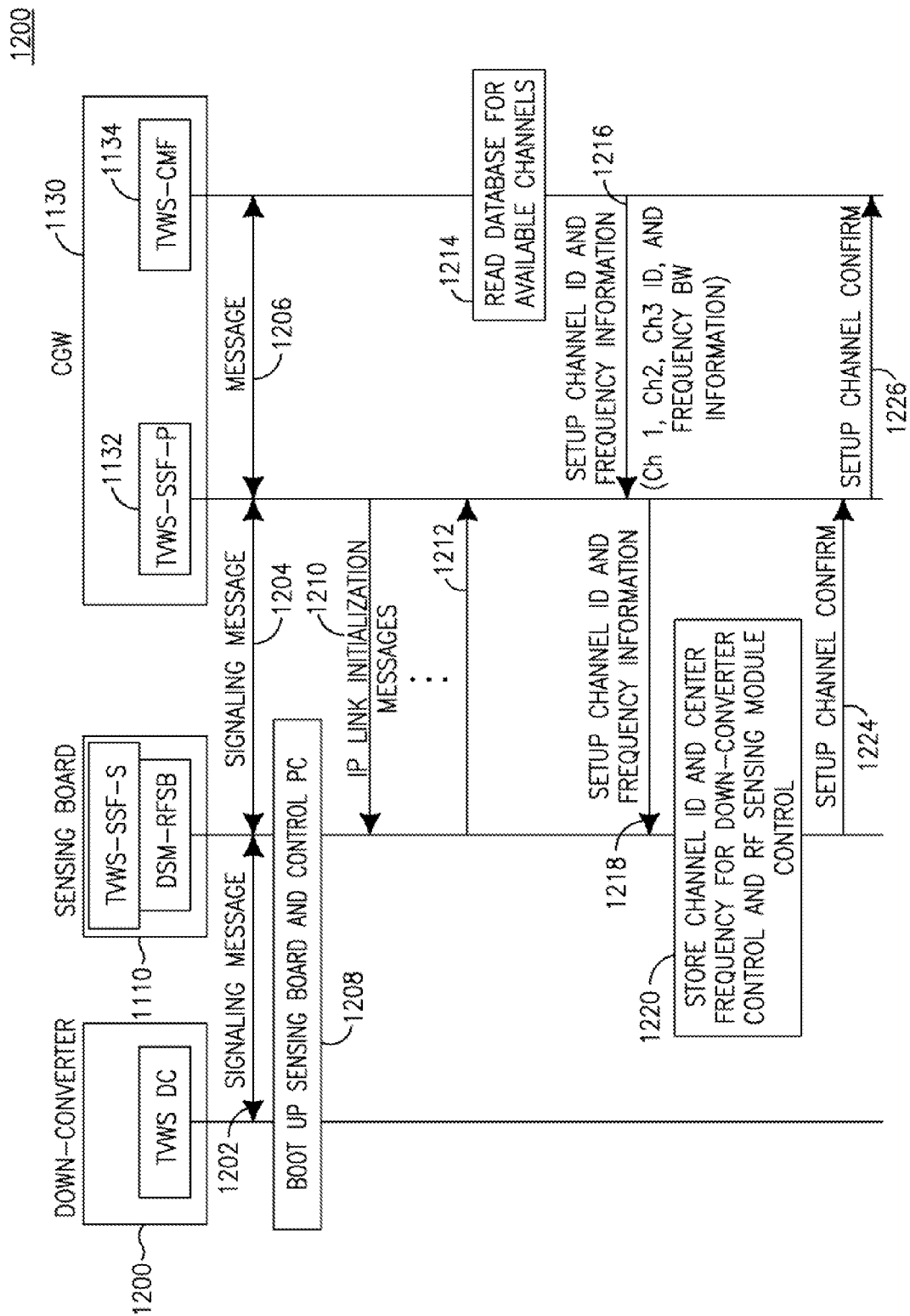
FIGS. 12-17 are signal diagrams illustrating example message flows between a down-converter, a sensing board and a convergence gateway (CGW)

FIG. 12 illustrates example call flows 1200 for a first step of system initialization. Following boot-up of the sensing board 1110 and/or CGW 1130 (1208), the sensing board 1110 may establish an IP link with the CGW 1130 by attaching to the CGW 1130 and advertising its services as a sensing-only device in IP link initialization messages (represented by 1210 and 1212). Once the sensing board 1110 is attached to the CGW 1130, the CGW 1130 may read the database 1136 for available channels (1214) and configure the sensing board 1110 with channels that are available for use by the AP 1140 using a setup channel ID and frequency information message (represented by 1216 and 1218). This message may attach a channel ID to each channel and associate the RF parameters (e.g., center frequency and sensing bandwidth) to be used when sensing this channel. The sensing board 1110 may store the channel ID and center frequency information (1220) and send a channel setup confirm message to the CGW 1130 (represented by 1224 and 1226).

Figure 13:
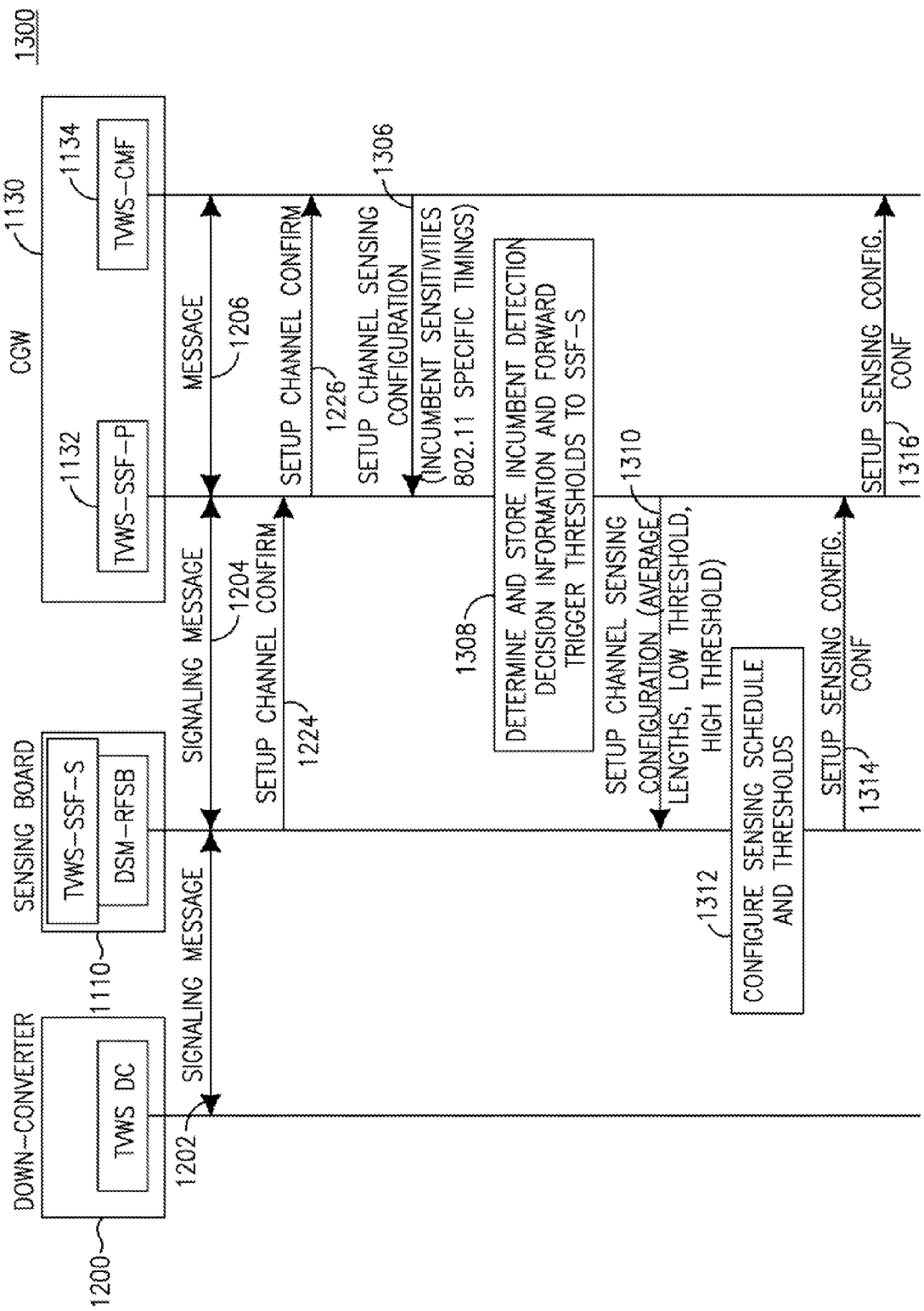

FIG. 13 illustrates example call flows 1300 for a second step of system initialization. Following configuration of the basic channels to sense in the first step of the initialization process illustrated in FIG. 2, the CGW 1130 may proceed to configure threshold averaging lengths to be used in each channel by the sensing board 1110 (1306). These parameters may control sensing trigger decisions made by the TVWS-SSF-S 1112 (i.e. when the TVWS-SSF-S 1112 may notify the TVWS-SSF-P 1132 of the presence of an interferer and when the TVWS-SSF-S 1112 may trigger a channel switch independently). The TVWS-CMF 1134 may provide specific information to the TVWS-SSF-P 1132 related to types and sensitivities of incumbents expected on each of the channels, which may allow the TVWS-SSF-P 1132 to determine the presence of an incumbent and store incumbent detection decision information (1308). The TVWS-SSF-P 1132 may also forward trigger threshold to the TVWS-SSF-S 1112 (1308) and send a setup channel sensing configuration message to the sensing board 1110 including averaging lengths and low and high thresholds (1310). The sensing board 1110 may then configure a sensing schedule and thresholds (1312). Once the setup is complete, the sensing board 1110 may send a setup sensing configuration confirm message to the CGW 1130 (represented by 1314 and 1316).

Figure 14A:
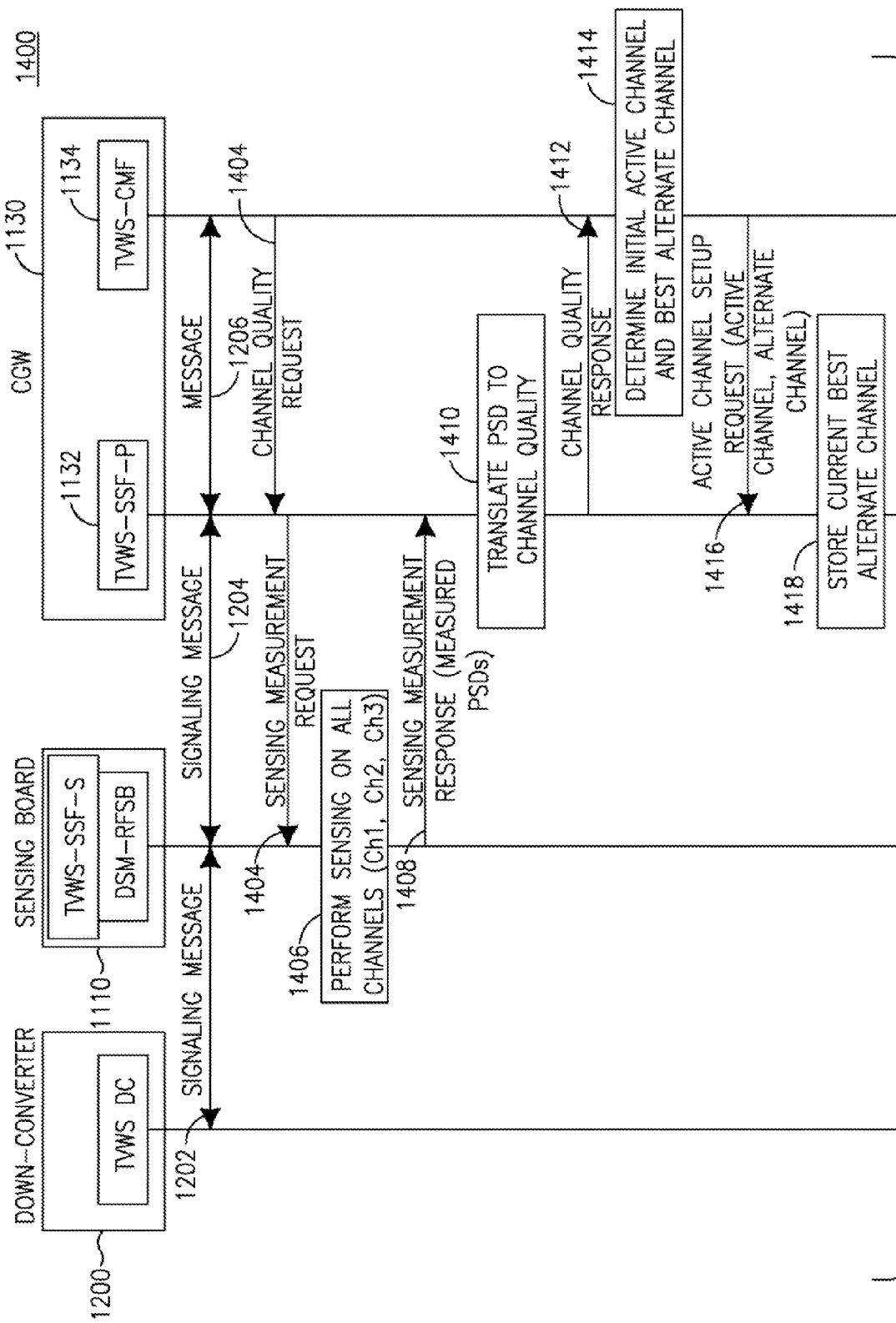

FIG. 14 illustrates example call flows 1400 for initial channel selection. The TVWS-CMF 1134 may send a channel quality request message to the TVWS-SSF-P 1132 (1404), and the TVWS-SSF-P 1132 may in turn send a sensing measurement request to the sensing board 1110 (1402). In response, the sensing board 1110 may perform sensing on all channels (1406) and send a sensing measurement response message including, for example, measured PSDs to the TVWS-SSF-P 1132 (1408). The TVWS-SSF-P 1132 may translate the PSD received in the sensing measurement response message to channel quality (1410) and transmit a channel quality response message to the TVWS-CMF 1134 (1412). The TVWS-CMF 1134 may then determine an initial active channel and best alternate channel based on, for example, information received in the channel quality response message (1414).

The TVWS-CMF 1134 may send an active channel setup request message including information about the determined active channel and best alternate channel to the TVWS-SSF-P 1132 (1416). The TVWS-SSF-P 1132 may store the current best alternate channel information (1418) and send an active channel setup request including the determined active channel and best alternative channel to the sensing board 1110 (1420). The sensing board 1110 may store the current best alternate channel information (1422), send a frequency change command to the down-converter 1200 to change a channel for communication between the AP 1140 and the STA 1190 (1424), and send an active channel setup confirmation message to the CGW 1130 (1426). In response to receiving the frequency change command message, the down-converter 1200 may change the operating frequency for communication between the AP 1140 and the STA 1190 (1434).

The sensing board 1110 may start continuous high-priority sensing on the active channel (1430) and start low-priority sensing on the other channels when it is not busy with the active channel (1432). The sensing board 1110 may then send alternate channels measurement results to the TVWS-SSF-P 1132, which may include an averaged PSD for the low priority channels (represented by 1436 and 1438).

For the example illustrated in FIG. 14, it may be assumed that communication between the AP 1140 and the STA 1190 does not occur prior to the configuration of the sensing board 1110. As a result, selection of the initial active and alternate channels may occur during the initialization. In another embodiment where a sensing board 1110 may be optional and a video link may be established prior to boot up of the sensing board 1110, the TVWS-CMF 1134 may not send a channel quality request message (1404). Instead, it may send an active channel setup request message (1416) to configure the active and alternate channel to be used by the TVWS-SSF-S 1112 during sensing and switch decisions.

Figure 15A:
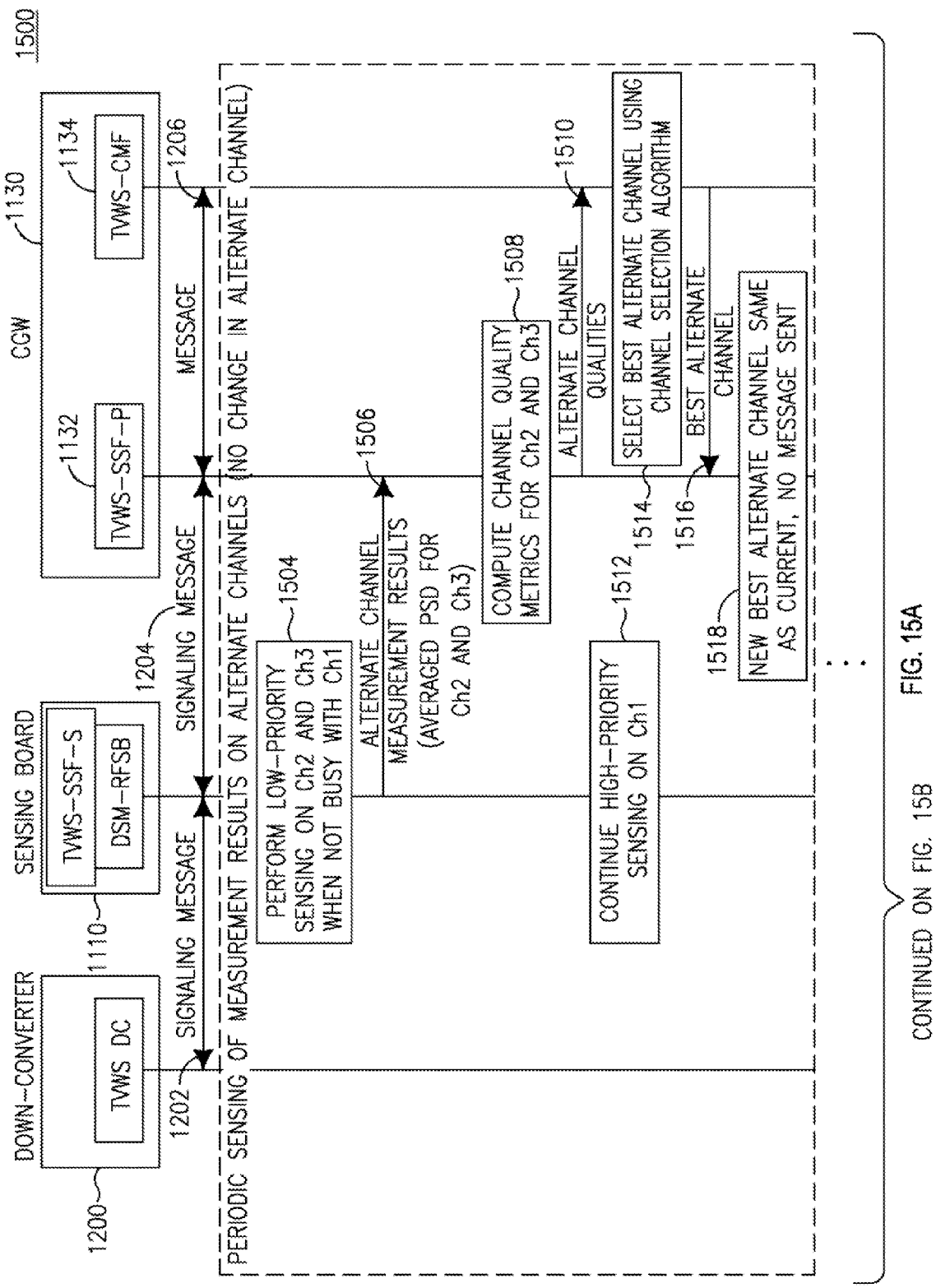
Figure 15B:
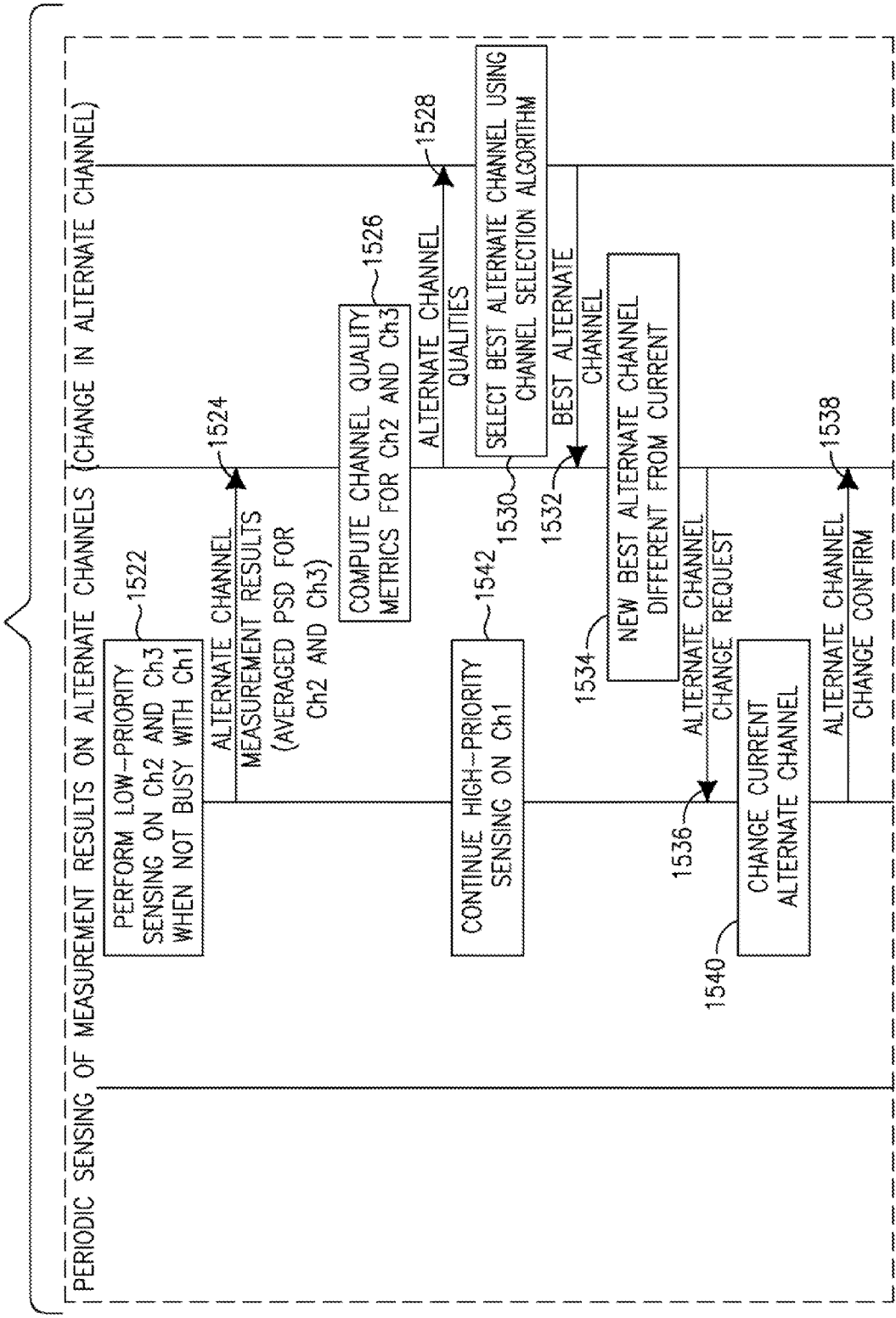

FIG. 15 illustrates example call flows 1500 for normal call operation. During normal operation, the TVWS-SSF-S 1112 may coordinate sensing on the active and alternate channels according to a silent period provided by the AP 1140 and STA 1190 to perform the active channel sensing. This may include periodic sensing on alternate channels. The TVWS-SSF-S 1112 may continuously monitor the active channel sensing results by comparing them with the configured trigger threshold (1512 and 1542). In addition, the TVWS-SSF-S 1112 may perform low-priority sensing on the alternative channels (1504 and 1522) and send alternate channel sensing results to the TVWS-SSF-P 1132 via alternate channel measurement results messages (1506 and 1524). The TVWS-SSF-P 1132 may perform processing on these measurement results (1508 and 1526) and send information about alternate channel qualities to the TVWS-CMF 1134 (1510 and 1528), which may compare the qualities of the different alternate channels to determine a new best alternate channel (1514 and 1530). The new best alternate channel may be used in case of a channel switch due to interference or an incumbent on the active channel. The TVWS-CMF 1134 may also use other rules specified by the FCC for use of the TVWS to make its decision on the alternate channel (e.g. a recently used TVWS channel must be free for a certain period of time before it is used for transmission). At least because the TVWS-SSF-S 1112 requires knowledge of the alternate channel, the TVWS-CMF 1134 may send its decision to the TVWS-SSF-P 1132 (1516 and 1532), which may forward it (1536) to the TVWS-SSF-S 1112 if the new alternate channel is different than the previous alternate channel (1534). If the new best alternate channel is the same as the previous alternate channel, the information may not be forwarded (1518). If new alternate channel information is sent to the TVWS-SSF-S 1112, the TVWS-SSF-S 1112 may change the current alternate channel (1540) and send an alternate channel change confirmation message to the TVWS-SSF-P 1132 (1538).

Figure 16:
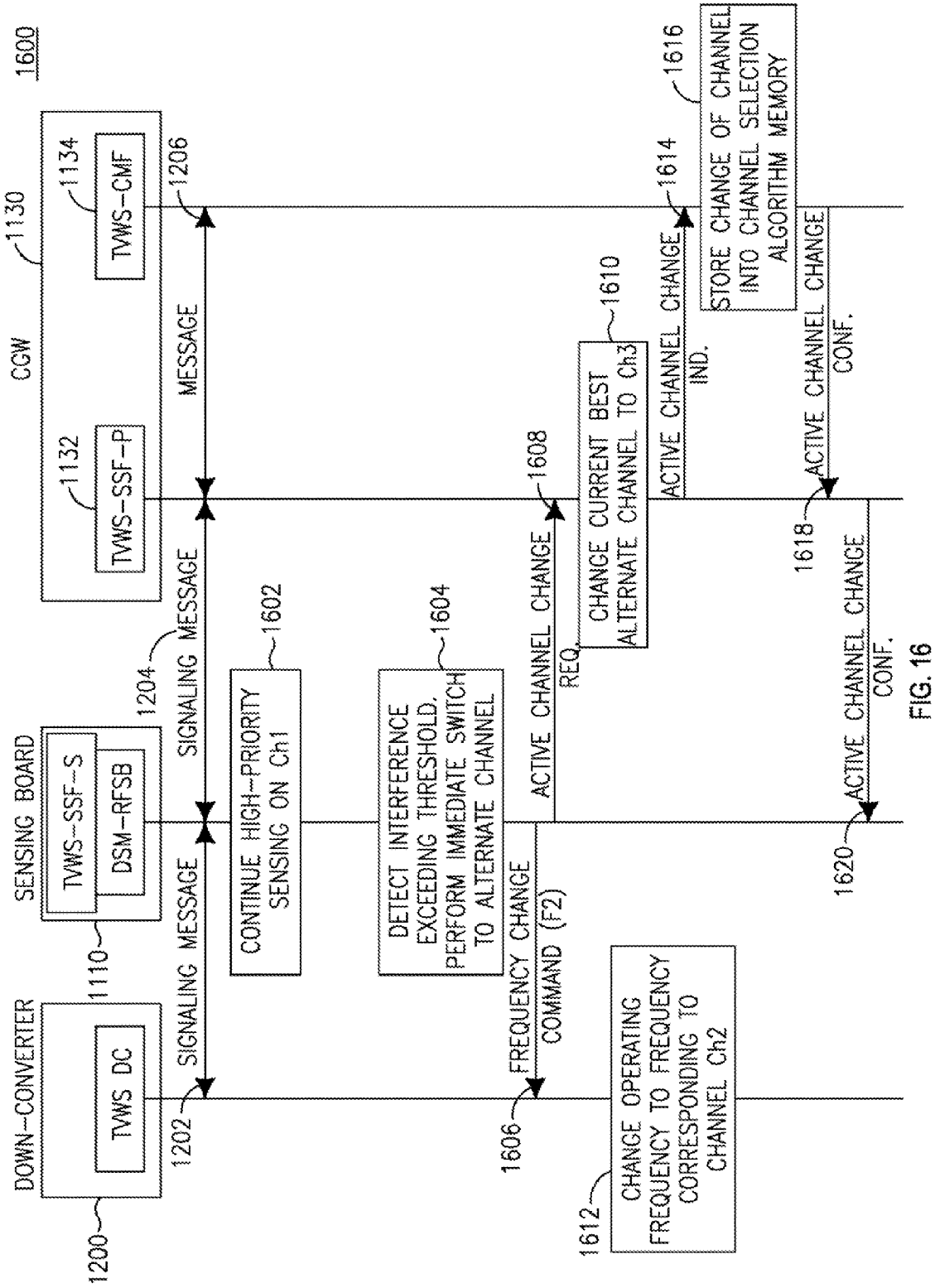

FIG. 16 illustrates example call flows 1600 for originated channel switching. During a TVWS-SSF-S 1112 originated channel switch, the TVWS-SSF-S 1112 (which may control the down-converter on the AP 1140 and STA 1190 itself) may determine the presence of a strong interferer on the active channel that may compromise the connection between the AP 1140 and STA 1190 (1604) during its continuous high priority sensing on the active channel (1602). Such strong interferer may be detected on the active channel when the sensing results pass a high threshold set by the TVWS-SSF-P 1132. The TVWS-SSF-S 1112 may then command an immediate switch to the alternate channel provided by the TVWS-CMF 1134 (1606). The down-converter 1200 may then change its operating frequency (1612). Following the frequency switch, TVWS-SSF-S 1112 may notify the TVWS-CMF 1134 and the TVWS-SSF-P 1132 of the change in the active channel using an active channel change request message (1608). This example uses a total of three channels and, therefore, the new alternate channel is known by all parties by default. In an embodiment where more than three channels are used, the alternate channel chosen by the TVWS-CMF 1134 may be communicated to the other entities using corresponding confirm messages.

The TVWS-SSF-P 1132 may change its current best alternate channel (1610) and send an active channel change indication message to the TVWS-CMF 1134 (1614). The TVWS-CMF 1134 may store the change of channel information into a channel selection algorithm memory (1616) and send an active channel change confirmation message to the sensing board 1110 (represented by 1618 and 1620). The sensing board 1110 may then change its current best alternate channel (1622).

Figure 17A:
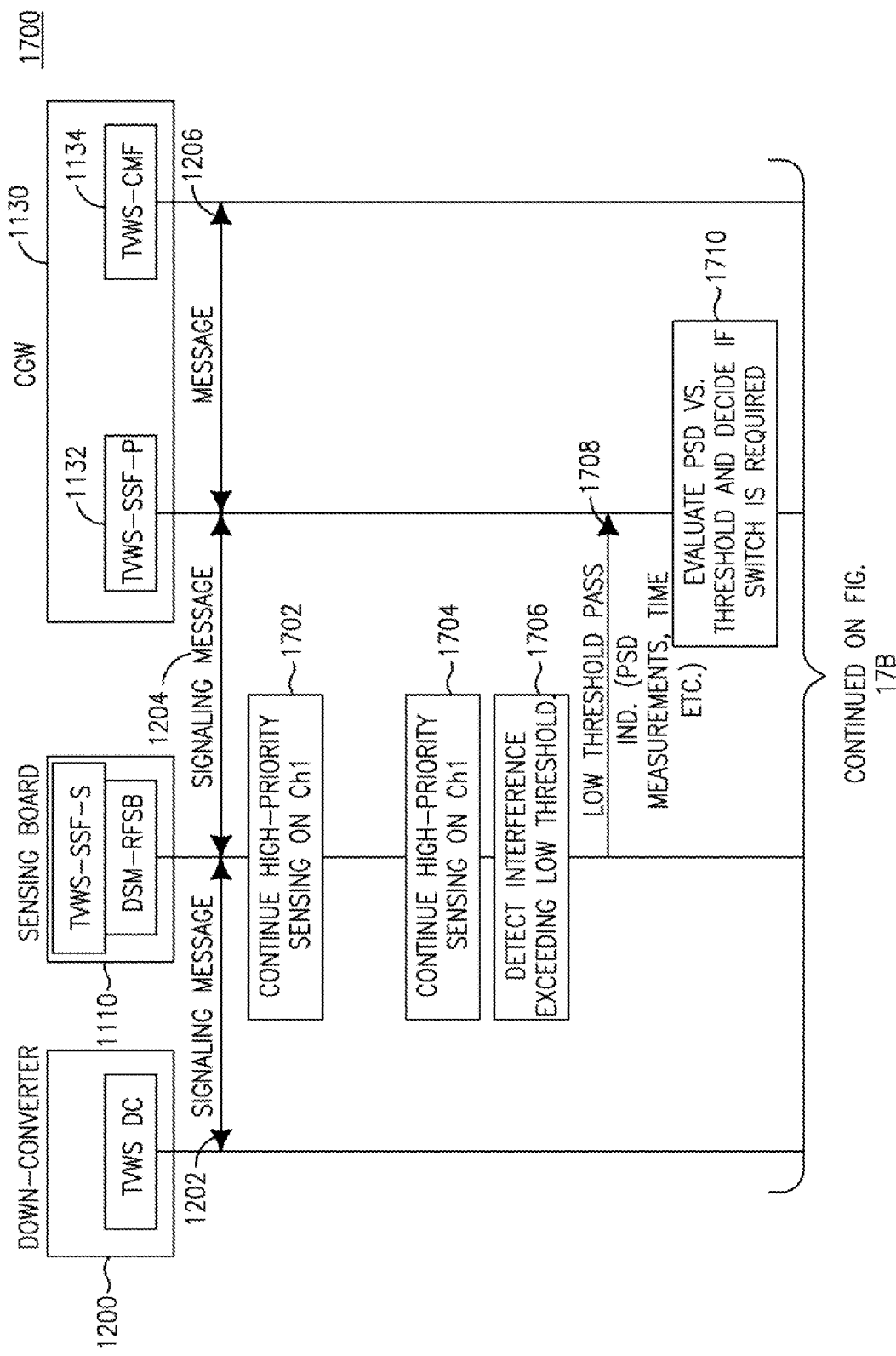
Figure 17B:
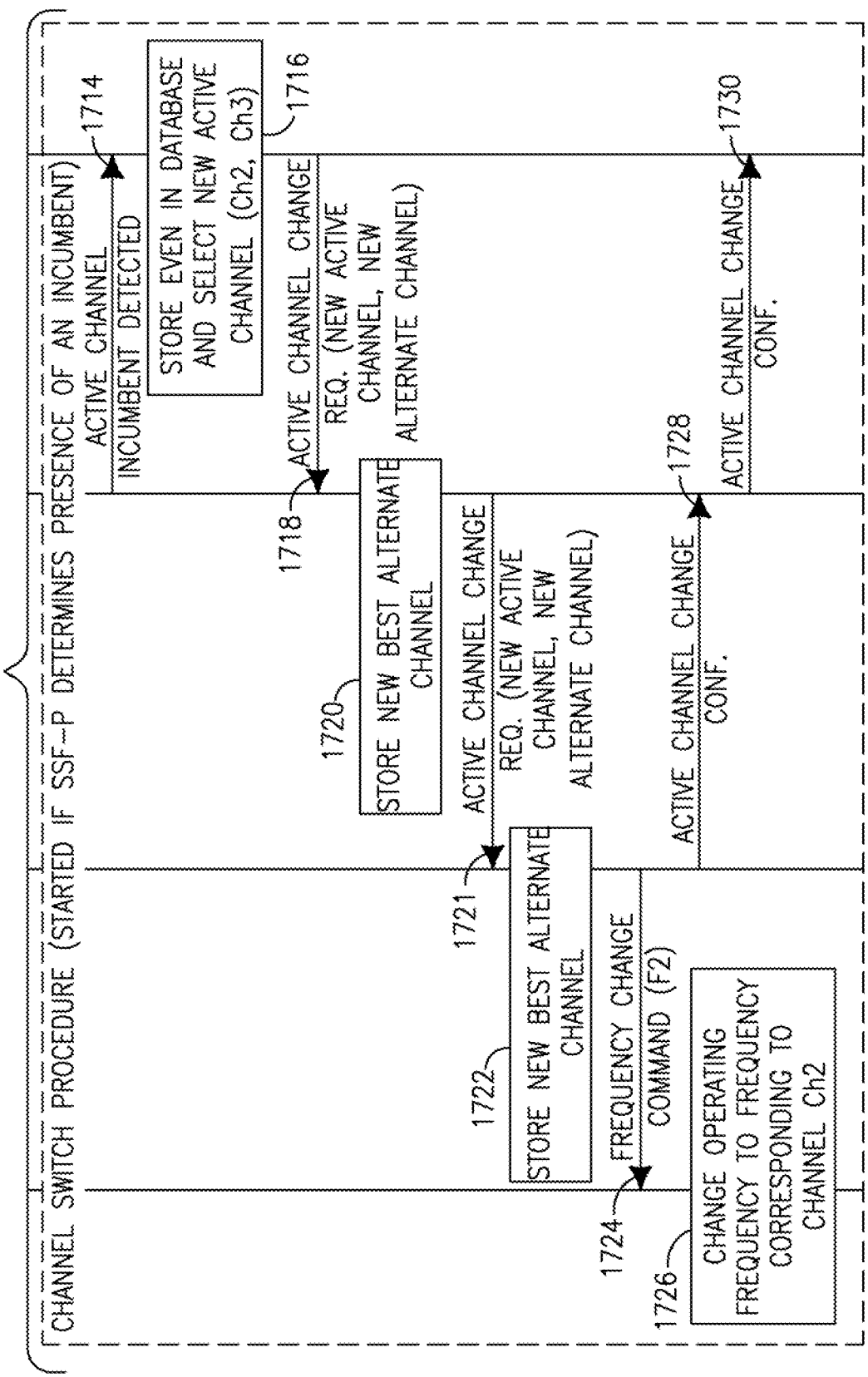

FIG. 17 illustrates example call flows 1700 for originated channel switching. Due to continuous high-priority sensing on the active channel (1702 and 1704), the TVWS-SSF-S 1112 may detect interference exceeding a low threshold (1706). When this occurs, the TVWS-SSF-S 1112 may send a low threshold pass indication message to the TVWS-SSF-P 1132 (1708). In an embodiment with multiple sensing boards 1110, the TVWS-SSF-P 1132 may compare this result with those from other sensing boards 1110. In the embodiment illustrated in FIG. 17, the TVWS-SSF-P 1132 may make its decision as to whether an incumbent is present on the spectrum based on a PSD and a threshold received in the low threshold pass indication message (1710).

If the TVWS-SSF-P 1132 determines that an incumbent is present on the spectrum, it may notify the TVWS-CMF 1134 using an active channel incumbent detected message (1714). The TVWS-CMF 1134 may then store this event in the database 1136, choose new active and best alternate channels (1716), and send information about the new active and best alternate channels to the TVWS-SSF-P 1132 (and consequently the TVWS-SSF-S 1112) through an active channel change request message (1718 and 1721). Upon receipt of the message, the TVWS-SSF-S 1112 may switch the down-converter 1200 to the new active channel frequency (represented by 1724 and 1726) and store the new alternate channel (1722). The TVWS-SSF-P 1132 may also store the new alternate channel (1720). The TVWS-SSF-S 1112 may send an active channel change confirmation to the CGW 1130 (represented by 1728 and 1730).

The DFSM-RSB 1030 may include DSM-RFSB software, which may perform the basic radio and algorithm control functions for the embodiments illustrated in FIGS. 11-17. The DSM-RFSB software may create channel sensing objects to be managed by the DSM-RFSB 1030. The channel sensing objects may contain all of the information required to configure the hardware and software to obtain sensing results. The DFSM-RFSB software may also receive and process API requests, which may indicate the start of a sensing operation or the need to cancel an ongoing sensing operation.

Figure 18A:
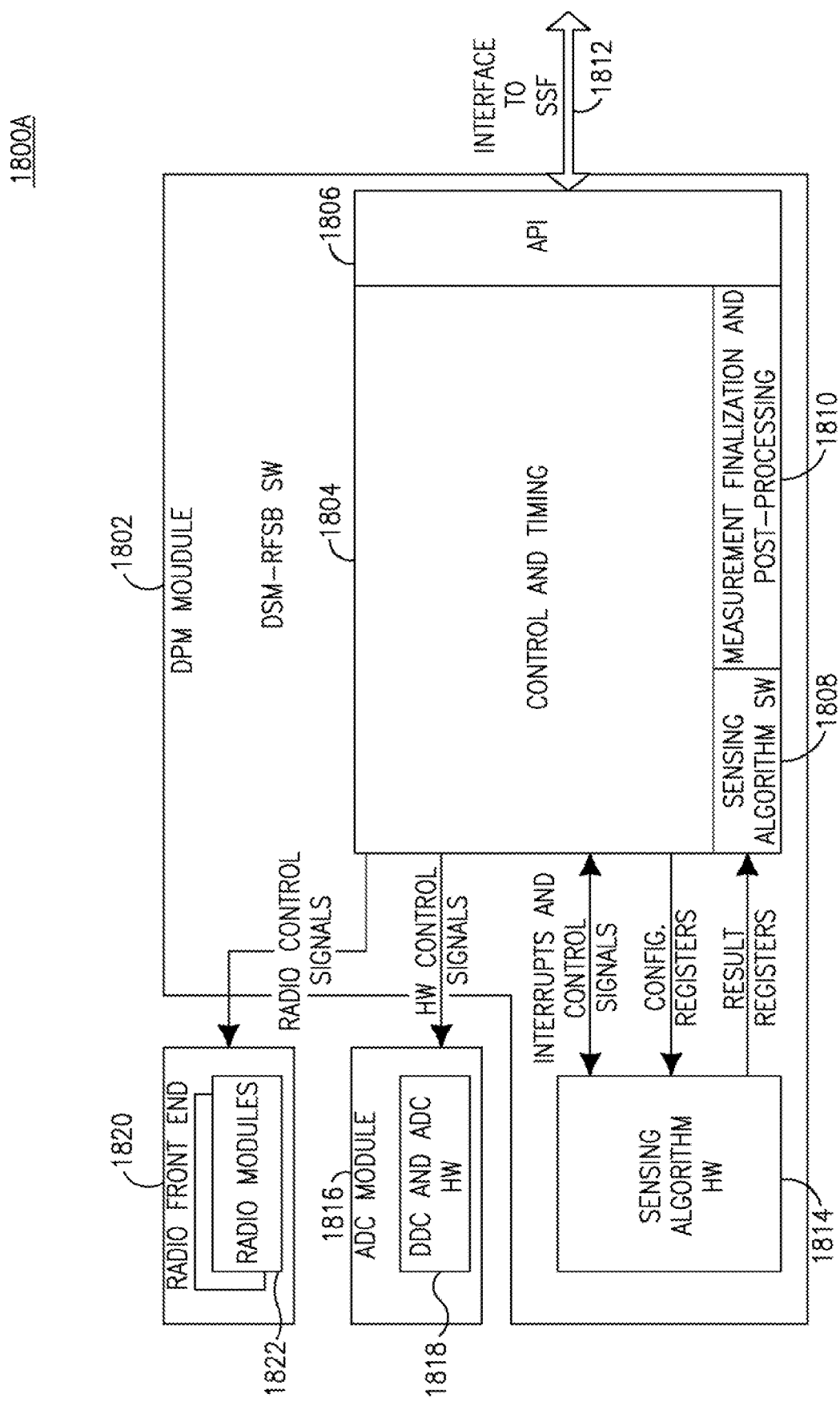
FIGS. 18A and 18B are block diagrams of example DSM-RFSB software modules.
Figure 18B:
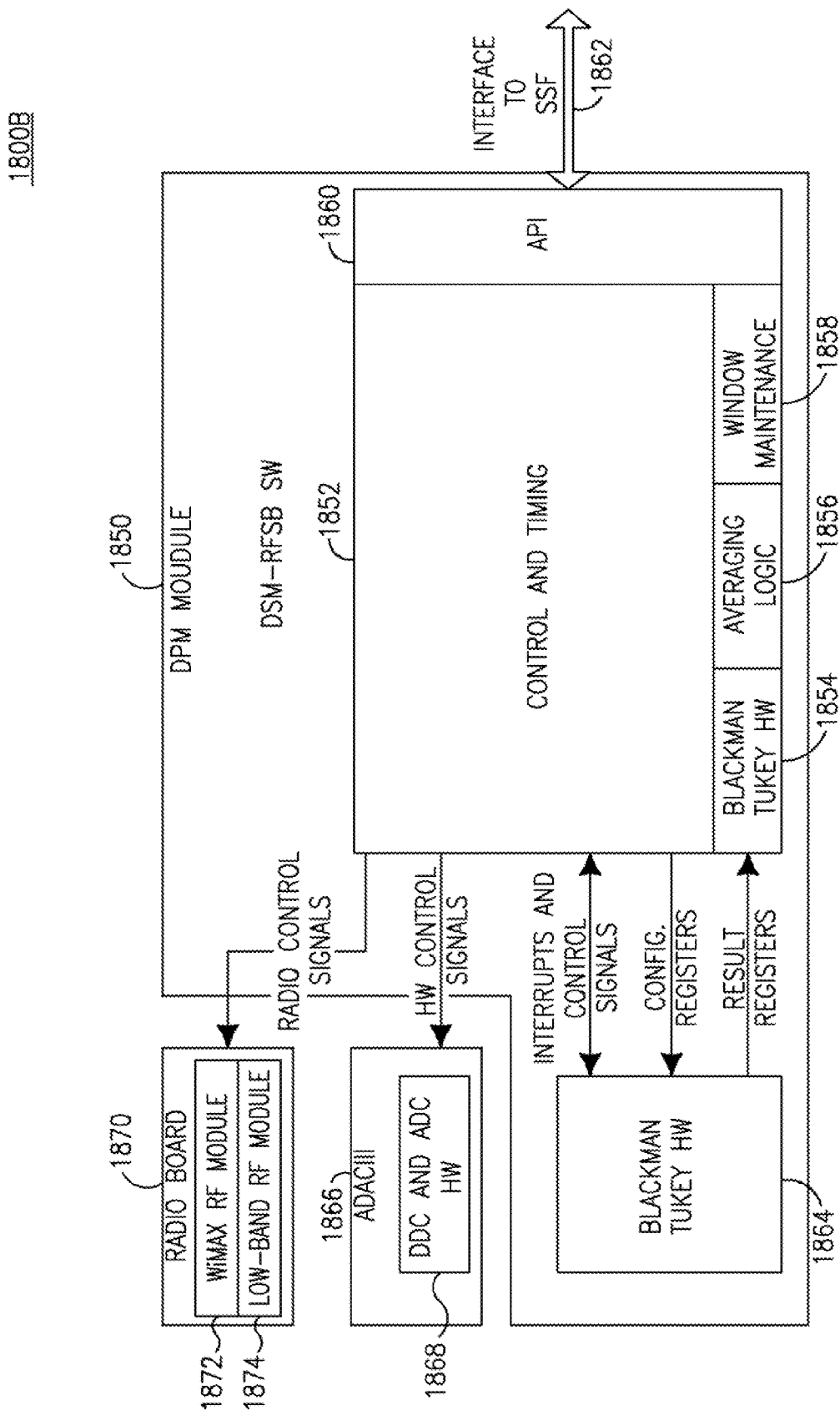

FIGS. 18A and 18B are block diagrams 1800A and 1800B, respectively, of example DSM-RFSB software modules. FIG. 18A illustrates a general embodiment, and FIG. 18B illustrates an embodiment configured for use with a Blackman Tukey sensing algorithm. The example DSM-RFSB software 1802 illustrated in FIG. 18A includes a control and timing unit 1804, an API unit 1806, an interface to the SSF 1812, a measurement finalization and post-processing unit 1810, sensing algorithm software 1808, sensing algorithm hardware 1814, an Analog-to-Digital-Converter (ADC) module including digital down-converter (DDC) and ADC hardware 1816, and a radio front end 1820 including radio modules 1822. The example DSM-RFSB software 1850 illustrated in FIG. 18B includes units similar to the corresponding units illustrated in FIG. 18A but specifically configured for use with the Blackman Tukey sensing algorithm. In particular, the DSM-RFSB software 1850 illustrated in FIG. 18B includes a control and timing unit 1852, an API unit 1860, an interface to the SSF 1862, Blackman Tukey hardware 1864, Blackman Tukey software 1854, averaging logic 1856, a window maintenance unit 1858, an ADACIII 1866 including the DDC and ADC hardware 1868 and a radio board 1870 including a WiMax RF module 1872 and a low-band RF module 1874.

The DSM-RFSB software 1802 illustrated in FIG. 18A may perform the basic radio and algorithm control functions for the TVWS embodiment. The basic radio functions may include, for example, the following. The DSM-RFSB software 1802 may control the RF front end 1820 and digital down-converter (1818) by setting the sensing bandwidth and center frequency of the radio (1822). The DSM-RFSB software 1802 may also control the sensing algorithm hardware 1814 by configuring start and stop times for capture and processing portions of the hardware. The DSM-RFSB software 1802 may collect results from the hardware 1814 and perform any software post-processing required by the algorithm. The output of the software post-processing may include a measured metric for the channel that was sensed. This metric may be a power spectral density (PSD) or other metric that is specific to the algorithm implemented by the DSM-RFSB 1030. The DSM-RFSB software 1802 may also provide a generic interface for configuring parameters related to the sensing algorithm that the DSM-RFSB 1030 is implementing.

The sensing algorithm may be implemented in a combined hardware/software split in such a way that high-load/high-rate computations may be made in the sensing algorithm hardware 1814, whereas the sensing algorithm software 1808 may perform simple tasks using the output of the hardware 1814 to further provide configurability of the sensing algorithm during runtime. As a result, the SSF may have the ability to configure the behavior of the sensing algorithm software 1808, as well as the ability to control portions of the hardware 1814, by using the services of a well defined API 1806. In the more specific example illustrated in FIG. 18B, the sensing algorithm may be based on the Blackman Tukey algorithm illustrated, for example, in FIG. 19 with a configurable averaging of PSD realizations.

The control and timing unit 1804 may enable and control the sensing algorithm hardware 1814 at appropriate times based on high-level and generic sensing commands sent to the DSM-RFSB 1030. The control and timing unit 1804 may be aware of the timing associated with each portion of the sensing algorithm and the configuration that needs to be set in the hardware registers to obtain sensing results that meet the needs of the SSF. The sensing algorithm hardware 1814 may be able to interrupt the sensing algorithm software 1808 to indicate the end of a sensing stage. Preliminary results may then be available in results registers, which the sensing algorithm software 1808 may read and continue operation on.

The control and timing unit 1804 may also have main control of the radio front end 1820 and ADC module 1816 of the sensing board 1110. Since the sensing board 1110 may have the ability to perform sensing over several distinct operating bands, it may be equipped with several RF modules 1114, and the activation of each RF module 1114 may be handled by the control and timing unit 1804. Hardware control signals may also be sent to the ADC module 1816 to control final down-conversion in order to obtain final I/Q baseband samples to be input to the sensing algorithm hardware 1814.

The measurement finalization and post-processing unit 1810 may perform any final steps needed to send the sensing results to the SSF over the interface 1812. This may include, for example, measurement averaging that may be different on a per-channel basis or any filtering results that the SSF requests.

Figure 19:
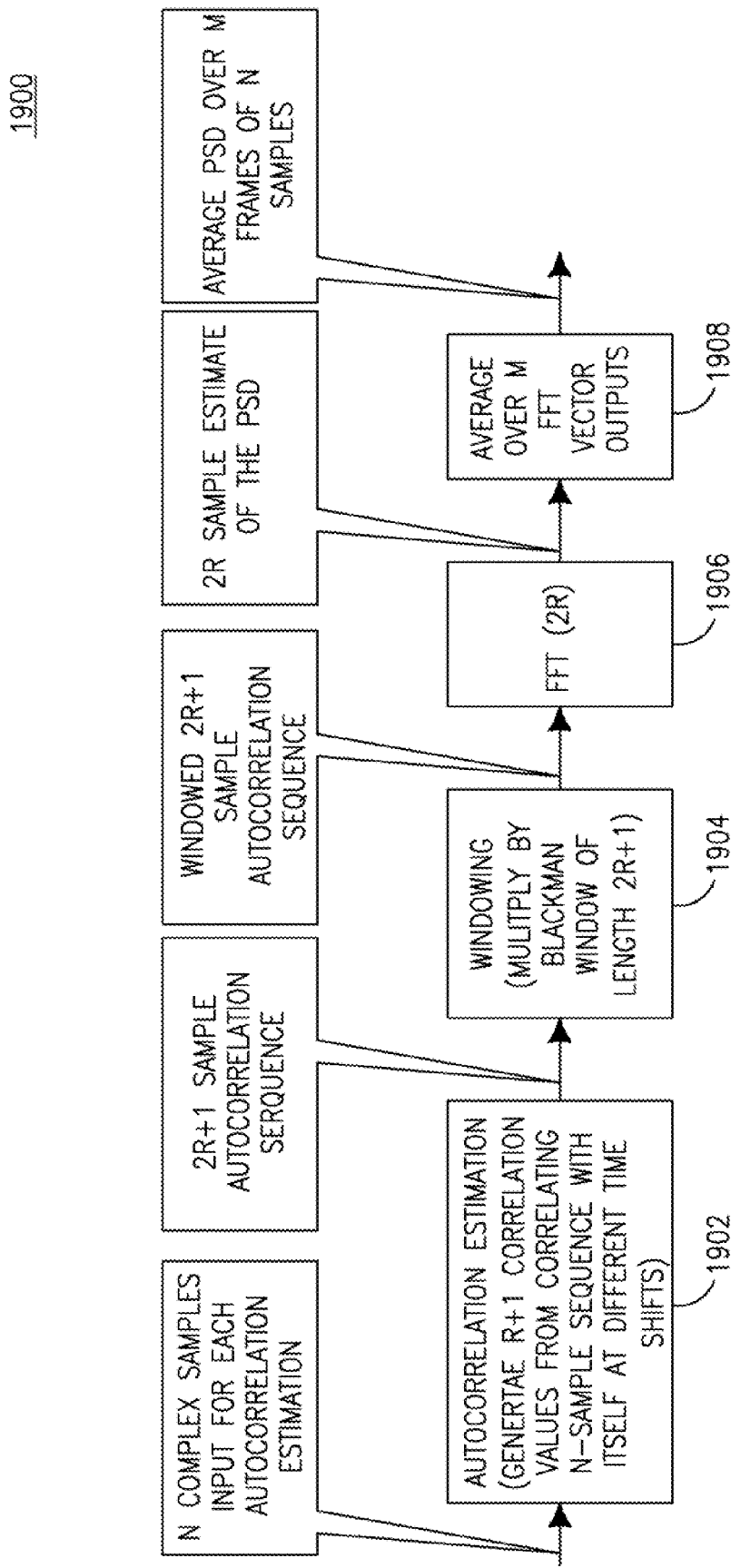
FIG. 19 is a flow diagram illustrating an example of the Blackman Tukey sensing algorithm that may be executed by the Blackman Tukey software illustrated in FIG. 18B.

FIG. 19 is a flow diagram illustrating an example of the Blackman Tukey sensing algorithm that may be executed by the Blackman Tukey software 1854 illustrated in FIG. 18B. The Blackman Tukey sensing algorithm may include estimation of the autocorrelation of the input signal (1902), windowing of the autocorrelation estimate to reduce PSD estimate variance (1904), determining an FFT of the windowed autocorrelation to obtain the estimated PSD (1906), and averaging the estimated PSD over M frames of N samples (1908).

The autocorrelation (1902) may generate R+1 correlation values by correlating an N-sample sequence with itself at different time shifts. More particularly, the autocorrelation (1902) may include implementing the following equations on a set of N complex input samples x(n):

$$r(m) = \frac{1}{r(0)} \sum_{n=0}^{N-1} x(n) x^*(n-m); m = 0, 1, \ldots R$$

$$r(-m) = r^*(m)$$

Equation (5)

The windowing (1904) may include multiplying an output of the autocorrelation (1902) (sample by sample) by a Blackman window of length 2R+1. The coefficients of the Blackman window for the length 2R+1 are given in Table 3.

TABLE 3

0, 0.0001, 0.0002, 0.0005, 0.0009, 0.0014, 0.0020, 0.0027, 0.0035,
0.0045, 0.0055, 0.0067, 0.0080, 0.0095, 0.0111, 0.0128, 0.0146, 0.0166,
0.0188, 0.0210, 0.0235, 0.0261, 0.0288, 0.0318, 0.0349, 0.0382, 0.0416,
0.0453, 0.0491, 0.0531, 0.0574, 0.0618, 0.0664, 0.0713, 0.0764, 0.0817,
0.0872, 0.0929, 0.0989, 0.1051, 0.1116, 0.1183, 0.1252, 0.1324, 0.1399,
0.1475, 0.1555, 0.1637, 0.1721, 0.1808, 0.1897, 0.1989, 0.2083, 0.2180,
0.2280, 0.2381, 0.2485, 0.2592, 0.2701, 0.2812, 0.2925, 0.3041, 0.3159,
0.3278, 0.3400, 0.3524, 0.3649, 0.3776, 0.3905, 0.4036, 0.4168, 0.4302,
0.4436, 0.4572, 0.4709, 0.4847, 0.4986, 0.5126, 0.5266, 0.5407, 0.5548,
0.5689, 0.5830, 0.5971, 0.6113, 0.6253, 0.6393, 0.6533, 0.6672, 0.6810,
0.6946, 0.7082, 0.7216, 0.7348, 0.7479, 0.7608, 0.7736, 0.7860, 0.7983,
0.8103, 0.8221, 0.8336, 0.8448, 0.8557, 0.8663, 0.8766, 0.8866, 0.8962,
0.9054, 0.9143, 0.9227, 0.9308, 0.9385, 0.9458, 0.9526, 0.9590, 0.9650,
0.9705, 0.9756, 0.9802, 0.9843, 0.9880, 0.9911, 0.9938, 0.9961, 0.9978,
0.9990, 0.9998, 1, 0.9998, 0.9990, 0.9978, 0.9961, 0.9938, 0.9911,
0.9880, 0.9843, 0.9802, 0.9756, 0.9705, 0.9650, 0.9590, 0.9526, 0.9458,
0.9385, 0.9308, 0.9227, 0.9143, 0.9054, 0.8962, 0.8866, 0.8766, 0.8663,
0.8557, 0.8448, 0.8336, 0.8221, 0.8103, 0.7983, 0.7860, 0.7736, 0.7608,
0.7479, 0.7348, 0.7216, 0.7082, 0.6946, 0.6810, 0.6672, 0.6533, 0.6393,
0.6253, 0.6113, 0.5971, 0.5830, 0.5689, 0.5548, 0.5407, 0.5266, 0.5126,
0.4986, 0.4847, 0.4709, 0.4572, 0.4436, 0.4302, 0.4168, 0.4036, 0.3905,
0.3776, 0.3649, 0.3524, 0.3400, 0.3278, 0.3159, 0.3041, 0.2925, 0.2812,

TABLE 3-continued 0.2701, 0.2592, 0.2485, 0.2381, 0.2280, 0.2180, 0.2083, 0.1989, 0.1897,
0.1808, 0.1721, 0.1637, 0.1555, 0.1475, 0.1399, 0.1324, 0.1252, 0.1183,
0.1116, 0.1051, 0.0989, 0.0929, 0.0872, 0.0817, 0.0764, 0.0713, 0.0664,
0.0618, 0.0574, 0.0531, 0.0491, 0.0453, 0.0416, 0.0382, 0.0349, 0.0318,
0.0288, 0.0261, 0.0235, 0.0210, 0.0188, 0.0166, 0.0146, 0.0128, 0.0111,
0.0095, 0.0080, 0.0067, 0.0055, 0.0045, 0.0035, 0.0027, 0.0020, 0.0014,
0.0009, 0.0005, 0.0002, 0.0001, 0

The FFT (1906) may then take the positive-most indexed 2R values of the windowed autocorrelation to perform a 2R length FFT and, consequently, convert the estimated autocorrelation value to an estimated Power Spectral Density (PSD). The windowing applied to the autocorrelation sequence may result in a decrease in the bias caused by aliasing that may be inherent in FFT-based spectral estimation. To decrease the estimation variance, M separate realizations of the PSD estimate may be averaged to obtain the final PSD estimate from which a set of holes (or potential spectral opportunities) may be derived.

The control and timing unit 1852 illustrated in FIG. 18B may control the radio 1872 and DDC hardware (1868) through radio control commands. The radio control commands may be sent by hardware in the control and timing unit 1852 across an interface between the ADACIII 1866 and DSM-RFSB software 1850 modules. The control and timing unit 1852 may also control the Blackman Tukey hardware 1864. This may be achieved through control signals (from the software to the hardware) and interrupts (from the hardware to the software). Results provided from the Blackman Tukey hardware 1864 may be made available to the Blackman Tukey software 1854, which may perform the final tasks of the Blackman Tukey algorithm on the hardware results to generate the actual PSD. Outputs from the Blackman Tukey software 1854 may be used by the averaging logic 1856 and window maintenance 1858 units in order to generate one or more averaged PSD estimates that may be sent to the SSF via the API interface 1860.

The following API functions may be implemented by the DSM-RFSB software 1802/1850. These API functions may center around creation of several channel sensing objects.

A Create_Channel_Sensing_Object API function may create a channel object to be managed by the DSM-RFSB 1030. Inputs of the Create_Channel_Sensing_Object API function may include a bandwidth input, a center_frequency input, a sensing_type input, a period input and an averaging_properties input. The bandwidth input may specify an input bandwidth to be used for sensing on this channel object. The center_frequency input may specify a center frequency for the sensing on this bandwidth. The sensing_ type input may specify the sensing type of this sensing object. The sensing type may be, for example, PERIODIC (e.g., sensing on the channel is performed periodically every x ms) or ON_DEMAND (sensing on this channel object occurs only when the sensing object is called to start). The period input may specify a period (e.g., in ms) for the PERIODIC sensing object type. The averaging_properties input may be a structure that describes the properties of the averaging and reporting on this channel sensing object. These properties are described in Table 4.

TABLE 4

| averaging_properties | Description |
| --- | --- |
| averaging_length | This parameter gives the number of frames over which the averaging applies for this channel sensing object. A frame represents a single atomic hardware operation of generating a PSD on 8192 I/Q samples. |

TABLE 4-continued

| averaging_properties | Description |
| --- | --- |
| reporting_length | This parameter gives the interval (in number of frames) after which the DSM-RFSB software reports the averaging results for a particular sensing object to the SSF. |
| running_length | This parameter specifies the length of time (in number of frames) for which hardware runs in an uninterrupted fashion. For an ON_DEMAND channel object, sensing is started with a separate function call each time the hardware is run for a given running length. |
| reset_after_report | When this parameter is set to true, the averaging for that particular channel object is reset each time the reporting_length is reached. |

Outputs of the Create_Channel_Sensing_Object API function may include a channel_sensing_ID output, which may be a unique identifier with which to identify the channel sensing object during future calls to API functions.

A Modify-Channel_Sensing_Object API function may modify a channel sensing object to change one of its parameters. The inputs to this API function may be the same as the inputs for the Create_Channel_Sensing_Object function, and the Create_Channel_Sensing_Object function may include no outputs.

A Start_Channel_Sensing_On_Object API function may start the channel sensing operation for one or more particular sensing objects by generating appropriate signals for the Blackman Tukey hardware 1864. If the sensing object is a PERIODIC sensing object, the sensing operation may be started automatically each period for that sensing object. If the sensing object is an ON_DEMAND sensing object, the sensing operation may be run for the time corresponding to the running_length for the sensing object and then stop.

Sensing may be run simultaneously for more than one sensing object. In order for the software to allow this, the sensing object may have the same values of bandwidth, center_frequency, sensing_type and period. In addition, the sensing object averaging_properties may differ in any field except running_length. This functionality may be needed to maintain different length PSD averages on the same physical channel.

When a sensing operation for a single frame is completed by the hardware 1864, an interrupt may be generated and may be handled by the interrupt handling mechanism that may be a part of the control and timing unit 1852.

Inputs for the Start_Channel_On_Sensing_Object function may include a num_channel_sensings input, a channel_sensing_ID[ ] input and a subsequent_channel_ID input. The num_channel_sensings input may indicate the number of channel sensing objects that are run simultaneously with this start command. The channel_sensing_ID [ ] input may be an array of unique identifiers of the channel sensing objects whose operation is to be started. The subsequent_channel_ID input may be a unique identifier of the channel sensing object that will follow. This may allow the DSM-RFSB 1030 to set up the radio for the next sensing operation when the current one is completed (e.g., setup of the radio may occur with this function call to the API). If this input is NULL, the radio may not be set up at the end of the operation, and the DSM-RFSB 1030 may instead do so at the call to Start_Channel_Sensing_On_Object for the next channel object. The Start_Channel_On_Sensing_Object function may include no outputs.

A Stop_Channel_Sensing_On_Object API function may be used to stop an ongoing sensing operation for a particular sensing object. For a PERIODIC sensing object, all future hardware scheduling and sensing for this object may be suspended until a future start is issued. For an ON-DEMAND sensing object, when the function is called during execution of a particular sensing operation, the operation may be cancelled and the hardware/software may be brought to the state it was in prior to the start of the operation (e.g., any buffers or averaging for that operation may be cleared). Interrupts may not be generated for any ongoing hardware operations.

A Reset_Channel_Sensing_On_Object API function may be used to reset all counters for a channel sensing operation (e.g., all averaging results currently pending may be reset and the next start on this object may behave as though the object was just created). The inputs and outputs for this API function may be the same as for the Start_Channel_Sensing_On_Object function.

The window maintenance unit 1858 may maintain a window of PSD values to average for each channel sensing object and may translate an API request to create a channel sensing object into a structure or array that maintains the PSD values to be averaged in different ways (e.g., moving average, fixed average, etc.) based on the settings of the channel sensing object configured during the API call.

At the occurrence of each PSD (e.g., measured by the Blackman Tukey hardware 1864/software 1854), the window maintenance component 1858 may add to each PSD an appropriate array or structure. It may then use the averaging logic 1856 to re-compute the average for that particular channel sensing object. Based on a reporting rate or reporting time for a channel sensing object, the window maintenance component 1858 may trigger a message to the TVWS-SSF-S 1112 to report a new measurement for the channel sensing object. The window maintenance component may, thus, use a windowing function to compute the average PSD or sensing metrics based on a configurable-length time window. This window may depend on at least one of a type of interferer to be detected, an amount of time required to detect the primary incumbent (user) of the spectrum, the mobility of the sensing device(s) (e.g., CR nodes, WTRUs configured to act as CR nodes, etc.), or a knowledge of a noise level on the channel and may ultimately be decided by the knowledge of the CGW 1130 regarding the channel and potential interferers.

Figure 20:
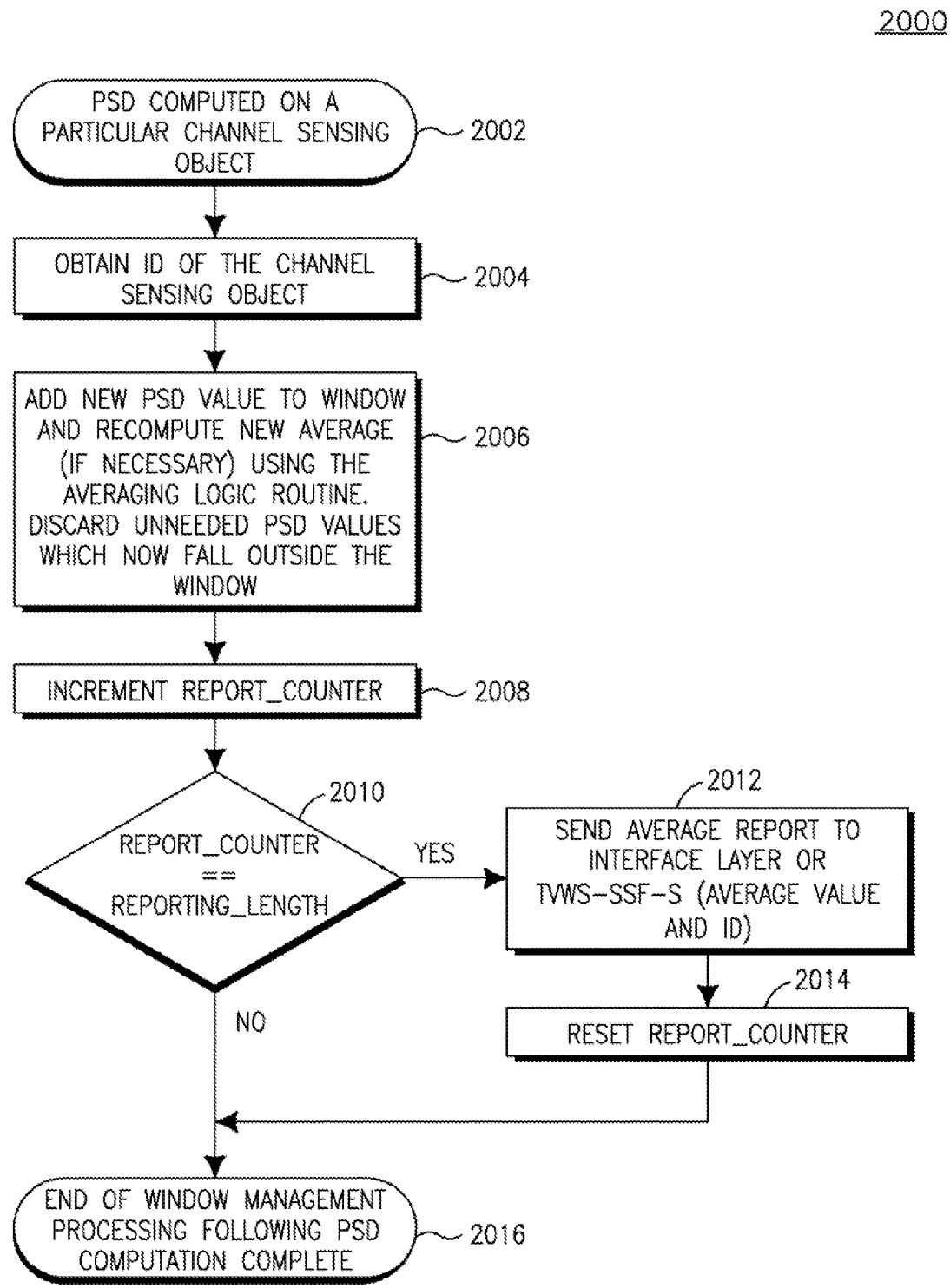
FIG. 20 is a flow diagram illustrating a method that may be executed by a window maintenance component for a particular PSD value.

FIG. 20 is a flow diagram 2000 illustrating a method that may be executed by the window maintenance component 1858 for a particular PSD value (e.g., computed by the Blackman Tukey hardware 1864/software 1854). The PSD may be computed on a particular channel sensing object (2002), and an identifier (ID) of the channel sensing object may be obtained (2004). A new PSD value may be added to the window, and a new average may be recomputed (2006). Un-needed PSD values that now fall outside the window may be discarded (2006).

A report_counter variable may then be incremented (2008). The report_counter variable may maintain a count of a number of PSD values that have been averaged since the last report to determine when a report must be made (2008). On a condition that report_counter equals a predetermined report_length value (2010), an average report may be sent to an interface layer or to the TVWS-SSF-S 1112 including the average value and the ID for the channel sensing object (2012) and the variable report_counter may be reset (2014). On a condition that report_counter does not equal report_length (2010), or on a condition that the report_counter has been reset (2014), window management processing may be completed (2016).

Figure 21:
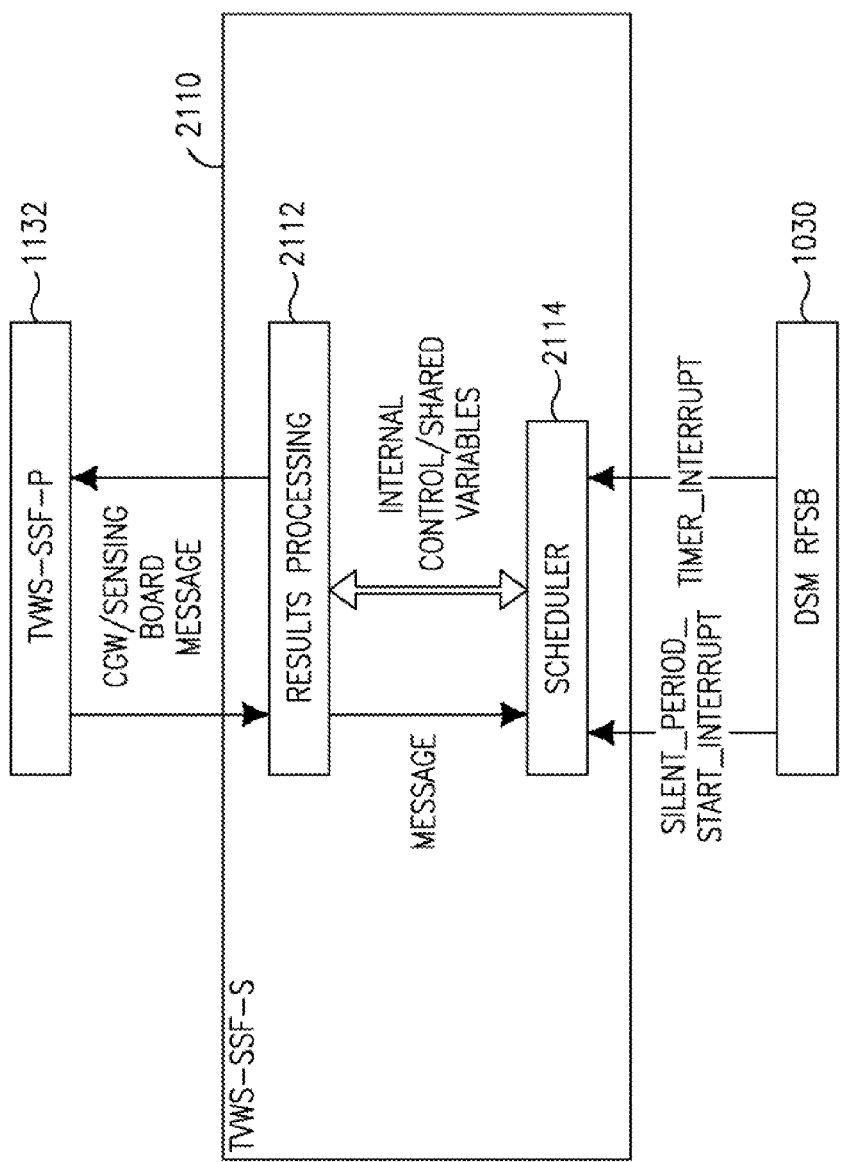
FIG. 21 is a block diagram of an example TVWS-SSF-S software module.

FIG. 21 is a block diagram 2100 of an example TVWS-SSF-S software module 2110. The TVWS-SSF-S software module 2110 may be the main control component for sensing for the TVWS embodiment (e.g., illustrated in FIGS. 11-17). Because the sensing may operate around the presence of silent measurement periods that may be communicated by the AP 1140 to the sensing platform, the TVWS-SSF-S software module 2110 may reside on the sensing platform. As a result, scheduling may be quicker and may make use of a maximum amount of silent period time for active channel sensing. The illustrated TVWS-SSF-S software module 2110 includes a results processing unit 2112 and a scheduler 2114 and is in communication with the DSM-RFSB 1030 and the TVWS-SSF-P 1132.

Active channel sensing may be performed during a silent period (e.g., 10 ms of silent time occurring every 100 ms), while alternate channel sensing may be performed during an active period (e.g., the remaining time). The TVWS-SSF-S software module 2110 may be notified of the start of a silent period (e.g., with a maximum allowable amount of synchronization error) by an interrupt that may be forwarded to it by a timing and control unit (e.g., 1804 or 1852) of the DSM-RFSB 1030. It may then schedule the sensing operations through appropriate calls through the API (1806 or 1860) of the DSM-RFSB 2130 around the silent period, for example, using a timer interrupt to determine the end of the silent period.

In addition to scheduling the sensing operation, the TVWS-SSF-S software module 2110 may include additional tasks. For example, the TVWS-SSF-S software module 2110 may forward alternate channel sensing results to the TVWS-SSF-P 1132 for eventual decision of the best alternate channel. For another example, the TVWS-SSF-S software module 2110 may compare the active channel sensing results with a high threshold and determine whether a switch to the alternate channel is required. For another example, the TVWS-SSF-S software module 2110 may compare the active channel sensing results with a low threshold and determine whether a message is sent to the TVWS-SSF-P 1132. For another example, the TVWS-SSF-S software module 2110 may perform the switch of a TVWS downconverter (e.g., 1200) to the alternate channel if the TVWS-CMF 1134 or TVWS-SSF-S 1112 decides that a frequency switch of the active channel to one of the alternate channels is required.

Events/interrupts may trigger the TVWS-SSF-S software module 2110 to operate. Example events/interrupts are given in order of priority (priority level 1 being the highest priority) in Table 5.

TABLE 5

| Event | Priority | Handling Subcomponent |
| --- | --- | --- |
| Message from TVWS-SSF-P | 1 | Results Processing |
| Silent Period Start Interrupt | 2 | Scheduler |
| Silent Period Duration Timer Interrupt | 2 | Scheduler |
| Reception of Average Report from DSM-RFSB | 3 | Results Processing |

The TVWS-SSF-S software module 2110 may reside in an initialization mode or a normal mode. These modes may reflect the message flows for initialization and operation (e.g., described above with respect to FIGS. 11-17). The results processing unit 2112 may send messages to the scheduler 2114, which may include, for example, the messages listed in Table 6.

TABLE 6

| Message | Purpose | Contents | Allowable Mode |
| --- | --- | --- | --- |
| FREQUENCY_SWITCH | Sent to the scheduler when a decision (either by the TVWS-SSF-P or the Results Processing subcomponent) to switch the active channel. | ID of new active channel | Normal |
| INITIALIZATION | Start initialization procedure, which consists of finding the best channel as the starting channel for the connection of the STA and AP (following boot-up). | Frequency and averaging information about the 3 channels | Initialization |
| START_NEXT | Start the next channel sensing object (used to synchronize averaging reports and sensing operation starts during the initialization process). | No parameters | Initialization |
| INITIALIZATION_DONE | Signal the selection of the current active channel and creation of the DSM RFSB objects associated. | ID of selected active channel. | Initialization |
| INITIALIZATION_ERROR | Signals an error in the initialization process. The Results Processing module will assume the initialization process will be restarted when this message is received. | Error code for initialization error. | Initialization |

Internal control and shared variables illustrated in FIG. 21 may include variables for maintaining consistency between the channel sensing object with respect to the averaging reports and the sensing object schedules. These may be implemented as having the channel sensing objects as shared variables between the two subcomponents. The CGW/sensing board messages may include the messages exchanged between the CGW 1130 and the sensing board 1110 over the Ethernet link 1192.

The TVWS-SSF-S software module 2110 may create and maintain a number of channel sensing objects. The scheduler 2114 may schedule a start of sensing for each of these sensing objects based on the silent measurement periods, and the results processing unit 2112 may manage sending of an average of each sensing object to the TVWS-SSF-P 1132 at the appropriate times.

The number of sensing channel objects maintained for each channel may depend on the current active channel (TVWS or industrial, scientific and medical (ISM)). This information may be communicated to the TVWS-SSF-S software module 2110 during initialization.

For the TVWS embodiment (e.g., illustrated in FIGS. 11-17), two TVWS channels and one ISM channel may be available for use. An averaging timeline for each type of potential interferer being used (digital television (DTV) and wireless microphone for TVWS channels and strong ISM interferer for ISM bands) may be needed. As a result, the TVWS-SSF-S software module 2110 may instantiate (with the help of the initialization information provided by the TVWS-SSF-P 1132) the channel sensing objects illustrated in Tables 7 and 8 depending on whether the active channel is in the TVWS or ISM band.

TABLE 7

TVWS-SSF-S Channel Sensing Objects when Active Channel is TVWS

| Channel Sensing Object ID | Purpose | RF sensing BW | averaging_length | reporting_length | running_length | reset_after_report |
|---|---|---|---|---|---|---|
| 1 | Active channel, wireless microphone detection | 5 MHz | 40 | 6 | 6 | False |
| 2 | Active Channel, DTV Detection | 5 MHz | 250 | 6 | 6 | False |
| 3 | TVWS Alternate Channel (Alt Ch1) | 5 MHz | 250 | 250 | 40 | True |
| 4 | ISM Alternate Channel (Alt Ch2) | 20 MHz | 40 | 40 | 40 | True |
| 5 | TVWS Alternate channel (alt Ch1), wireless microphone | 5 MHz | 40 | 40 | 40 | True |

TABLE 8

TVWS-SSF-S Channel Sensing Objects when Active Channel is ISM

| Channel Sensing Object ID | Purpose | RF sensing BW | averaging_length | reporting_length | running_length | reset_after_report |
|---|---|---|---|---|---|---|
| 1 | Active channel, strong ISM interferer | 20 MHz | 40 | 6 | 6 | False |
| 2 | TVWS Alternate Channel (Alt Ch1) | 5 MHz | 250 | 250 | 40 | True |
| 3 | TVWS Alternate Channel (Alt Ch2) | 5 MHz | 250 | 250 | 40 | True |
| 4 | TVWS Alternate channel (alt Ch1), wireless microphone | 5 MHz | 40 | 40 | 40 | True |

TABLE 8-continued

TVWS-SSF-S Channel Sensing Objects when Active Channel is ISM

| Channel Sensing Object ID | Purpose | RF sensing BW | averaging_length | reporting_length | running_length | reset_after_report |
|---|---|---|---|---|---|---|
| 5 | TVWS Alternate channel (alt Ch2), wireless microphone | 5 MHz | 40 | 40 | 40 | True |

In Table 7, two sensing objects (channel IDs 1 & 2) are maintained on the active channel, one for wireless microphone and DTV, respectively. Because sensing on the active channel is performed during the silent period, these objects are set to run simultaneously. Based on the running time of the hardware and the silent period duration, six frames may be run during the silent period, and the TVWS-SSF-S 1112 may receive a report at the end of each silent period. The amount of averaging may be based on the number of frames needed to be averaged to detect the interferer in question at its minimum required detectable power (e.g., 40 frames for wireless microphone, 250 frames for DTV). During the active period, sensing may be performed on the alternate channels using channel sensing object IDs 3 and 4. Since these channel sensing objects sense two separate physical channels, they may not be run in parallel. Once received by the TVWS-SSF-S 1112, the reports on both alternate channels may be sent to the TVWS-SSF-P 1132 and may constitute the periodic alternate channel reports used by the TVWS-CMF 1134 to select the best alternate channel. Channel object ID 5 represents sensing over 40 frames of the alternate channel in TVWS (Alt. Ch 1). At any given time, the TVWS-SSF-S 1112 may maintain the sensing results for the last 40 frames on the alternate channel in TVWS. This information may, however, only be used when an incumbent is detected on the active channel. Namely, when the message indicating this situation is sent to the TVWS-SSF-S 1112, the sensing results from channel ID 5 may also be sent if a wireless microphone appeared very recently on the alternate channel which, up to that point, was considered to be the best alternate channel. This channel sensing object (ID 5) may be referred to as the preventative channel sensing object.

Table 8 shows sensing objects required when the active channel is an ISM channel. A single channel sensing object (Ch ID1) may be maintained for the strong interferer. As for the TVWS active channel, two alternate channel sensing objects (ID 2 and 3) may be needed to provide periodic reports on the two alternate channels. Since the two alternate channels in this case are both in TVWS, two preventative channel sensing objects (Ch ID 4 and 5) may be needed.

When a switch of the active channel occurs, the TVWS-SSF-S 1112 may modify the channel sensing objects to transition between the situations in Tables 7 and 8, if applicable.

Figure 22A:
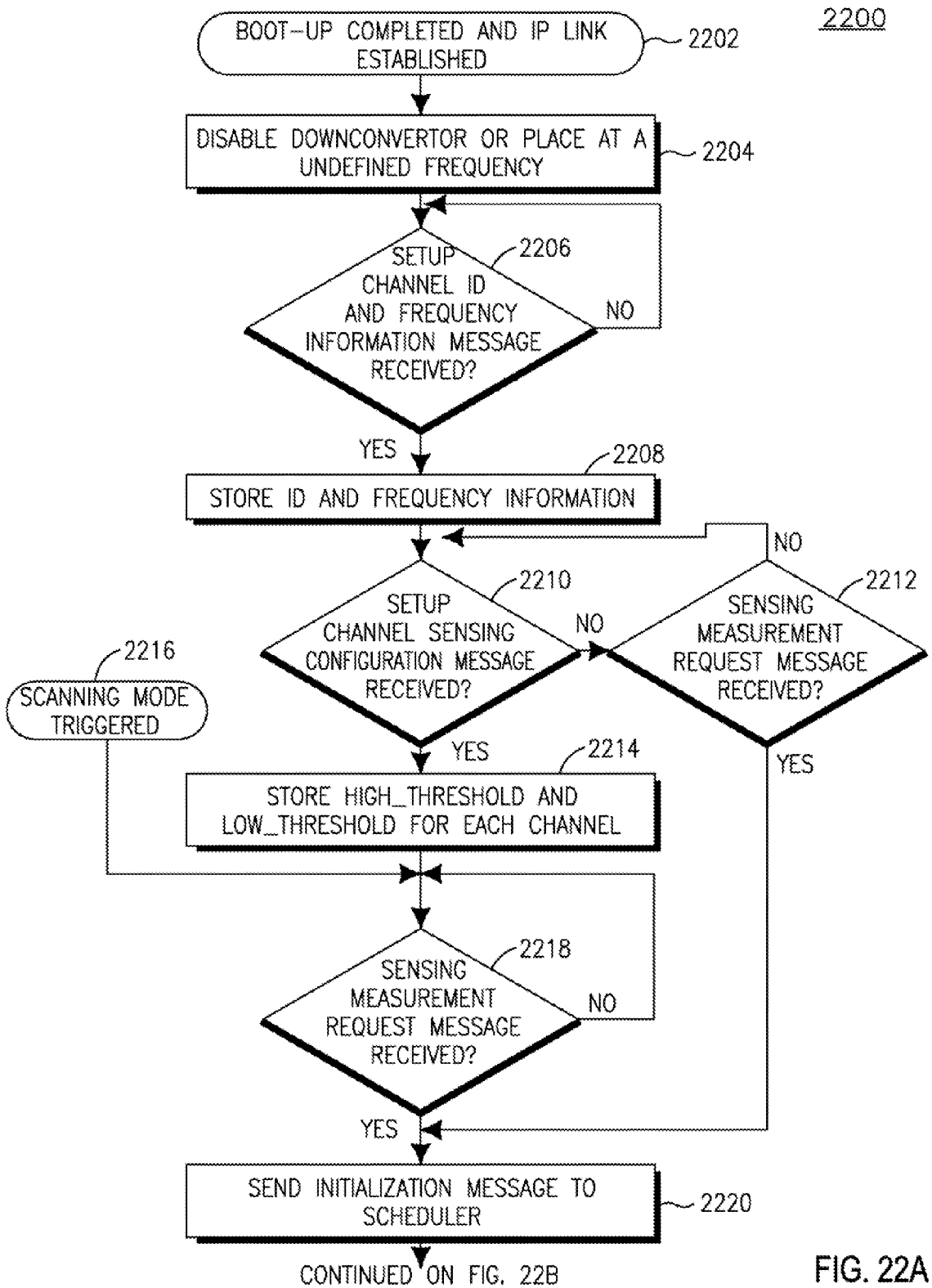
FIGS. 22A and 22B is a flow diagram for a method that may be executed by a results processing unit during an initialization mode.
Figure 22B:
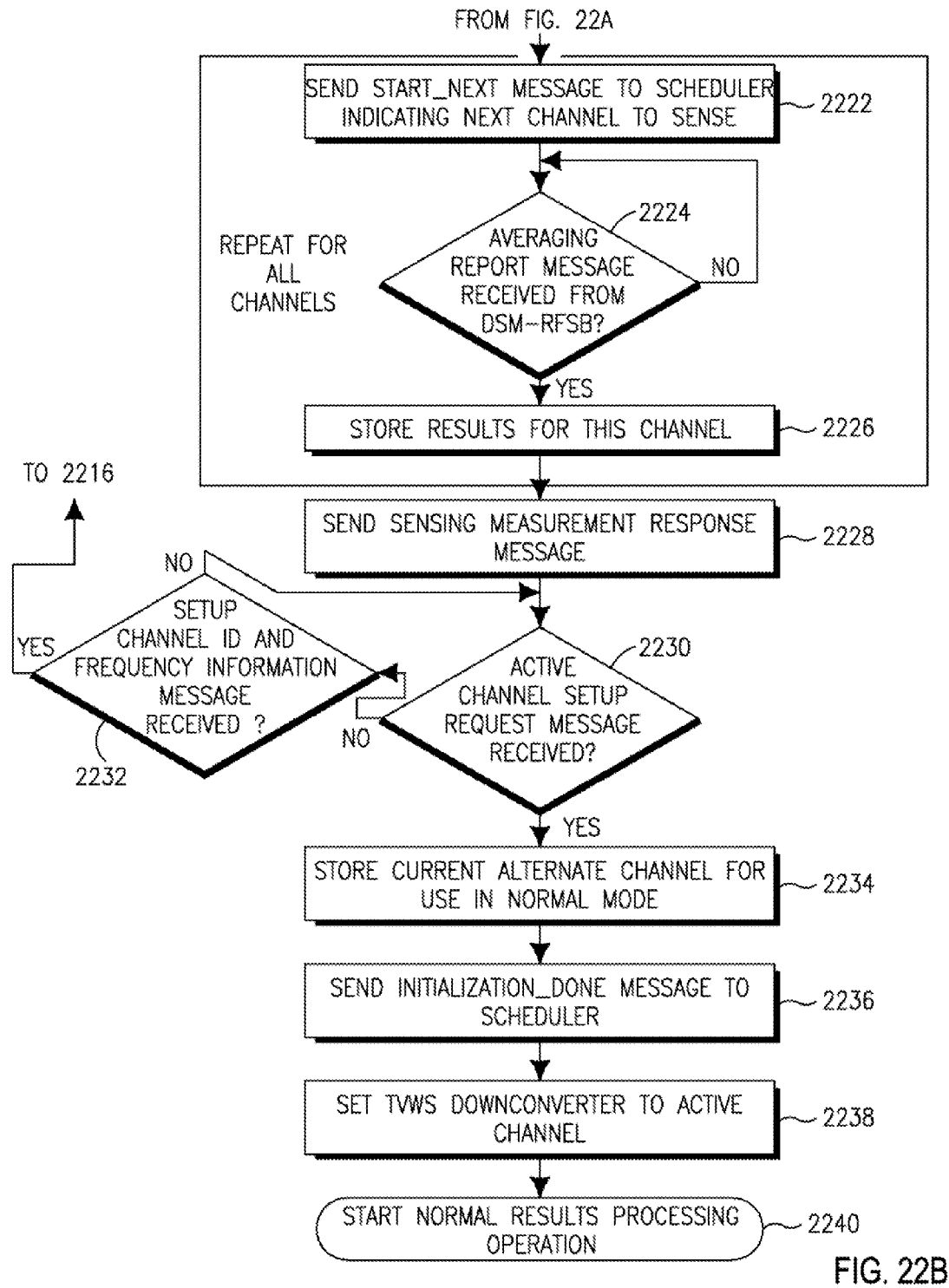

FIG. 22 is a flow diagram 2200 for a method that may be executed by the results processing unit 2112 during an initialization mode. When boot-up is complete and an IP link is established (2202), the down-converter (e.g., down-converter 1200) may be disabled or placed at an undefined frequency (2204) and whether a Setup Channel ID and Frequency Information message is received may be determined (2206). If not, 2206 may be repeated until the message is received. If the message is received in 2206, the ID and frequency information may be stored (2208) and whether a Setup Channel Sensing Configuration message is received may be determined (2210). If the message is received in 2210, the high_threshold and low_threshold information may be stored for each channel (2214). If the message is not received in 2210, whether a Sensing Measurement Request message is received may be determined (2212). If the message is not received in 2212, 2210 may be repeated. If the message is received in 2212, 2220 may be directly entered (described in more detail below).

Once the high_threshold and low_threshold information are stored in 2214, whether a Sensing Measurement Request message is received may be determined (2218). If not, 2218 may be repeated until the message is received. If the message is received in 2218, an INITIALIZATION message may be sent to the scheduler 2114 (2220).

Next, the following may be repeated for all channels. A START_NEXT message may be sent to the scheduler 2114 indicating the next channel to sense (2222). Whether an averaging report message is received from the DSM-RFSB 1030 may be determined (2224). If not, 2224 may be repeated until the message is received. If the message is received in 2224, the results for each channel may be stored (2226).

Once the results are stored for all channels, a Sensing Measurement Response message may be sent (2228), and whether an Active Channel Setup Request message is received may be determined (2230). If the Active Channel Setup Request message is received, the current alternate channel for use in normal mode may be stored (2234), an INITIALIZATION_DONE message may be sent to the scheduler 2114 (2236), the TVWS down-converter (e.g., down-converter 1200) may be set to the active channel (2238) and a normal results operation process may be started (2240). If the Active Channel Setup Request message is not received, whether a Setup Channel ID and Frequency Information message is received may be determined (2232). If the Setup Channel ID and Frequency Information message is received, a scanning mode may be triggered (2216) and 2218 may be repeated. If the Setup Channel ID and Frequency Information message is not received, 2230 may be repeated.

The results processing unit 2112 may send an INITIALIZATION_ERROR message on a condition that the parameters used for initialization are incorrect or not supported. Further, a timeout may occur while the results processing unit 2112 is waiting for a message. Here, an INITIALIZATION_ERROR message may be sent when the timeout occurs.

Figure 23A:
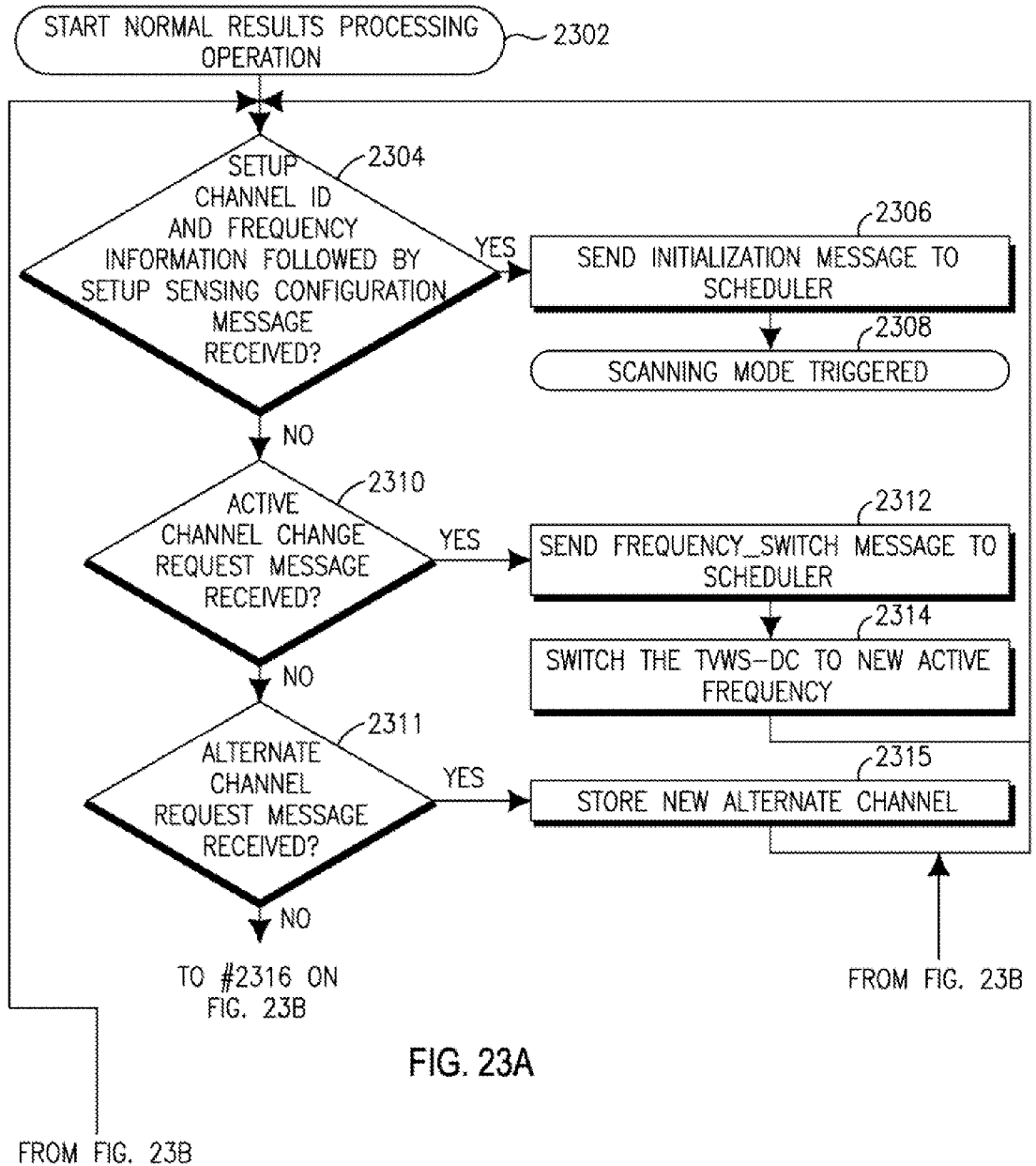
FIGS. 23A and 23B is a flow diagram of a method that may be executed by a results processing unit during a normal mode.
Figure 23B:
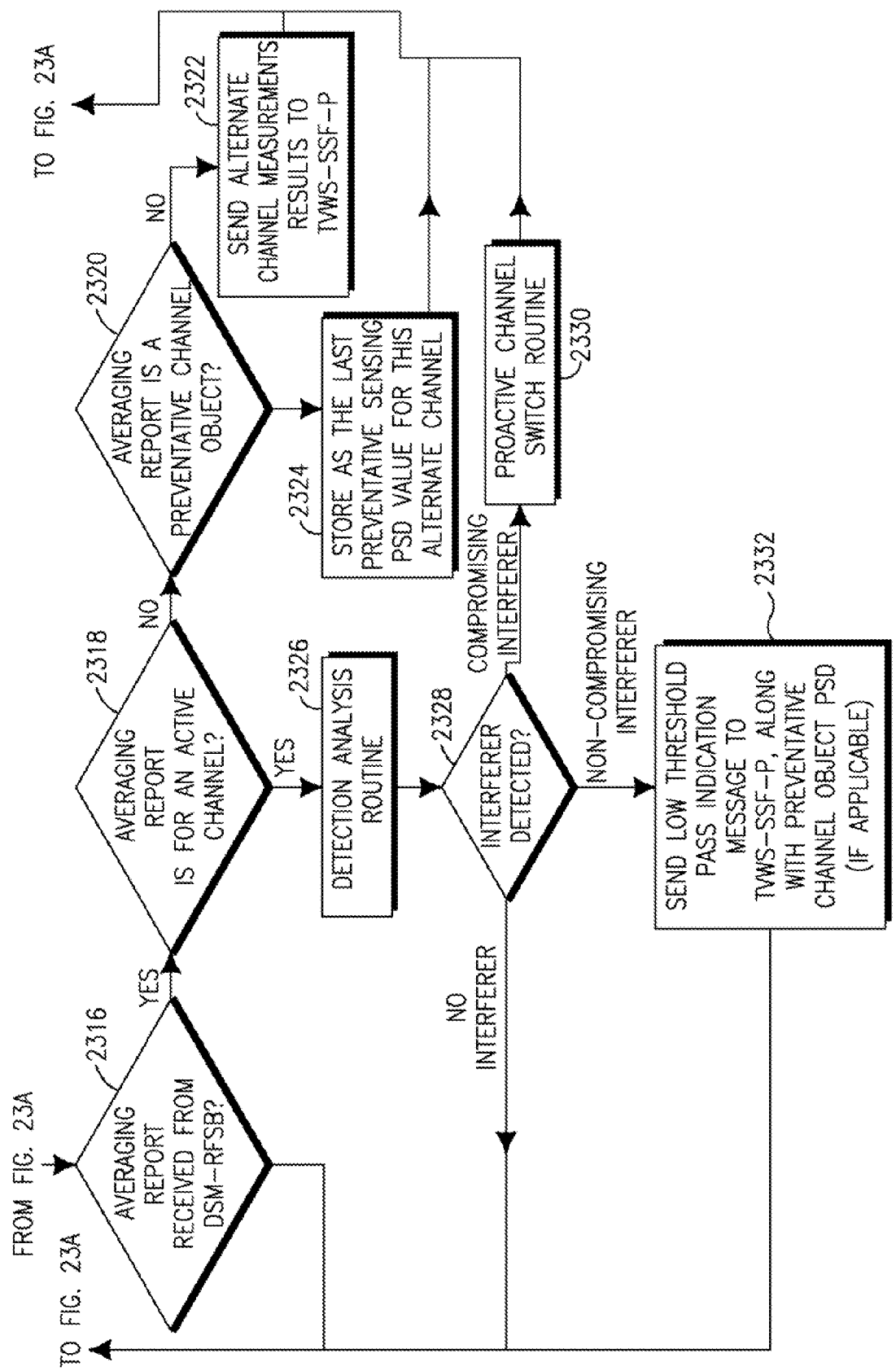

FIG. 23 is a flow diagram 2300 of a method that may be executed by the results processing unit 2112 during a normal mode. A normal processing operation may be started (2302), and whether a Setup Channel ID and Frequency Information message followed by a Setup Sensing Configuration Message is received may be determined (2304). If yes, an INITIALIZATION message may be sent to the scheduler

2114 (2306) and a scanning mode may be triggered (2308). If no, whether an Active Channel Change Request message is received may be determined (2310). If yes, a FREQUENCY_SWITCH message may be sent to the scheduler 2114 (2312), and the TVWS-down-converter (e.g., 1200) may be switched to the new active frequency (2314). If no, whether an Alternate Channel Change Request message is received may be determined (2311). If yes, the new alternate channel may be stored (2315). If not, whether an Averaging Report is received from the DSM-RFSB 1030 may be determined (2316). If no, the normal results processing operation may be re-started (2302).

If an Averaging Report is received from the DSM-RFSB 1030, whether the Averaging Report is for an active channel may be determined (2318). If the Averaging Report is for an active channel, a detection analysis routine may be entered (2326) and whether an interferer is detected may be determined (2328). If no interferer is detected, the normal results processing operation may be re-started (2302). If a compromising interferer is detected, a proactive channel switch routine may be executed (2330) and the normal results processing operation may be re-started (2302). If a non-compromising interferer is detected, a Low Threshold Pass Indication may be sent to the TVWS-SSF-P 1132 along with a preventative channel object PSD (if applicable) (2332). Then, the normal results processing operation may be re-started (2302).

If the Averaging Report is not for an active channel, whether the Averaging report is a preventative channel object may be determined (2320). If no, an Alternate Channel Measurement Results message may be sent to the TVWS-SSF-P 1132 (2322) and the normal results processing operation may be re-started (2302). If the Averaging Report is a preventative channel object, the Averaging Report may be stored as the last preventative sensing PSD value for this alternate channel (2324) and the normal results processing operation may be re-started (2302).

Referring back to FIG. 11, the interface between the sensing board 1110 and the CGW 1130 is through messages passed over the Ethernet Link 1192. Table 9 gives the messages and message contents for the example illustrated in FIG. 11 but does not include regular IP initialization messages that serve to establish the IP link to the sensing board 1110.

TABLE 9

| Message Name | Parameters | Originator | Additional Notes |
|---|---|---|---|
| Setup Channel ID and Frequency | numChannels—Number of channels to be sensed. channelIDList—List of channel IDs for the channels channelType—A channel type (integer value) associated with each channel. For the TVWS embodiment, this field is used to differentiate between the sensing behavior to be applied to a TVWS channel and an ISM band channel. It may be used for a similar function in other embodiments as well. centerFrequencyList—Corresponding list of center frequencies of the channels (for both sensing board and DDC). bandwidthList_—corresponding list of sensing bandwidths for the channels | TVWS-SSF-P | For the TVWS embodiment, there are 3 channels (2 TVWS and 1 ISM). |
| Setup Sensing Configuration | algorithmType—Integer code of the sensing algorithm to be used. In the TVWS embodiment, this field is hardcoded to a value that indicates the Blackman Tukey. algorithmConfiguration—Integer code specifying the particular configuration to be attached to the sensing algorithm specified in the algorithmType field. | TVWS-SSF-P | For the Blackman Tukey algorithm, the TVWS-SSF-S uses the algorithmConfiguration parameter to select and configure the following from a database of parameters associated to that configuration: 1) The reporting frequency (in frames) of the alternate channels 2) A list of one or more averaging lengths to be used on each channel based on the channelType field. For instance, a TVWS |

TABLE 9-continued

| Message Name | Parameters | Originator | Additional Notes |
|---|---|---|---|
| | | | channel will have two objects with averaging lengths of 40 frames and 250 frames respectively. 3) A list of corresponding high thresholds (used for proactive switch decision by the TVWS-SSF-S) to be used with each of the averaging lengths on a particular channel. 4) A list of potential interferers for each channelType (e.g. the TVWS channel will have WM and DTV as the interferers) and the averaging length and threshold to be associated with each interferer for detection of this interferer on the active channel. |
| Setup Sensing Confirm | None (potential to send failure response) | TVWS-SSF-S | Confirms either a Setup Channel ID and Frequency message or a Setup Sensing Configuration message. |
| Sensing Measurement Request | None. | TVWS-SSF-P | Requests sensing information for all of the channels (needed for initialization) |
| Active Channel Setup Request | activeChannelID—ID of the channel to use as the current active channel alternateChannelID—ID of the channel to use as the current alternate channel | TVWS-SSF-P | |
| Active Channel Setup Confirm | None (potential to send failure response) | TVWS-SSF-S | |
| Sensing Measurement Results | reasonCode—Indicates the reason for sending the Sensing Measurement Results message. For the TVWS embodiment, the following reason codes are supported: INITIAL_CHANNEL_ MEASUREMENTS—reports all channel measurements during initial channel selection phase ALTERNATE_CHANNEL_ MEASUREMENTS reports measurements of the alternate channels LOW_THRESHOLD_PASS_ INDICATION indicates that the low | TVWS-SSF-S | This message is a generic message used in order to report the sensing results to the TVWS-SSF-P. For the TVWS embodiment, this message is used in three instances (each having its own reasonCode): during initialization in order to report the initial channel measurements |

TABLE 9-continued

| Message Name | Parameters | Originator | Additional Notes |
|---|---|---|---|
| | threshold will passed on the active channel<br>numChannels—Number of channels on which we are reporting measurement results. (this message may or may not contain measurements on the active channel).<br>channelIDList—List of channel IDs for which we are reporting measurement results<br>sensingResultsList—corresponding list of averaged PSDs for each of the channels in the channelIDList | | (in response to a sensing measurement request), in normal mode in order to periodically report the channel sensing results for the alternate channels, and in normal mode in order to indicate the passing of a low threshold. In the case 3 (LOW_THRESHOLD_PASS_INDICATION), the preventative channel information is sent in this message along with the active channel results. |
| Alternate Channel Change Request | alternateChannelID—ID of the channel to use as the new alternate channel | TVWS-SSF-P | |
| Alternate Channel Change Confirm | None (potential to send failure response) | TVWS-SSF-S | |
| Active Channel Change Notification | activeChannelID—ID of the channel to use as the new active channel<br>alternateChannelID—ID of the channel to use as the new alternate channel | TVWS-SSF-S | The TVWS-SSF-S, by default, chooses the only remaining channel as the new alternate channel. The TVWS-SSF-P may then modify this using a separate message to change the alternate channel. |
| Active Channel Change Request | activeChannelID—ID of the channel to use as the new active channel<br>alternateChannelID—ID of the channel to use as the new alternate channel | TVWS-SSF-P | |
| Active Channel Change Confirm | alternateChannelID—ID of the channel to use as the new alternate channel | TVWS-SSF-S or TVWS-SSF-P | Confirms either an Active Channel Change Notification or an Active Channel Change Request. When it confirms an Active Channel Change Notification, the alternateChannelID field is used to send the new alternate channel to the TVWS-SSF-S. When it confirms an alternate channel change request, this field is unused/ignored. |

Figure 24:
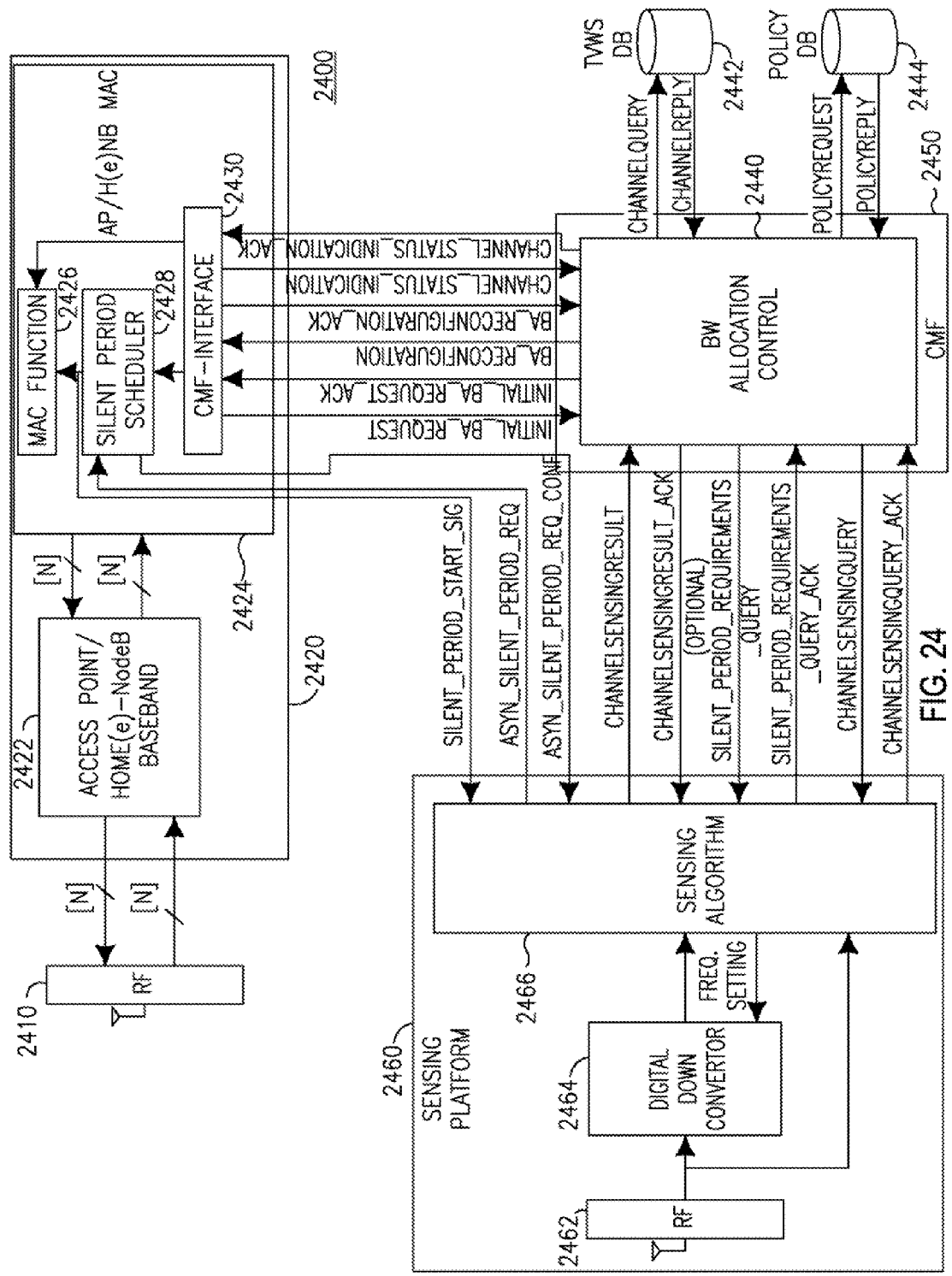
FIGS. 24 and 25 are block diagram of other example architectures for executing spectrum sensing in a DSM network.
Figure 25:
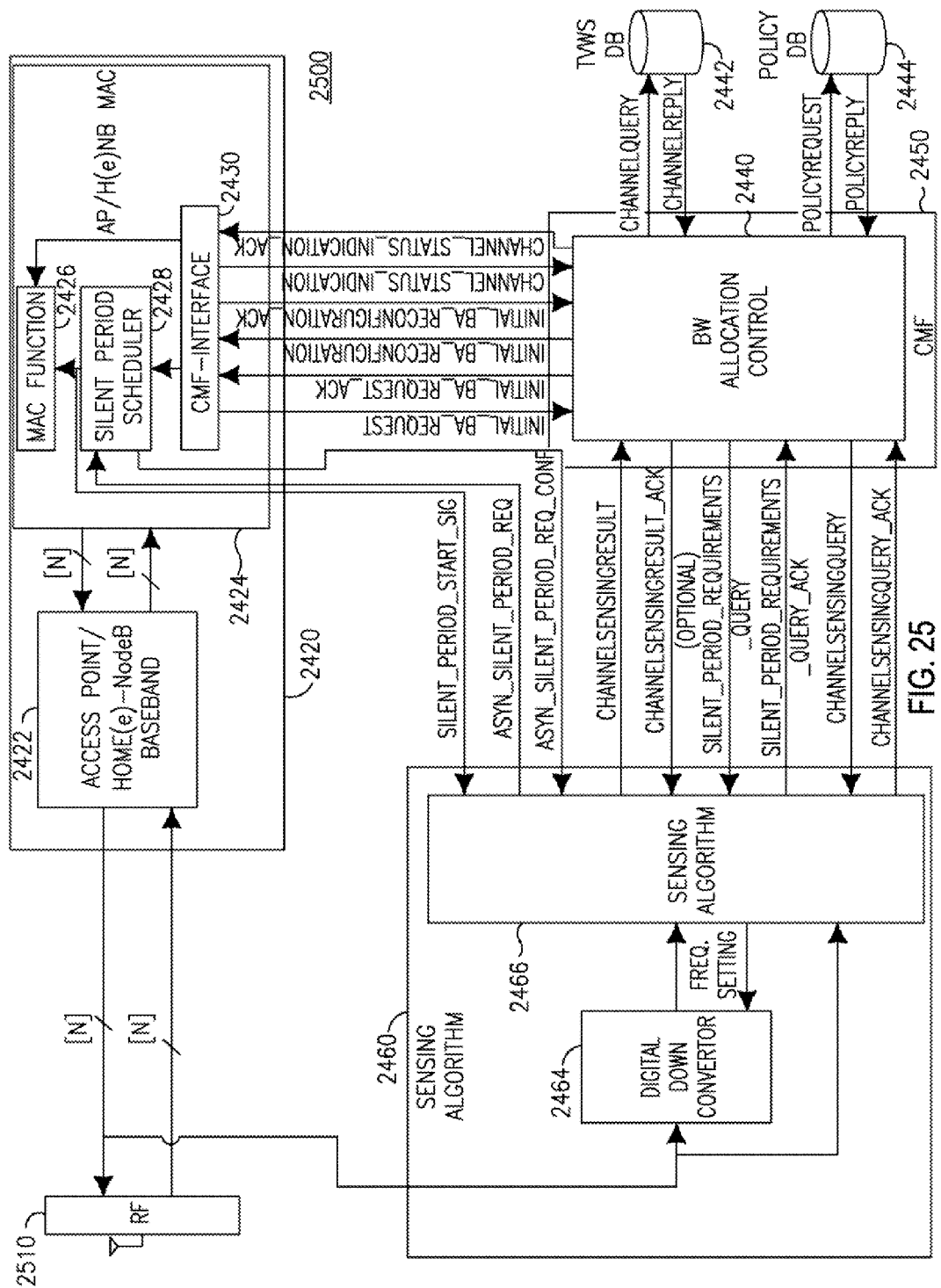

FIGS. 24 and 25 are block diagrams of other example architectures 2400 and 2500 for executing spectrum sensing in a DSM network (e.g., the DSM network 200 of FIG. 2). Both of the architectures 2400 and 2500 include an AP or Home NodeB (Home(e)-NodeB) unit 2420, a sensing unit 2460 and a CMF 2450. For both of the architectures 2400 and 2500, the AP/Home(e)-NodeB unit 2420 includes the same or similar components, namely, the AP/Home(e)-NodeB baseband unit 2422 and an AP/Home(e)NodeB MAC module, which includes a MAC function 2426, a silent period scheduler 2428 and a CMF-Interface 2430. Further, for both architectures 2400 and 2500, the AP/Home (e)-NodeB unit 2420 is in communication with the CMF 2450, which includes a bandwidth (BW) allocation control unit 2440. The BW allocation control unit 2440 is in communication with a plurality of databases, which may include the TVWS database (DB) 2442 and a policy DB 2444.

As illustrated in FIGS. 24 and 25, the spectrum sensing component may be integrated with the converged gateway in two ways. One way, as illustrated in FIG. 24, is for the sensing component to be a complexly independent sensing platform 2460 that interfaces with the AP or home(e) node B 2420 and other components through physical interfaces. Here, the sensing algorithm 2466 may have a dedicated RF component 2462 for itself. The example illustrated in FIG. 24 also includes a digital down converter 2464 on the sensing platform 2460 and a separate RF component 2410 for the AP/Home(e)-NodeB unit 2420. In the type of setup illustrated in FIG. 24, interference due to leakage from one band into adjacent bands may be minimized and, thus, the probability of the sensing algorithm to falsely detect a spectrum as occupied due to leakage may be minimized.

Another way for the spectrum sensing component to be integrated with the converged gateway is illustrated in FIG. 25. Here, the sensing component is on the same platform as the AP or home (e) node B 2420 or on the converged gateway. The interfaces between components may be a physical bus on the platform. In this example, the sensing platform may share the same RF component 2510 with the AP or home (e) NodeB 2420 or the converged gateway. Thus, adjacent channel interference due to leakage may still continue to be an issue depending on the transmit power of the active channel.

In either of the architectures 2400 or 2500 of FIGS. 24 and 25, the sensing algorithm may include hardware and software components. The hardware components may primarily implement wideband sensing and fine sensing algorithms. The software component may be responsible for interfacing with the external components and the internal hardware components and, correspondingly, coordinate system functionality.

The sensing component 2460 may include three primary parts: a wideband sensing algorithm, a fine (narrowband) sensing algorithm and algorithm flow control software. The algorithm flow control software may be responsible for initiating and scheduling wideband sensing and narrowband sensing operations, receiving and processing results from them, and interacting with the silent period scheduler 2428 and the BW allocation control unit 2440 based on the sensing results.

The sensing component 2460 may interface with two components of a DSM engine: the silent period scheduler 2428 in the MAC and the bandwidth allocation control 2440 in the CMF 2450. The interface between a sensing toolbox (e.g., 2460) and the silent period scheduler 2428 may essentially be to set the silent period start and the corresponding parameters and to set up asynchronous silent periods by the sensing toolbox.

A silent period start signal is a periodic synchronous signal to indicate start, duration, periodicity and spectral frequency parameters to set up the silent periods. The need for asynchronous silent periods may be determined by the sensing toolbox and, accordingly, the signal to set up the silent period and the corresponding parameters, such as duration, periodicity and spectral frequency parameters, may be signaled.

The interface between the sensing toolbox and the bandwidth allocation control unit 2440 may be broadly classified as signals to request sensing on specific channels and the mode of operation, signals to indicate silent period requirements, and signals to indicate the sensing results back to the bandwidth allocation control unit 2440.

Figure 26:
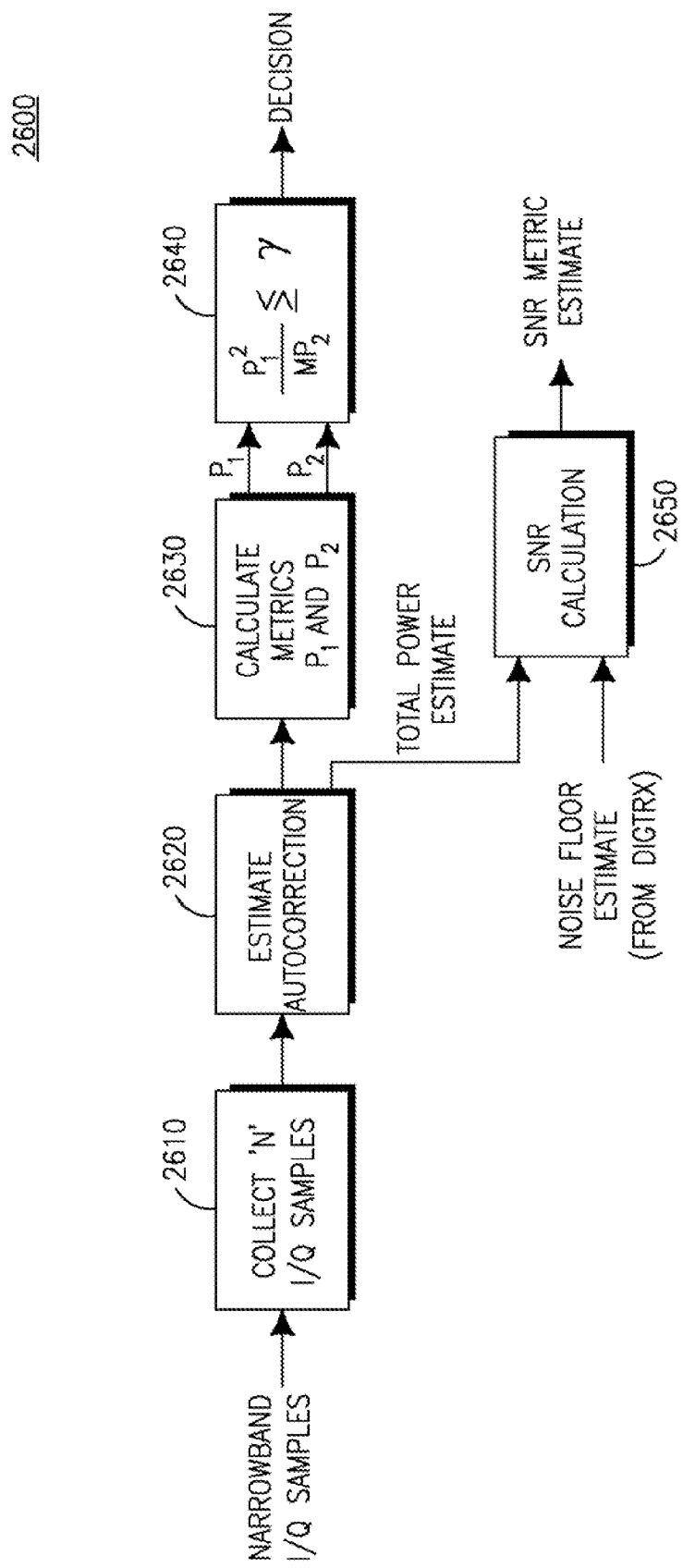
FIG. 26 is a flow diagram of an autocorrelation based spectrum sensing algorithm that may be implemented in the spectrum sensing unit illustrated in FIGS. 24 and 25.

FIG. 26 is a flow diagram 2600 of an autocorrelation based spectrum sensing algorithm that may be implemented in, for example, the spectrum sensing unit 2460 of FIG. 24 or 25. The auto correlation based spectrum sensing algorithm is a blind sensing algorithm with no knowledge of the waveform being sensed and is based on the fact that any man-made signal is inherently correlated in time. The algorithm operates on the baseband I/Q samples (2610) of each band (one TV band in this example) and estimates the autocorrelation properties of the buffered samples (2620). The decision rule may be based on a two level hypothesis test. The following equation shows the metrics $P_1$ and $P_2$ (2630) in terms of the autocorrelation of the input signal y(n), $R_{yy}$, M, which is the number of offset autocorrelations being considered, and $\gamma$, the decision threshold.

$$P_1 = M \cdot R_{yy}(0) \quad \text{Equation (6)}$$

$$P_2 = M \cdot \sum_{i=0}^{M-1} |R_{yy}(j)|^2 \quad \text{Equation (7)}$$

$$\frac{P_1^2}{MP_2} \gtreqless \gamma \quad \text{Equation (8)}$$

If the decision metric exceeds the decision threshold, it may be inferred that the signal is absent (2640). Otherwise, it may be inferred that the signal is present (2640).

The fine sensing algorithm may also include an SNR calculation to give an idea of the level of occupancy/interference in the fine sensing narrow band (2650). The SNR estimate may be made as follows:

$$\text{SNR Metric Estimate} = \quad \text{Equation (9)}$$
$$\text{Total Power Estimate/Noise Power Estimate} =$$
$$\sum_{k=1}^{N} \frac{R_{xx}(0)}{NoiseFloor_{est}}$$

where N is the averaging length. Averaging may improve accuracy of the estimate.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A dynamic spectrum management (DSM) engine comprising:
a transceiver configured to:
transmit a first sensing task request to at least two of a plurality of wireless transmit/receive units (WTRUs) requesting that the at least two of the plurality of WTRUs measure information indicative of usage of spectrum by other devices,
receive first sensing results from a first WTRU of the at least two of the plurality of WTRUs at a plurality of periodic intervals, and
receive second sensing results from a second WTRU of the at least two of the plurality of WTRUs at the plurality of periodic intervals,
wherein the first sensing results and the second sensing results indicate whether, at each of the plurality of periodic intervals, the spectrum is being used by the other devices at a time that the information was measured; and
a processing unit configured to:
determine whether the first sensing results and the second sensing results indicate that the first WTRU and the second WTRU are uncorrelated,
wherein the first WTRU and the second WTRU are not simultaneously located in an interference area with respect to a third WTRU of the at least two of the plurality of WTRUs, and
select a subset of the at least two of the plurality of WTRUs to which to transmit a second sensing task request based on results of the determining,
wherein the subset comprises at least the first WTRU and the second WTRU, and
wherein the second sensing task request instructs each WTRU of the subset to perform a second sensing task for a plurality of channels.

2. The dynamic spectrum management (DSM) engine of claim 1, wherein:
the transceiver is further configured to receive additional sensing results from each of the subset to which the second sensing task request was sent, wherein the additional sensing results comprise at least one indication that the spectrum is being used by the other devices; and
the processing unit is further configured to determine whether the other devices are using the spectrum based at least on the additional sensing results and other information indicating a reliability of the additional sensing results.

3. The dynamic spectrum management (DSM) engine of claim 2, wherein the other information comprises at least one of an estimated signal-to-noise ratio (SNR) or a number of samples used in a metric computation.

4. The dynamic spectrum management (DSM) engine of claim 2, wherein the processing unit is further configured to determine whether the other devices are using the spectrum by:
attributing a weight to each of the additional sensing results based on the other information indicating the reliability of the additional sensing results; and
combining the additional sensing results into an overall metric using the weight attributed to each of the additional sensing results.

5. The dynamic spectrum management (DSM) engine of claim 1, wherein the transceiver is further configured to transmit the second sensing task request to at least two of the subset and receive inphase/quadrature (I/Q) data samples from the at least two of the subset; and
wherein the processing unit is further configured to determine whether the other devices are using the spectrum based on the received I/Q data samples.

6. The dynamic spectrum management (DSM) engine of claim 1, wherein the third WTRU of the at least two of the plurality of WTRUs is a primary WTRU.

7. A method implemented in a dynamic spectrum management (DSM) engine, the method comprising:
transmitting a first sensing task request to at least two of a plurality of wireless transmit/receive units (WTRUs) requesting that the at least two of the plurality of WTRUs measure information indicative of usage of spectrum by other devices;
receiving first sensing results from a first WTRU of the at least two of the plurality of WTRUs at a plurality of periodic intervals,
receiving second sensing results from a second WTRU of the at least two of the plurality of WTRUs at the plurality of periodic intervals,
wherein the first sensing results and the second sensing results indicate whether, at each of the plurality of periodic intervals, the spectrum is being used by the other devices at a time that the information was measured;
determining whether the first sensing results and the second sensing results indicate the first WTRU and the second WTRU are uncorrelated,
wherein the first WTRU and the second WTRU are not simultaneously located in an interference area with respect to a third WTRU of the at least two of the plurality of WTRUs; and
selecting a subset of the at least two of the plurality of WTRUs to which to transmit a second sensing task request based on results of the determining,
wherein the subset comprises at least the first WTRU and the second WTRU, and
wherein the second sensing task request instructs each WTRU of the subset to perform a second sensing task for a plurality of channels.

8. The method of claim 7, further comprising:
receiving additional sensing results from each WTRU of the subset to which the second sensing task request was sent, the additional sensing results comprising at least one indication that the spectrum is being used by the other devices; and
determining whether the other devices are using the spectrum based at least on the additional sensing results and other information indicating a reliability of the additional sensing results.

9. The method of claim 8, wherein the other information comprises at least one of an estimated signal-to-noise ratio (SNR) or a number of samples used in a metric computation.

10. The method of claim 8, wherein the determining comprises:
   attributing a weight to each of the additional sensing results based on the other information; and
   combining the additional sensing results into an overall metric using the weight attributed to each of the additional sensing results.

11. The method of claim 7, further comprising:
   transmitting the second sensing task request to at least two of the subset;
   receiving inphase/quadrature (I/Q) data samples from the at least two of the subset; and
   determining whether the other devices are using the spectrum based on the received I/Q data samples.

12. The method of claim 11, wherein the determining whether the other devices are using the spectrum based on the received I/Q data comprises:
   computing an average power spectral density (PSD) based on the received I/Q data samples; and
   determining whether the other devices are using the spectrum based on the computed average PSD.

13. The method of claim 11, wherein the determining whether the other devices are using the spectrum based on the received I/Q data comprises computing the average PSD over a configurable-length time window.

14. The method of claim 13, wherein a length of the configurable-length time window depends on at least one of a type of interferer detected by the subset, an amount of time required to detect the third WTRU, a mobility of the subset, or a knowledge of a noise level on a channel.

15. The method of claim 11, wherein the determining whether the other devices are using the spectrum based on the received I/Q data samples comprises:
   estimating autocorrelation properties of the received I/Q data samples;
   calculating a decision metric based on the estimated autocorrelation properties;
   determining whether the decision metric exceeds a decision threshold;
   on a condition that the decision metric exceeds the decision threshold, determining that the other devices are using the spectrum; and
   on a condition that the decision metric does not exceed the decision threshold, determining that the other devices are not using the spectrum.

16. The method of claim 15, wherein the calculating the decision metric is performed based on:

$$P_1 = M \cdot R_{yy}(0), \quad P_2 = M \cdot \sum_{i=0}^{M-1} |R_{yy}(j)|^2, \text{ and}$$

wherein the determining whether the decision metric exceeds the decision threshold is based on:

$$\frac{P_1^2}{MP_2} \overset{<}{\geq} \gamma,$$

wherein $y(n)$ is an input signal, M is a number of offset autocorrelations being considered and $\gamma$ is the decision threshold, and wherein $R_{yy}$ is an autocorrelation.

17. The method of claim 7, further comprising transmitting at least one new spectrum allocation to the at least two of the plurality of WTRUs on a condition that the other devices are using the spectrum that was previously allocated to the at least two of the plurality of WTRUs.

18. The method of claim 7, further comprising generating sensing objects comprising additional information for configuring hardware of the DSM engine to obtain the first sensing results and the second sensing results, wherein the hardware is configured differently depending on a content of the additional information comprised in each respective sensing object.

19. The method of claim 7, further comprising:
   allocating spectrum for use by the plurality of WTRUs; and
   receiving a notification from one of the plurality of WTRUs indicating that the one of the plurality of WTRUs detected a change in performance of a wireless link corresponding to use of the spectrum by the third WTRU.

20. The method of claim 7, wherein the third WTRU of the at least two of the plurality of WTRUs is a primary WTRU.

* * * * *